US008355982B2

(12) United States Patent  (10) Patent No.: US 8,355,982 B2
Hazel et al.  (45) Date of Patent: Jan. 15, 2013

(54) METRICS SYSTEMS AND METHODS FOR TOKEN TRANSACTIONS

(75) Inventors: Patrick Hazel, Rancho Santa Fe, CA (US); Scott Yale, La Mesa, CA (US); Clay von Mueller, San Diego, CA (US); Paul Elbridge Catinella, San Diego, CA (US); Blake Joseph Wood, Carlsbad, CA (US)

(73) Assignee: VeriFone, Inc., San Jose, CA (US)

( * ) Notice: Subject to any disclaimer, the term of this patent is extended or adjusted under 35 U.S.C. 154(b) by 0 days.

(21) Appl. No.: 11/840,141

(22) Filed: Aug. 16, 2007

(65) Prior Publication Data

US 2009/0048953 A1  Feb. 19, 2009

(51) Int. Cl.
*G06Q 40/00* (2012.01)
(52) U.S. Cl. .......................................... 705/38; 705/35
(58) Field of Classification Search .................... 705/38, 705/35
See application file for complete search history.

(56) References Cited

U.S. PATENT DOCUMENTS

| | | |
|---|---|---|
| 3,953,887 A | 4/1976 | Kobylarz et al. |
| 3,962,726 A | 6/1976 | DeLand et al. |
| 4,028,734 A | 6/1977 | Mos |
| 4,297,735 A | 10/1981 | Eppich |
| 4,319,131 A | 3/1982 | McGeary et al. |
| 4,628,195 A | 12/1986 | Baus |
| 4,650,978 A | 3/1987 | Hudson et al. |
| 4,705,939 A | 11/1987 | Ulinski |
| 4,837,426 A | 6/1989 | Pease |
| 4,906,988 A | 3/1990 | Copella |
| 4,944,619 A | 7/1990 | Suzuki et al. |
| 4,949,192 A | 8/1990 | McGreary |
| 5,010,240 A | 4/1991 | Sheldon |
| 5,097,504 A | 3/1992 | Camion et al. |
| 5,101,097 A | 3/1992 | Conant |
| 5,126,990 A | 6/1992 | Efron et al. |
| 5,214,409 A | 5/1993 | Beigel |
| 5,233,169 A | 8/1993 | Longacre |
| 5,235,166 A | 8/1993 | Fernandez |
| 5,254,843 A | 10/1993 | Hynes et al. |
| 5,257,320 A | 10/1993 | Etherington et al. |
| 5,270,523 A | 12/1993 | Chang et al. |
| 5,336,871 A | 8/1994 | Colgate |

(Continued)

FOREIGN PATENT DOCUMENTS

EP  0644474  3/1995

(Continued)

OTHER PUBLICATIONS

NuGen I.T., "Response to CCIF Parts and Material Committee", Enterprise Workflow, NuGen I.T., The Internet Integration Company.

(Continued)

*Primary Examiner* — Thomas Dixon
*Assistant Examiner* — Benjamin S Fields
(74) *Attorney, Agent, or Firm* — Sheppard Mullin Richter & Hampton LLP

(57) ABSTRACT

Systems and methods for monitoring token access transactions are provided. In one embodiment, the invention provides receiving transaction records for a plurality of bank card transactions, wherein the transaction records include transaction information and infrastructure information; determining whether a reportable event has occurred based on the transaction information with the transaction records; and providing an alert representing the reportable event.

220 Claims, 43 Drawing Sheets

U.S. PATENT DOCUMENTS

| | | |
|---|---|---|
| 5,354,097 A | 10/1994 | Tel |
| 5,358,088 A | 10/1994 | Kryder et al. |
| 5,365,586 A | 11/1994 | Indeck et al. |
| 5,367,581 A | 11/1994 | Abel et al. |
| 5,393,966 A | 2/1995 | Gatto et al. |
| 5,396,369 A | 3/1995 | DeLand, Jr. et al. |
| 5,408,505 A | 4/1995 | Indeck et al. |
| 5,412,718 A | 5/1995 | Narasimhalu |
| 5,428,683 A | 6/1995 | Indeck et al. |
| 5,430,279 A | 7/1995 | Fernandez |
| 5,459,629 A | 10/1995 | Wakasugi |
| 5,461,525 A | 10/1995 | Christianson et al. |
| 5,479,509 A | 12/1995 | Ugon |
| 5,546,462 A | 8/1996 | Indeck et al. |
| 5,552,947 A | 9/1996 | Nakanishi et al. |
| 5,569,898 A | 10/1996 | Fisher et al. |
| 5,570,339 A | 10/1996 | Nagano |
| 5,572,507 A | 11/1996 | Ozaki et al. |
| 5,587,654 A | 12/1996 | Indeck et al. |
| 5,603,078 A | 2/1997 | Henderson |
| 5,616,904 A | 4/1997 | Fernandez |
| 5,625,689 A | 4/1997 | Indeck et al. |
| 5,644,636 A | 7/1997 | Fernandez |
| 5,657,389 A | 8/1997 | Houvener |
| 5,685,657 A | 11/1997 | Jablonski |
| 5,691,526 A | 11/1997 | Evans |
| 5,708,422 A * | 1/1998 | Blonder et al. ............... 340/5.41 |
| 5,740,244 A | 4/1998 | Indeck et al. |
| 5,767,495 A | 6/1998 | DeLand |
| 5,770,846 A | 6/1998 | Mos |
| 5,780,828 A | 7/1998 | Mos et al. |
| 5,814,796 A | 9/1998 | Benson et al. |
| 5,829,743 A | 11/1998 | DeLand et al. |
| 5,920,628 A | 7/1999 | Indeck et al. |
| 5,930,794 A | 7/1999 | Linenbach et al. |
| 5,959,794 A | 9/1999 | Indeck et al. |
| 6,024,288 A | 2/2000 | Gottlich |
| 6,038,321 A | 3/2000 | Torigai et al. |
| 6,053,406 A | 4/2000 | Litman |
| 6,064,988 A * | 5/2000 | Thomas ........................ 705/44 |
| 6,098,881 A | 8/2000 | DeLand et al. |
| 6,105,011 A | 8/2000 | Morrison |
| 6,123,259 A | 9/2000 | Ogasawara |
| 6,260,146 B1 | 7/2001 | Mos et al. |
| 6,266,647 B1 | 7/2001 | Fernandez |
| 6,308,886 B1 | 10/2001 | Benson et al. |
| 6,335,799 B1 | 1/2002 | Provost |
| 6,430,008 B1 | 8/2002 | Trabert et al. |
| 6,431,445 B1 | 8/2002 | DeLand et al. |
| 6,476,991 B1 | 11/2002 | Fernandez |
| 6,480,356 B1 | 11/2002 | Mos |
| 6,543,689 B2 | 4/2003 | Sabella |
| 6,641,050 B2 | 11/2003 | Kelley et al. |
| 6,644,547 B1 | 11/2003 | White |
| 6,678,103 B2 | 1/2004 | Fernandez et al. |
| 6,678,823 B1 | 1/2004 | Fernandez |
| 6,760,841 B1 | 7/2004 | Fernandez |
| 6,781,781 B2 | 8/2004 | Wood |
| 6,830,182 B2 | 12/2004 | Izuyama |
| 6,830,183 B2 | 12/2004 | Von Mueller et al. |
| 6,837,435 B2 | 1/2005 | Kehoe et al. |
| 6,885,748 B1 | 4/2005 | Wang |
| 6,899,269 B1 | 5/2005 | DeLand |
| 6,901,375 B2 | 5/2005 | Fernandez |
| 6,944,782 B2 | 9/2005 | Von Mueller et al. |
| 6,963,980 B1 | 11/2005 | Mattsson |
| 6,993,130 B1 | 1/2006 | Fernandez et al. |
| 7,013,393 B1 | 3/2006 | Stevens |
| 7,068,207 B2 | 6/2006 | Fujita et al. |
| 7,068,787 B1 | 6/2006 | Ta et al. |
| 7,103,575 B1 | 9/2006 | Lineham |
| 7,113,930 B2 | 9/2006 | Eccles |
| 7,120,933 B2 | 10/2006 | Mattsson |
| 7,305,707 B2 | 12/2007 | Mattsson |
| 7,313,822 B2 | 12/2007 | Ben-Itzhak |
| 7,325,129 B1 | 1/2008 | Mattsson |
| 7,418,098 B1 | 8/2008 | Mattsson |
| 7,490,248 B1 | 2/2009 | Valfridsson |
| 7,539,857 B2 | 5/2009 | Bartlett |
| 7,548,622 B2 | 6/2009 | Carr |
| 2001/0047355 A1 | 11/2001 | Anwar |
| 2002/0017559 A1 | 2/2002 | Mos et al. |
| 2002/0017560 A1 | 2/2002 | Mos et al. |
| 2002/0023215 A1 | 2/2002 | Wang et al. |
| 2002/0046338 A1 | 4/2002 | Ueda et al. |
| 2002/0145051 A1 | 10/2002 | Charrin |
| 2002/0152180 A1 | 10/2002 | Turgeon |
| 2002/0178145 A1 | 11/2002 | Ishida |
| 2003/0028481 A1 | 2/2003 | Flitcroft et al. |
| 2003/0061156 A1 * | 3/2003 | Lim ............................... 705/39 |
| 2003/0061171 A1 | 3/2003 | Gilbert et al. |
| 2003/0085277 A1 | 5/2003 | DeLand et al. |
| 2003/0089774 A1 | 5/2003 | Schmieder et al. |
| 2003/0105725 A1 | 6/2003 | Hoffman |
| 2003/0105967 A1 | 6/2003 | Nam |
| 2003/0145205 A1 | 7/2003 | Sarcanin |
| 2003/0146846 A1 | 8/2003 | Fujita et al. |
| 2003/0192948 A1 | 10/2003 | Izuyama |
| 2003/0213840 A1 | 11/2003 | Livingston et al. |
| 2004/0006699 A1 | 1/2004 | Von Mueller |
| 2004/0049777 A1 | 3/2004 | Sullivan |
| 2004/0203930 A1 | 10/2004 | Farchmin et al. |
| 2004/0238627 A1 | 12/2004 | Silverbrook et al. |
| 2005/0036611 A1 | 2/2005 | Seaton, Jr. et al. |
| 2005/0044044 A1 | 2/2005 | Burger et al. |
| 2005/0167495 A1 | 8/2005 | Morley et al. |
| 2005/0167496 A1 | 8/2005 | Morley et al. |
| 2005/0173530 A1 | 8/2005 | DeLand et al. |
| 2005/0184165 A1 | 8/2005 | Jong |
| 2005/0198318 A1 | 9/2005 | Von Mueller |
| 2005/0218229 A1 | 10/2005 | Morley et al. |
| 2005/0228688 A1 | 10/2005 | Visser et al. |
| 2005/0247787 A1 | 11/2005 | Von Mueller |
| 2006/0046842 A1 | 3/2006 | Mattice et al. |
| 2006/0049255 A1 | 3/2006 | Von Mueller |
| 2006/0049256 A1 | 3/2006 | Von Mueller |
| 2006/0061503 A1 | 3/2006 | Fujita et al. |
| 2006/0179296 A1 | 8/2006 | Bartlett |
| 2006/0249574 A1 | 11/2006 | Brown et al. |
| 2007/0067634 A1 | 3/2007 | Siegler |
| 2007/0067637 A1 | 3/2007 | Mattsson |
| 2007/0101425 A1 | 5/2007 | Mattsson |
| 2007/0242829 A1 | 10/2007 | Pedlow |
| 2008/0022136 A1 | 1/2008 | Mattsson |
| 2008/0082834 A1 | 4/2008 | Mattsson |
| 2008/0082837 A1 | 4/2008 | Mattsson |
| 2008/0084995 A1 | 4/2008 | Rodgers |
| 2008/0098393 A1 * | 4/2008 | Chai et al. ..................... 718/101 |
| 2008/0165973 A1 | 7/2008 | Miranda Gavillan et al. |
| 2008/0170693 A1 | 7/2008 | Spies et al. |
| 2009/0025057 A1 | 1/2009 | Mattsson |
| 2009/0089591 A1 | 4/2009 | Mattsson |

FOREIGN PATENT DOCUMENTS

| | | |
|---|---|---|
| EP | 1363226 | 5/2002 |
| EP | 1460593 | 9/2004 |
| WO | 97/30533 | 8/1997 |
| WO | 01/65512 | 9/2001 |
| WO | 02/43014 | 5/2002 |
| WO | 02/43015 | 5/2002 |
| WO | 02/067157 | 8/2002 |
| WO | 2006/010947 | 2/2006 |
| WO | 2006/020320 | 2/2006 |
| WO | 2006/111022 | 10/2006 |
| WO | 2008/100396 | 8/2008 |

OTHER PUBLICATIONS

CCC Information Services, Inc., "How to Read an Estimate Quality Review," (2005), http://www.ccis.com.

M. Bellare, K. Pietrzak, and P. Rogaway. Improved Security Analyses for CBC MACs. Advances in Cryptology—CRYPTO '05, LNCS vol. 3621, pp. 527-545, Springer, 2005.

Bellare, M., Rogaway, P. The Security of Triple Encryption and a Framework for Code-Based Game-Playing Proofs. Advances in Cryptology—EUROCRYPT '06, LNCS vol. 4004, pp. 409-426, Springer, 2006.

M. Bellare, A. Boldyreva, and A. O'Neill. Deterministic and efficiently searchable encryption. Advances in Cryptology—CRYPTO '07, LNCS vol. 4622, pp. 535-552, Springer, 2007.

M. Bellare, M. Fischlin, A. O'Neill, and T. Ristenpart. Deterministic encryption: Definitional equivalences and constructions without random oracles. Advances in Cryptology—CRYPTO '08, LNCS vol. 5157, pp. 360-378, Springer, 2008.

J. Black and P. Rogaway. CBC MACs for Arbitrary-Length Messages: The Three-Key Constructions. J. of Cryptology, vol. 18, No. 2, pp. 111-131, 2005.

J. Black and P. Rogaway. Ciphers with arbitrary finite domains. Topics in Cryptology—CT-RSA '02, LNCS vol. 2271, Springer, pp. 114-130, 2002.

J. Black, S. Halevi, H. Krawczyk, T. Krovetz, and P. Rogaway. UMAC: Fast and Secure Message Authentication. Advances in Cryptology—CRYPTO '99, LNCS vol. 1666. pp. 216-233, Springer, 1999.

J. Black and P. Rogaway. A Block-Cipher Mode of Operation for Parallelizable Message Authentication. Advances in Cryptology—Eurocrypt '02, LNCS vol. 2332, pp. 384-397, Springer, 2002.

A. Boldyreva, S. Fehr, and A. O'Neill. On notions of security for deterministic encryption, and efficient constructions without random oracles. Advances in Cryptology—CRYPTO '08, LNCS vol. 5157, pp. 335-359 Springer, 2008.

ISO/IEC 7812-1:2006. Identification cards—Identification of issuers—Part 1: Numbering system.

T. Iwata and K. Kurosawa. OMAC: One-Key CBC MAC. Fast Software Encryption—FSE '03, LNCS vol. 2887, pp. 129-153, Springer, 2003.

M. Liskov, R. Rivest, and D. Wagner. Tweakable block ciphers. Advances in Cryptology—CRYPTO 2002, LNCS vol. 2442, Springer, pp. 31-46, 2002.

M. Luby and C. Rackoff. How to construct pseudorandom permutations from pseudorandom functions. SIAM Journal of Computing, vol. 17, No. 2, pp. 373-386, 1988.

S. Lucks. Faster Luby-Rackoff ciphers. Fast Software Encryption 1996, LNCS vol. 1039, Springer, pp. 189-203, 1996.

U. Maurer and K. Pietrzak. The Security of Many-Round Luby-Rackoff Pseudo-Random Permutations. Advances in Cryptology—EUROCRYPT '03, LNCS vol. 2656, pp. 544-561, Springer, 2003.

M. Naor and O. Reingold. On the construction of pseudorandom permutations: Luby-Rackoff revisited. Journal of Cryptology, vol. 12, No. 1, pp. 29-66, 1999.

J. Patarin. New Results on Pseudorandom Permutation Generators Based on the DES Scheme. Advances in Cryptology—CRYPTO '91, LNCS vol. 576, Springer, pp. 301-312, 1991.

J. Patarin. Generic Attacks on Feistel Schemes. Advances in Cryptology—ASIACRYPT '01, LNCS vol. 2248, Springer, pp. 222-238, 2001.

J. Patarin. Luby-Rackoff: 7 Rounds Are Enough for $2n(1-Q)$ Security. Advances in Cryptology—CRYPTO '03, LNCS vol. 2729, Springer, pp. 513-529, 2003.

J. Patarin. Security of Random Feistel Schemes with 5 or More Rounds. Advances in Cryptology—CRYPTO '04, LNCS vol. 3152, Springer, pp. 106-122, 2004.

S. Patel, Z. Ramzan, and G. Sundaram. Efficient constructions of variable-input-length block ciphers. Selected Areas in Cryptography 2004, LNCS vol. 3357, pp. 326-340, 2004.

PCI Security Standards Council. Payment Card Industry Data Security Standard Version 1.2. Available from https://www.pcisecuritystandards.org/security_standards/pci_dss.shtml.

B. Schneier and J. Kelsey. Unbalanced Feistel networks and block cipher design. Fast Software Encryption 1996, LNCS vol. 1039, Springer, pp. 121-144, 1996.

R. Schroeppel. Hasty pudding cipher specification. First AES Candidate Workshop, 1998.

T. Spies. Feistel Finite Set Encryption Mode. http://csrc.nist.gov/groups/ST/toolkit/15 BCM/documents/proposedmodes/ffsem/ffsem-spec.pdf.

Mattson, Ulf T., Format-Controlling Encryption Using Datatype-preserving Encryption.

Mattson, Ulf T., DB2 Security and PCI Compliance: A Best Practice Guide.

Satti, M.V. Kartik, A Quasigroup Based Cryptographic System.

CISCO Systems. Security: AP/Root Radio Data Encryption.

Crocker, David H., Standard for the Format of ARPA Internet Text Messages, RFC 822, Aug. 13, 1982.

* cited by examiner

| | |
|---|---|
| 4FDCC52 | PAD 420 |
| 9202918 | PAN' 406' |
| 3734160 | Epan 422 |
| 0029201 | PAN>>1 406" |
| 3753361 | ePAN 424 |

| Processors / Gateways | Merchants | Terminals | Credit Trx | Debit Trx | Totals |
|---|---|---|---|---|---|
| Fifth Third _1242_ | xxxx | xxxx | xxxx | xxxx | xxxx |
| FirstData _1244_ | xxxx | xxxx | xxxx | xxxx | xxxx |
| Kincaid Technologies _1246_ | xxxx | xxxx | xxxx | xxxx | xxxx |
| TrustCommerce _1248_ | xxxx | xxxx | xxxx | xxxx | xxxx |
| MerchantLink _1250_ | xxxx | xxxx | xxxx | xxxx | xxxx |

*Fig. 39*

| Merchant ID | Store Name | Store # | Address | Phone # | Terminal ID | Encryption On | Date/Time Activated |
|---|---|---|---|---|---|---|---|
| xxxxxxxxxxxxxxxx | xxxx | xxxx | xxxx | xxxx | xxxx | xxxx | xxxx |
| xxxxxxxxxxxxxxxx | xxxx | xxxx | xxxx | xxxx | xxxx | xxxx | xxxx |
| xxxxxxxxxxxxxxxx | xxxx | xxxx | xxxx | xxxx | xxxx | xxxx | xxxx |

*Fig. 41*

| Date / Time | Processor | G/W | MID | Term ID | Cipher Serial | HTDES | Warble | Auth | Result |
|---|---|---|---|---|---|---|---|---|---|
| 05/01/07 10:00:12 | xxxxxxxxxx | xxxx | xxxx | xxxx | xxxx | YES | 95 | 0099100 | ALERT! REPLAY ATTACK |
| 05/01/07 09:59:41 | xxxxxxxxxx | xxxx | xxxx | xxxx | xxxx | NO | | 0231043 | SUCCESS |
| 05/01/07 09:59:01 | xxxxxxxxxx | xxxx | xxxx | xxxx | xxxx | YES | 03 | 2333234 | ALERT! SKIMMED CARD |
| 05/01/07 09:58:42 | xxxxxxxxxx | xxxx | xxxx | xxxx | xxxx | NO | | 0231043 | SUCCESS |
| 05/01/07 09:58:37 | xxxxxxxxxx | xxxx | xxxx | xxxx | xxxx | NO | | 0231043 | SUCCESS |
| 05/01/07 09:58:31 | xxxxxxxxxx | | | | | NO | | 3263277 | ALERT! TERMINAL SHOULD BE ENCRYPTING. PCI COMPLIANCE ISSUE. |

Fig. 40

| Merchant ID | Merchant Name | Store # | Address | Phone # | Terminal ID | Auth / Failure Date | Reason Code / Description |
|---|---|---|---|---|---|---|---|
| xxxxxxxxxxxx | xxxx | xxxx | xxxx | xxxx | xxxx | xxxx | xxxx |
| xxxxxxxxxxxx | xxxx | xxxx | xxxx | xxxx | xxxx | xxxx | xxxx |
| xxxxxxxxxxxx | xxxx | xxxx | xxxx | xxxx | xxxx | xxxx | xxxx |

*Fig. 43*

| 1404 | 1406 | 1408 | 1410 | 1412 | 1414 |
|---|---|---|---|---|---|
| Device Manufacture | Model # | Clear Text Trx | HTDES Trx | Warble Trx | Total |
| xxxxxxxxxx | xxxx | xxxx | xxxx | xxxx | xxxx |
| xxxxxxxxxx | xxxx | xxxx | xxxx | xxxx | xxxx |
| xxxxxxxxxx | xxxx | xxxx | xxxx | xxxx | xxxx |

*Fig. 45*

| 1468 | 1470 | 1472 | 1474 | 1476 | 1478 | 1480 | 1482 | 1484 | 1486 |
|---|---|---|---|---|---|---|---|---|---|
| Date / Time | Processor | G/W | MID | Terminal ID | Cipher Serial | HTDES | Warble | Auth | Result |
| 05/01/07 10:00:12 | xxxxxxxxxxx | xxxx | xxxx | xxxx | xxxx | YES | 95 | 0099100 | ALERT! REPLAY ATTACK |
| 05/01/07 09:59:41 | xxxxxxxxxxx | xxxx | xxxx | xxxx | xxxx | No | no | 0231043 | SUCCESS |
| 05/01/07 09:59:01 | xxxxxxxxxxx | xxxx | xxxx | xxxx | xxxx | YES | 03 | 2333234 | ALERT! SKIMMED CARD |

*Fig. 47*

Merchant Name, Store #, Address, Contact info 1444

| Device Manufacture | Model # | Terminal ID | Cipher Serial # | Encryption On | Clear Text Trx | HTDES Trx | Warble Trx | Total |
|---|---|---|---|---|---|---|---|---|
| xxxxxxxxxx | xxxx | xxxx | xxxx | ON | xxxx | xxxx | xxxx | xxxx |
| xxxxxxxxxx | xxxx | xxxx | xxxx | ON | xxxx | xxxx | xxxx | xxxx |
| xxxxxxxxxx | xxxx | xxxx | xxxx | OFF | xxxx | xxxx | xxxx | xxxx |

1420

| Merchant Name | Merchant ID | Store # | Address | Phone # | Secured Devices | Unsecured Devices | Total |
|---|---|---|---|---|---|---|---|
| xxxxxxxxxxxx | xxxx | xxxx | xxxx | xxxx | xxxx | xxxx | xxxx |
| xxxxxxxxxxxx | xxxx | xxxx | xxxx | xxxx | xxxx | xxxx | xxxx |
| xxxxxxxxxxxx | xxxx | xxxx | xxxx | xxxx | xxxx | xxxx | xxxx |

*Fig. 46*

METRICS SYSTEMS AND METHODS FOR TOKEN TRANSACTIONS

TECHNICAL FIELD

The present invention relates to token transactions and, some embodiments of the present invention relate to metrics for secure transactions and access authorization.

DESCRIPTION OF THE RELATED ART

Token systems have been in use in modern civilization in various implementations to provide and control many forms of access. Access that can be and often times is controlled by tokens can include physical access to rooms, buildings, areas and so on; electronic access to servers and data files; electronic account access; and so on. Another form of access controlled by tokens is the ability to conduct transactions such as, for example, credit, debit and other financial transactions. Credit cards, charge cards, debit cards, loyalty cards and other purchase-related tokens are used to provide the consumers with ready access to funds. Such transactions can enhance convenience of purchases, extend credit to customers, and so on.

As modern society has evolved, so have our tokens. Early tokens included physical objects such as coins, documents, and other physical objects. One example of a simple physical object token is the subway token made famous by the New York subway system. This simple token resembled a coin and could be purchased at kiosks and were used to control access to the subway system. Another example of simple physical token for granting access was the early railway token developed in the $19^{th}$ century for the British railway system. This token was a physical object, such as a coin, that a locomotive engineer was required to have before entering a particular section of the railway. When the train reached the end of the section, the driver left the token at a drop point so it could be to be used by the next train going the other way. Because there was only one token for a given section of railway, the token system helped to ensure that only one train would be on that section of the track at a given time.

The railway token system minimized the likelihood of head on collisions, but this simple token also limited the ability for trains to follow one another along a given section. As such, the system evolved into a token and ticket system. In this system, if a train reached a checkpoint and the token was present, the driver was given a ticket to pass, leaving the token in place in case another train approached that section travelling in the same direction. Safeguards were implemented to ensure that tickets were correctly issued. As technology evolved, the physical token and ticket system evolved to include electronic signaling to control access to sections of the railway.

Another example of tokens to grant access are charge cards, credit cards and debit cards. Some attribute the 'invention' of credit cards to Edward Bellamy, who described them in his $19^{th}$ century novel *Looking Backward*. Early cards were reportedly used in the early $20^{th}$ century United States by fuel companies and by Western Union. By mid century, Diners Club produced a charge card for merchant purchases, which was followed shortly thereafter by American Express. These cards, now ubiquitous in our society, allow customers to make purchases and conduct transactions with relative ease. Early cards were embossed with a customer account number, which was manually transferred to a receipt via a carbon transfer process. Modern cards, or tokens, have evolved to use electronic mechanisms of storing data including, for example, magnetic stripes, RFID tags, and smart card and chip card technologies.

Other examples of tokens include government issued IDs such as driver's licenses and passports. Such tokens can also be used to control access in various forms. For example, a passport can be used to control access to countries and regions. Passports can also be used to access employment and licensing opportunities as a document to prove the holder's citizenship. A driver's license is another form of token, allowing access to driving privileges, and to establishments requiring proof of identity, residency or age. Still other examples of tokens can include bank drafts, stock certificates, currency and other token items relating to finance. Still further token examples can include tokens for physical access and security such as keys, card keys, RF or LC cards, RFID tokens, toll road transponders, and the like.

As these examples illustrate, the use of tokens for various forms of access has gained popularity in various business and industries and has evolved to embrace newly developed technologies. Tokens are not limited to these examples, but can take on various forms and use various instrumentalities and control, govern or arbitrate various forms of access in a variety of different ways. One downside of token access, however, is the opportunity to defraud the system. For example, stolen or counterfeited tokens are often used to gain unauthorized access. In fact, the Federal Trade Commission reports that credit and charge card fraud costs cardholders and issuers hundreds of millions of dollars each year.

BRIEF SUMMARY OF EMBODIMENTS OF THE INVENTION

According to one or more embodiments of the invention, various features and functionality can be provided to enable or otherwise facilitate various forms of token transactions. Particularly, in accordance with one aspect of the invention, data security techniques such as, for example, various forms of encryption, can be implemented with token systems to provide a measure of security in the token data. In one embodiment, information from tokens of various forms can be encrypted on the token itself and can also be encrypted as the data is read by a data capture device used to read data from the token.

For example, in one application, an encryption module can be included to encrypt the data that is read from the token. Preferably, in one embodiment, the data is encrypted as soon as it is read from the token to provide an additional measure of security. To further enhance security in one embodiment, the encryption module, including encryption algorithms and keys, is encapsulated with the data capture device (which may be included with a terminal) and the encapsulation prevents or deters would be tamperers from reverse engineering encryption algorithms for obtaining the keys. Security measures can also be provided to destroy, alter, or otherwise render encryption information unusable in the event of attempted tampering.

For example, in one embodiment, potassium or other reactive material can be included in the head packaging, such that if the head is opened, the material reacts with the environment, destroying the encryption information.

The data capture device can be configured to output a secure data stream that includes encrypted token data. In one embodiment, the data capture device can be configured to package the encrypted token data in the same form and format as conventional non-encrypting systems such that the transaction package can be sent to the terminal in a form and format anticipated by the terminal. In this manner, in one embodiment data capture devices can be plug-and-play compatible with terminals or other transaction processing equipment. Such an embodiment can facilitate upgrades to the transaction-processing network to include data security features without requiring extensive retrofits to downstream equipment.

For example, in the case of bank cards, replacement heads can be provided for magnetic stripe readers that include encryption functionality encapsulated with the read head. The encrypting head can be of the same form factor and can be configured to output the same signals as conventional non-encrypting heads such that the new heads can be easily replaced with existing heads to upgrade data capture devices or terminals without extensive modifications. Of course, in other embodiments, plug-and-play compatibility is not intended and data capture devices, terminals and other equipment can be designed as may be appropriate to communicate with one another in a variety of formats for a given application.

Another feature that can be provided in accordance with the present invention is a secure transaction module that can be used to, among other functions, decrypt data. For example, in one embodiment, a secure transaction module can be provided at one or more points in the transaction-processing network to decrypt data that has been encrypted by the data capture device or to decrypt data that is encrypted on a token. Thus, this decryption functionality can be used to obtain clear text token data to facilitate consummation of the transaction. Secure transaction modules can be placed at appropriate points on the network depending on factors such as network security and desirability of obtaining clear text information at points along the network.

For example, in one embodiment, a secure transaction module can be included at a network router such as a gateway to provide decryption of some or all of the token data that has been encrypted to facilitate transaction routing and processing. The secure transaction module can also be configured to re-encrypt the data prior to transmission to another entity in the processing network. For example, a secure transaction module at a gateway may be included to decrypt a sufficient amount of the token data to facilitate further routing and leave the remainder of the data encrypted for later decryption by the transaction processor. As another example, the gateway may decrypt all of the token data as a service to the transaction processor and provide clear text data to the transaction processor to facilitate transaction processing. In such an embodiment, the secure transaction module at the gateway can be used to manage decryption services for a plurality of transaction locations and a plurality of transaction processors. Thus, the gateway can be configured to decrypt some or all of the token data as may be appropriate for the given transaction-processing network and the given transaction. The gateway may also be configured to re-encrypt some or all of this data prior to forwarding the information along to the transaction processor.

In one embodiment, different keys can be used to encrypt different portions of the token data or to re-encrypt token data in the transaction. Using multiple keys to perform encryption of particular pieces of data can be used to manage the security of those pieces of data and to provide selective access to the clear data at desired locations in the network.

In yet another embodiment, features and functionality can be provided to assist detecting duplicate transactions. For example, transactions can be hashed to generate unique hash codes used to verify that subsequent transactions are not replays of an earlier transaction. Additionally, sequence numbers, signature detection and other techniques can be used to verify the authenticity of a token and a given transaction.

In accordance with another embodiment, token signatures can be used to authenticate the authenticity of a token as well as to further validate the transaction. For example, in one embodiment, the data capture device can be configured to encrypt token data as well as determine a token signature. The token signature can be determined in also encrypted and included in the data that is sent for processing the token transaction. Any number of signature techniques can be used including, for example, the SECURESTRIPE® detection technology available from SemTek Innovative Solutions, Inc., in San Diego, Calif.

In one embodiment, the signature information and the token data can be packaged in a format compatible with downstream equipment, and in another embodiment, compatible with conventional equipment to facilitate plug and play compatibility of the data capture device with conventional equipment. The signature information included with the transaction data can be used to authenticate the token. In one embodiment, signatures can be encrypted using keys different from the token data to allow authentication to occur independently of clearing the token data. In another embodiment, the signature can be used as the key to encrypt the token data. In such an embodiment, it is possible to use signatures at the processing end to decrypt the token data. If a card is not authentic, the encrypted data may not be capable of being decrypted by the set of keys available at the processing server. Thus, using the signature to encrypt the data can provide another measure of security.

As previously noted, any number of keys can be used to provide the encryption of some or all of the token data. For example, particular keys based on information such as a terminal ID, a merchant ID, equipment serial numbers, checkpoint station identification, or other unique identifiers can be used to provide a measure of security in the data. Additionally, time stamp information, location information and other ancillary information can also be provided to facilitate detection of fraudulent transactions. Using unique keys or other ancillary information can be used to detect the source of fraudulent transactions and to detect the occurrence of fraudulent transactions in the first place.

For example, consider a scenario where encrypted token data is received and the designated key fails to properly decrypt the token data. In such a scenario, the received information can be decrypted using a plurality of keys available to the transaction processor until a valid data set is deciphered. Once a valid data set is deciphered, the key can be used to trace back to the source of the fraudulent data. Likewise, tagging the information with time and location data can be used to perform checks such as checks for duplicate transactions and checks to verify that the location from which the data originated is a designated location for the given terminal.

In accordance with another embodiment, additional measure of security can be provided by encrypting additional information such as, for example, a PIN code or other ancillary information. For example, PIN codes, passwords, signatures, biometric or other information that may be provided to authenticate a user can also be encrypted to provide a measure of security in that information. Thus, in one embodiment, the encryption module can be used to encrypt this ancillary information. A secure transaction module can likewise be used to decrypt the pin or other ancillary information for appropriate data processing. It is noted that in one conventional application, conventional techniques utilize clear text token data to encrypt the pin in bank card transactions. However, in one embodiment, encrypted token information rather than clear text token information is used as a key to encrypt the pin data. As such, to provide functionality in a conventional network that is anticipating a pin encrypted with clear text information, a feature can be provided to decrypt the pin using the encrypted token information, decrypt the token information, re-encrypt the pin using the clear text token information and forwarding the token information and pin to the transaction processor. Additionally, the token information can be re-encrypted to ensure data security.

In another embodiment of the invention, features and functionality can be provided to perform batch processing of token transactions. As such, in one embodiment, a secure transaction module can be implemented to include the functionality to process batch transactions from a plurality of sources and for a plurality of transaction processing entities. In one embodiment, a batch settlement file can be provided to the secure transaction module that includes data records for each of the transactions to be settled. Some or all of these transactions may include encrypted data such as, for example, data encrypted by the processes described herein. In one embodiment, when the batch settlement file is received, the data records can be parsed and checked to determine whether any or all of those records are encrypted. Information can be included with the batch settlement file to identify the source of the file, which may be used, in one embodiment, to identify the source of the data which may also identify the appropriate encryption key. The secure transaction module can be configured to obtain the correct key, decrypt encrypted records and return clear text information for settlement processing. Clear text transactions can then be processed for appropriate settlement. In one embodiment, a settlement file may contain transactions for multiple entities and thus may require forwarding the appropriate transaction records to the appropriate settlement entity. In such embodiments, further encryption can be used to provide a measure of security when forwarding the transaction records to the appropriate entities.

In accordance with yet another embodiment, command tokens can be provided to update transaction processing. For example, the command token can be used to initiate the update of encryption information including, for example, encryption keys, encryption algorithms, random number generators, sequence numbers, terminal ids and other information that might be used in the encryption process. In one embodiment, the command token can be used to update local data capture equipment as well as equipment at the transaction processor to ensure consistency of updates. In one embodiment, command tokens can include data formatted similar to a non-command token and the information handled much in the same way as a normal token transaction is handled by the transaction processing equipment. The command code or other information can be used to identify a token as a command token as may be appropriate for a different application. For example, in the case of a bank transaction, a particular BIN or BIN range can be used to identify a card as a command card. Detection of the BIN or BIN range can enable the processing equipment to identify new data as command data and respond to the command data accordingly.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 24, which comprises

FIG. 27, which comprises

FIG. 39 is a diagram illustrating an example of a processor or gateway summary report in accordance with one embodiment of the invention.

FIG. 40 is a diagram illustrating an example of a time alert and audit log in accordance with one embodiment of the invention.

FIG. 41 is a diagram illustrating an example installation status report in accordance with one embodiment of the invention.

FIG. 43 is a diagram illustrating an example of an exception report in accordance with one embodiment of the invention.

FIG. 45 is a diagram illustrating a summary point of sale report in accordance with one embodiment of the invention.

FIG. 46 is a diagram illustrating a detailed merchant point of sale report and a detailed merchant PCI compliance report in accordance with one embodiment of the invention.

FIG. 47 is a diagram illustrating an example an example audit-log detail report in accordance with one embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for providing a system for facilitating token access in various forms. In one embodiment, the system provides systems and methods for secure token access across a communication medium.

Figure 1:
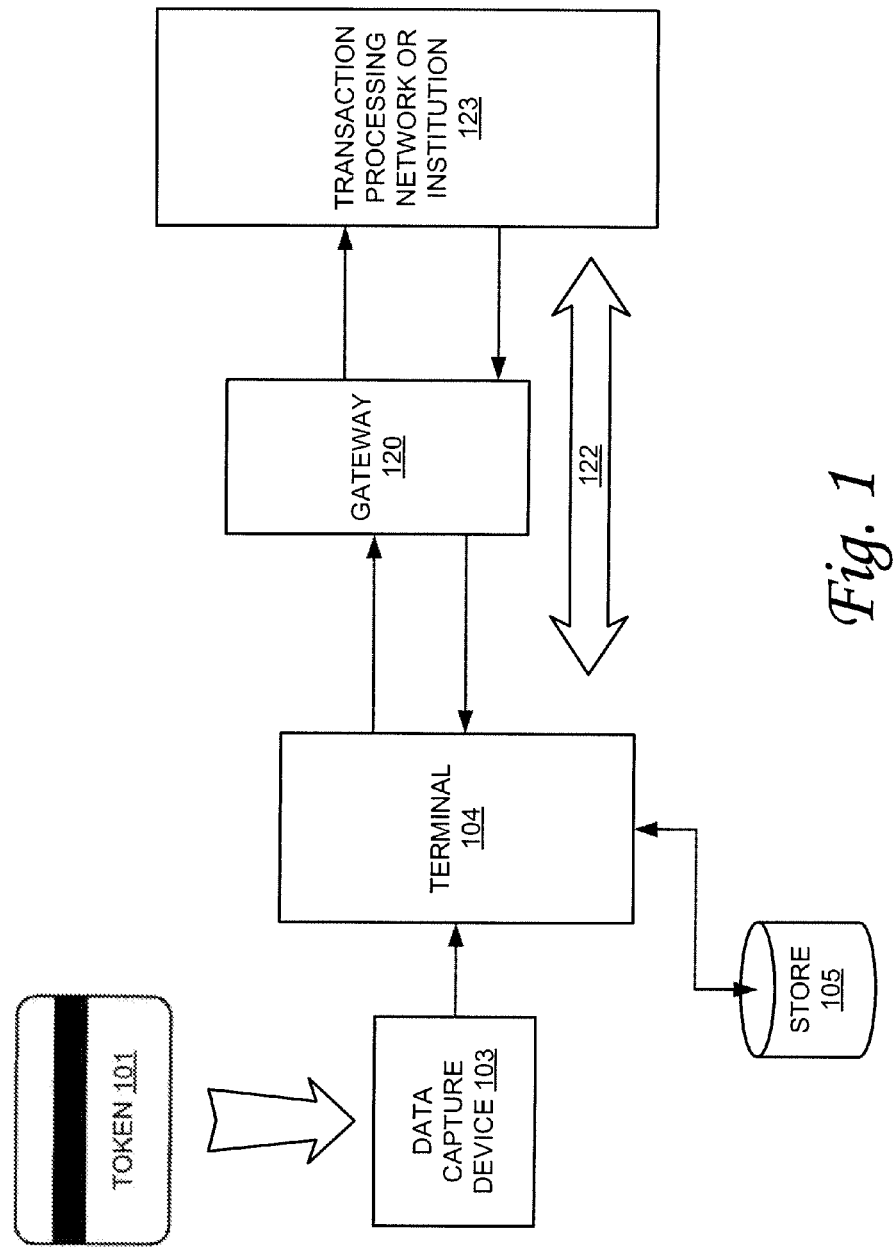
FIG. 1 is a diagram illustrating one example of a transaction network with which the present invention can be implemented.

Before describing the invention in detail, it is useful to describe an example environment with which the invention can be implemented. One such example is that of a transaction card network including a token used to facilitate purchases or other transactions. FIG. 1 is a diagram illustrating one example of a transaction network with which the present invention can be implemented. Referring now to FIG. 1, an example of transaction network is a token network that can be used to authorize and settle purchases of various goods and services. Illustrative examples of implementations of such a transaction network are the charge card, credit card and debit card transaction networks used to facilitate purchase transactions and banking transactions by and among merchants and other businesses, banks and other financial institutions and individuals. Generally speaking, in such a transaction network, the customer utilizes a charge card, credit card, debit card or other token as a symbol of his or her identity, or as an identification of the account he or she would like to have charged for the transaction. The token is typically accepted by the merchant, the account information read, and used to credit the transaction. Merchants may ask for a driver's license or other form of identification to verify the identity of the purchaser in conjunction with the token issued.

The token data is then sent to the appropriate financial institution or institutions, or other entities for processing. Processing can include, in one or more steps, authorization, approval and settlement of the account. As the example in FIG. 1 illustrates, a token 101 can be used by the customer to facilitate the transaction. As stated, in this example environment, examples of token 101 can include a charge card, debit card, credit card, royalty card, or other token that can be used to identify such items as the customers, their account, and other relevant information. As a further example, a card such as a credit or debit card can include various forms of technology to store data, such as a magnetic stripe technology, processor or smart card technology, bar code technology or other technology used to encode account number or other identification or information onto the token. As such, a properly encoded token can include various forms of information relating to the purchaser such as, for example, the identity of the purchaser, information associated with the purchaser's account, the issuing bank or other financial institution, the expiration date, and so on.

As only one example of a token 110, a credit card can be used with a conventional magnetic stripe included on one side thereof. Conventional magnetic stripes can include three tracks of data. Further to this example, the ISO/IEC standard 7811, which is used by banks, specifies: that track one is 210 bits per inch (bpi), and holds 79 six-bit plus parity bit read-only characters; track two is 75 bpi, and holds 40 four-bit plus parity bit characters; and track three is 210 bpi, and holds 107 four-bit plus parity bit characters. Most conventional credit cards use tracks one and two for financial transactions. Track three is a read/write track (that includes an encrypted PIN, country code, currency units, amount authorized), but its usage is not standardized among banks.

In a conventional credit card token, the information on track one is contained in two formats. Format A, is reserved for proprietary use of the card issuer. Format B, which includes the following:

Start sentinel—1 character
Format code="B"—1 character (alpha only)
Primary account number—up to 19 characters
Separator—1 character
Country code—3 characters
Name—2-26 characters
Separator—1 character
Expiration date or separator—4 characters or 1 character
Discretionary data—enough characters to fill out maximum record length (79 characters total)
End sentinel—1 character
Longitudinal Redundancy Check (LRC), a form of computed check character—1 character The format for track two can be implemented as follows:
Start sentinel—1 character
Primary account number—up to 19 characters
Separator—1 character
Country code—3 characters
Expiration date or separator—4 characters or 1 character
Discretionary data—enough characters to fill out maximum record length (40 characters total)
LRC—1 character Although a credit card with magnetic stripe data is only one example of a token that can be used in this and other environments, this example environment is often described herein in terms of a credit card implementation for clarity and for ease of discussion.

Upon entering into a transaction, a merchant may ask the customer to present his or her form of payment, which in this example is the credit card. The customer presents the token 101 (e.g., credit card) to the merchant for use in the transaction terminal 104. In one embodiment, the credit card can be swiped by a magnetic stripe reader or otherwise placed to be read by the data capture device 103. In the current example where a credit card utilizing a magnetic stripe is the token 101, data capture device 103 can include any of a variety of forms of magnetic stripe readers to extract the data from the credit card. In other embodiments or implementations, other forms of data capture devices 103, or readers, can be used to obtain the information from token 101. For example, bar code scanners, smart card readers, RFID readers, near-field devices, and other mechanisms can be used to obtain some or all of the data associated with token 101 and used for the transaction.

The data capture device is in communicative contact with a terminal 104, which can include any of a number of terminals including, for example, a point of sale terminal, point of access terminal, an authorization station, automated teller machine, computer terminal, personal computer, work stations, cell phone, PDA, handheld computing device and other data entry devices. Although in many applications the data capture device 103 is physically separated, but in communicative contact with, the terminal 104, in other environments these items can be in the same housing or in integrated housings. For example, terminals such as those available from companies such as Ingenico, Verifone, Apriva, Linkpoint, Hypercom and others.

Continuing with the credit card example, the customer or cashier can swipe the customer's credit card using the card-swipe device, which reads the card data and forwards it to the cashier's cash register or other terminal 104. In one embodiment, the magnetic stripe reader or other data capture device 103 is physically separated, but in communicative contact with, the terminal 104. In other environments, these items can be in the same housing or in integrated housings. For example, in current implementations in retail centers, a magnetic stripe reader may be placed on a counter in proximity to a customer, and electronically coupled to the cash register terminal. The cash register terminal may also have a magnetic stripe reader for the sales clerk's use.

The customer may be asked to present a form of ID to verify his or her identity as imprinted on the token 101. For other transactions such as debit card transactions, the user may be required to key in a PIN or other authentication entry.

Continuing with the current credit card example, the terminal 104 can be configured to print out a receipt (or may display a signature page on a display screen) and the customer may be required to sign for his or her purchases, thus providing another level of authentication for the purchase. In some environments, terminal 104 can be configured to store a record of the transaction for recordkeeping and reporting purposes. Further, in some environments, a record of the transaction may be kept for later account settlement.

Typically, before the transaction is approved, terminal 104 seeks authorization from one or more entities in a transaction-processing network 123. For example, the merchant may seek approval from the acquiring bank, the issuing bank, a clearinghouse or other entity that may be used to approve such transactions. Thus, depending on the token type, institutions involved and other factors, the transaction-processing network 123 can be a single entity or institution, or it can be a plurality of entities or institutions. As a further example, in one embodiment, transaction-processing network may include one or more processors or clearing houses to clear transactions on behalf of issuing banks and acquiring banks. The transaction-processing network can also include those issuing banks and acquiring banks. For example, one or more entities such as Global Payments, Visa, American Express, and so on, might be a part of transaction-processing network. Each of these entities may have one or more processing servers to handle transactions.

In some instances, the approval may also constitute the final settlement of the transaction resulting in the appropriate funds being transferred to consummate the transaction. In other embodiments, however, the authorization may simply be an authorization only and actual account settlement can take place in a subsequent transaction. For example, authorization may verify the validity of certain information such as the account number, expiration date, customer name, and credit limit to determine whether to approve the transaction. Settlement may be accomplished when a series of one or more approved transactions are sent to the appropriate institution(s) for transfer of the funds or other account settlement.

As illustrated in FIG. 1, a gateway 120 can be included to facilitate routing of transactions, authorizations and settlements to and from the appropriate entity or entities within the transaction-processing network 123. For example, where a merchant accepts credit cards from numerous different institutions, the gateway can use the BIN (Bank Identification Number) obtained from token 101 and passed to gateway 120 to route the transaction to the institution(s) associated with the given BIN. As illustrated by flow arrow 122, not all transactions are necessarily routed through a gateway 120. Transactions may take other paths to the appropriate entity or entities in the transaction-processing network 123. Additionally, the term gateway as used herein is not restricted to conventional gateway applications, but is broad enough to encompass any server or computing system configured to perform any or all of the described functionality. The term gateway is used for convenience only.

Although transaction-processing network 123 is illustrated using only one block in the example block diagram environment of FIG. 1, this block can represent a single entity to which the transaction is routed for authorization or settlement, or a network of entities that may be involved with authorization and settlement. Communications among the various components in the example environment can be wired or wireless transmissions using a variety of communication technologies formats and protocols as may be deemed appropriate for the given environment. As one example, the currently available credit card processing network and protocol structure can be utilized as the environment with which embodiments of the invention can be implemented. In fact, in one embodiment of the invention, various features and functions of the invention can be implemented within current or legacy transaction-processing networks to provide enhanced features while reducing the level of change or upgrade required to the networking infrastructure.

Having thus described an example environment, the present invention is from time-to-time described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

The present invention is directed toward a system and method for facilitating token access, and in one embodiment, providing enhanced security measures for token access. Particularly, in terms of the example and related environments, one embodiment provides security measures for financial transactions. One embodiment in this example application provides for encryption of some or all of the token data (credit card, charge card, debit card or other tokens) prior to transmission to the financial networks for authorization or settlement. Decryption can be performed at one or more appropriate points along the transaction path to recover some or all of the original data to enable the financial institution to determine whether to authorize the transaction or to conclude the settlement process.

Figure 2:
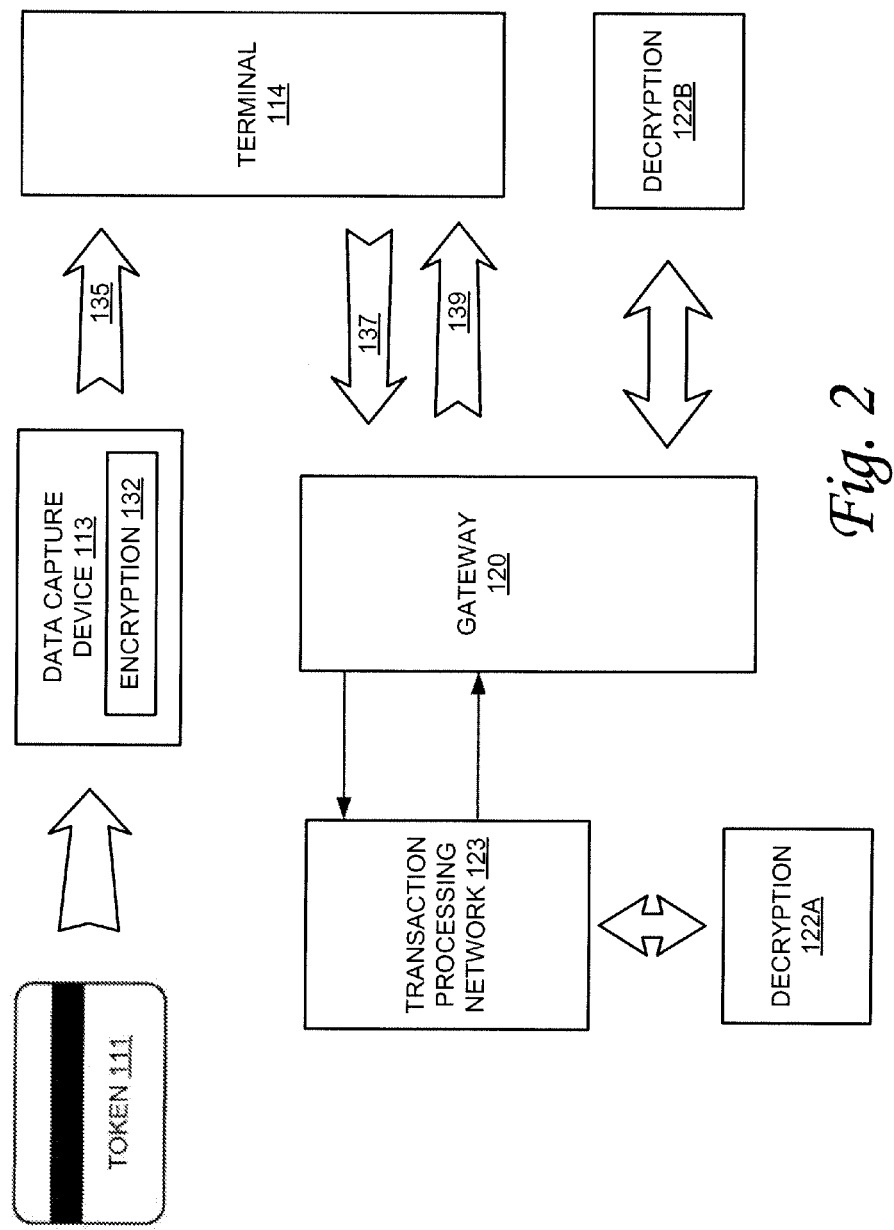
FIG. 2 is a diagram illustrating an implementation of features that can be associated with the invention in accordance with one embodiment of the invention.
Figure 3:
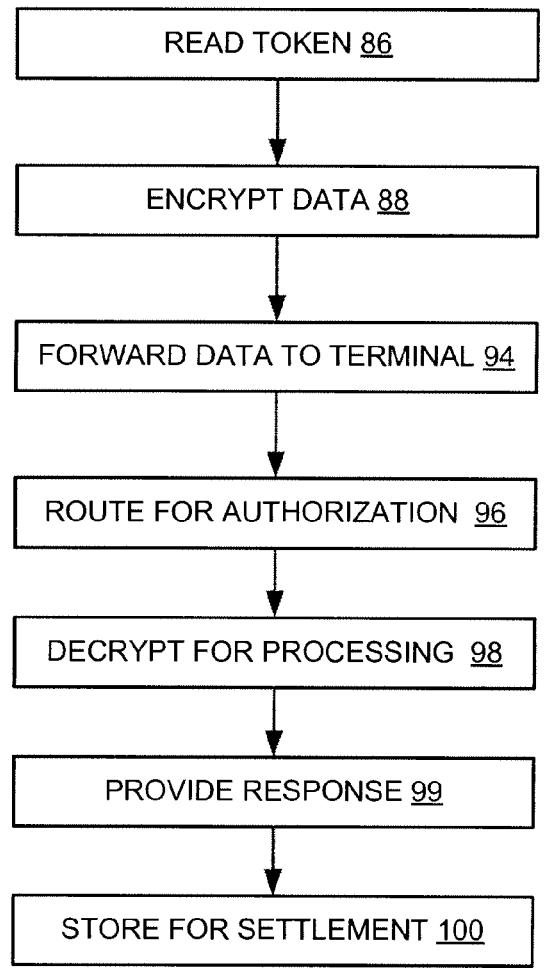
FIG. 3 is an operational flow diagram illustrating a process for enabling secure token transactions in accordance with one embodiment of the invention.

FIGS. 2 and 3 are diagrams illustrating an example implementation of features and functionality associated with embodiments of the invention in terms of the example environment. FIG. 2 is a diagram illustrating an implementation of features that can be associated with the invention in accordance with one embodiment of the invention. FIG. 3 is an operational flow diagram illustrating a process for enabling secure token transactions in accordance with one embodiment of the invention. Referring now to FIGS. 2 and 3, in a Step 86, data from a token 111 is read by a data capture device 113. As discussed above, a token 111 can take on any of the number of different forms, including the examples discussed above with reference to a token 101 in FIG. 1.

Additionally, in one embodiment, the data encoded in token 111 can be encrypted during the fabrication or creation of token 111 or in the writing of the data onto token 111. Although token data can be referred to as being "on" for "in" a token, or encoded "onto" or "into" a token, such as token 111, these terms are not meant to imply or require a particular physical structure for encoding the token with data.

In a Step 88, an encryption module 132, which can include one or more encryption algorithms, is used to encrypt some or all of the token data. Although the encryption in accordance with the invention can take place at a number of different points along the data stream, it is preferable for security purposes that the encryption takes place as soon as possible or practical in the data read cycle. Therefore, in one embodiment of the invention, the encryption module is in the data path immediately following the data capture. Preferably, then, the data can be encrypted as soon as it is read to enhance the security of the system.

To further enhance security, and provide safeguards against copying, skimming or other tampering, encryption module 132 can be encased in the same housing as the data capture assembly. Further, they can be encased in epoxy and steel, or other tamper-safe components to provide safeguards against tampering. Thus, in one embodiment, the entire data capture device can be encapsulated in a tamper-resistant package. As a particular example of this, consider an example application of the invention to facilitate secure credit card transactions. In this example application, a data capture device 113 can be implemented as a magnetic stripe reader with magnetic read or read/write heads used to extract data from the token 111. In this embodiment, encryption module 132 can be encapsulated with the magnetic heads using epoxy or other potting or sealing materials as well as steel or strong casing materials to provide safeguards against tampering with the unit. For example, the encryption module 132 and the read heads can be encapsulated in such a way that it would be difficult or impossible for a would-be tamperer to disassemble the unit to tap into the clear text data stream, or to reverse engineer the encryption algorithms, or to steal the encryption keys, without damaging the unit or leaving signs of tampering. As a further example, encryption module 132 can be implemented on a single substrate or in a single chip and packaged with the read head. Additionally, data detection circuitry and amplifiers (or other data read electronics) can likewise be included in the same chip package. The encryption module can be further implemented such that it does not store or transmit clear text account information to further help secure the information.

In another embodiment, pins or other contacts can be provided at predetermined locations in the package. The epoxy, resin, or other potting material can be a conductive material, thus creating a current path between and among the pins. Control logic in the head (for example, the processor) can measure the resistance across various paths between various pairs of pins. Thus, if an attempt is made to open the device or to probe the circuitry to obtain keys, algorithms or other encryption information, the resistance between one or more pairs of contacts will be changed. As such, intrusion can be detected. In one embodiment, the resistance values are used as a key by the processor to generate the encryption keys or other information. Thus, if the potting material is tampered with, the resistance changes, which changes the key, which affects the keys that the processor ultimately generates. As such, the encryption module will no longer generate valid encrypted data. Additionally, because the encryption keys are generated by the control logic using the key based on the resistance values, the encryption keys themselves are not available until generated. In use, they can be generated in realtime such that valid keys are not stored in the head. Not storing the keys adds a further measure of security. Various alternative contact configurations can be provided. For example, varying length pins can be provided around the periphery of the circuit board that houses the control logic. In one embodiment, pins ranging from approximately ½ mm to 1 mm are provided in an array or about the periphery and in contact with the potting material. In one embodiment, A/D ports of a processor can be used to measure the resistance values for the processor. In another embodiment, the contacts can extend into the head side as well. In such an application, if one were to attempt to cut the head to retrieve the keys, the pins would be cut, altering the resistance of the path between them.

In one embodiment, the potting material is created or used in a way that is non-uniform, or otherwise not easily reproduced. Thus, for example, if the material characteristics vary in the manufacturing process or from application to application, the material cannot be easily removed and replaced while retaining functionality to create the correct keys. For example, amorphous or inhomogeneous materials can be used such that the conductive properties of the material may vary across its volume, or from application to application, thereby making the material difficult to remove and replace with the same characteristics. As another example, conductive screens or patterns can be used and embedded in the material to provide unique properties. For example, carbon fiber screens, mylar templates with conductive traces, nanotubes and other conductive elements and patterns can be used.

As such, these packaging and encapsulation techniques can be used to safeguard the integrity of the data stream and the encryption algorithms and keys. Additionally, in this example credit card application and other applications, the head or other data read assembly is typically fabricated with a certain degree of precision to enable accurate read and write operations. As such, removing or tampering with an appropriately packaged device could present difficulties for the would-be tamperer to reassemble the device with the level of accuracy and precision necessary to gain the appropriate read/write capabilities. As such, this example illustrates how encryption module 132 can be integrated with, encapsulated with or otherwise implemented with data capture device 113 to provide certain measures of security against tampering.

As stated above, encryption module 132 can be implemented so as to encrypt some or all of the data associated with token 111. Thus, the data output by the data capture device with the encryption module enabled can include an entire encrypted data stream, or a data stream having a combination of encrypted data and clear text data. In other words, in one embodiment, encryption module can be implemented to selectively encrypt only certain data items of the token data. Additionally, in one embodiment, the invention can be implemented so as to disable encryption module 132 or otherwise bypass encryption module 132 to provide clear text data streams as may be necessary or desirable for a given application.

To better illustrate the process of selectively encrypting some or all of the token data, consider again an example credit card transaction. In such transactions, it may be desirable to encrypt the card account number (or at least a portion thereof) while leaving certain other token information in clear text. As a further example, consider current credit card transactions wherein a customer swipes his or her credit card through a magnetic stripe reader and the information is sent to a terminal 114, such as for example a point of sale terminal, to initiate the transaction. In these transactions, the point of sale terminal forwards the data to the transaction-processing network 123 for authorization and, in many cases, prints a receipt for the customer to sign as well as a receipt for the customer's records.

Because it may be desirable in this and other applications to use certain token information in authorizing the transaction as well as to provide certain of this information on the various receipts, in such applications it may be desirable to leave certain of the token information in the clear to facilitate these operations. Thus, in one embodiment, encryption module 132 can be implemented to provide selective encryption of certain portions of the token data, while leaving other portions of the token data in a clear, or un-encrypted, state. In keeping with the above example, in one embodiment encryption module 132 is implemented so as to encrypt a portion of the account number to provide a certain measure of security to the account information. In one embodiment, encryption can be done using triple DES encryption, although other encryption techniques can be used.

Encryption module 132 in this example implementation can be configured so as to leave the bank identification number and last several digits of the account number in clear text, if desired. This may be desirable in some applications as having a bank identification number in clear text enables the terminal, gateway or other routing components in the system to use this clear-text bank identification number to appropriately route the transaction for approval and settlement. Additionally, leaving the last four digits of the account number in the clear, as illustrated by this example, can allow this information to be printed on receipts as well as to be checked by the cashier or other personnel enabling a physical inspection and comparison. As further example, the customer's name can be left in clear text to allow his or her name to be printed on the receipt or to be viewed on the terminal by the cashier for identification. As another example, in one embodiment, encryption module leaves the first digit of the bank identification number in clear text for recognition by the terminal as representing a valid range. As these examples illustrate, the invention can be implemented so as to select any or all of the token data fields to be encrypted (or portions thereof) as may be desired or required for a given application. Although the term bank identification number or BIN is sometimes used in this document, this term can refer to the traditional BIN used on bank cards, or more generally to any routing character, string or other information used to identify the source of the token or to route transactions. Likewise, the term bank cards can be used to refer to tokens such as, for example, credit cards, debit cards, loyalty cards, payment cards and the like, whether issued by a bank or other entity (for example, American Express, MasterCard, VISA, etc.) or institution, and whether in the form of a magnetic stripe card or otherwise.

In a step 94, the data captured by data capture device 113, and encrypted with encryption module 132, is forwarded to terminal 114 in furtherance of the transaction. In an application in accordance with the example environment, terminal 114 can include a cash register or other point of sale station or terminal, as an example. In other environments, terminal 114 can be implemented as appropriate including, for example, checkpoint terminals, customs station terminals, point of access terminals, point of sale terminals, or other terminal appropriate for the given application.

In the application of a point of sale terminal, the terminal 114 can, in one embodiment, be a card swipe terminal such as, for example, those portable or countertop terminals provided by VERIFONE, INGENICO and others. Other point of sale terminals might include, for example, gas pumps, ATM machines, vending machines, remote pay terminals, and so on. As another example, a terminal might include a token reader in communicative contact with a personal computer or other computing device for purchases such as, for example, internet purchases or for online banking. As a further example, in one embodiment, the terminal can include a magnetic stripe reader (including one or more read heads), a keypad (for example, for PIN entry, or other user entry), and a display. Thus, in this embodiment, the terminal 114 is integrated into the same package or housing as the data capture device 113. The terminal can also be integrated with or in communicative contact with a cash register or other point-of-sale or point-of-access station.

In one embodiment, the data forwarded to terminal 114 is preferably packaged in a manner as may be expected by terminal 114. Thus, any of a number of packaging formats can be adopted for this and other communication channels in the transaction chain. However, in one embodiment, data capture device 113 can be implemented so as to package or format the data in a way that would be compatible with terminals 114 that may have been in use with previously-existing data capture devices that did not include encryption capabilities. As a specific example of this consider again the example application of a credit card transaction. In this example environment, a large number of magnetic stripe readers that provide clear text token data to existing terminals in a particular format that is expected by the terminal are currently in existence. Therefore, the data capture device can be configured to encrypt the data, place the encrypted string into the original location of the clear data that it replaces, recompute the checksum, include any sentinels or LRC and forward to the terminal. The terminal can then handle the transaction as a conventional transaction (for example, unencrypted transaction). In one embodiment, the terminal can check the check data (for example, with parity, LRC and a mod 10 check), which should be correct as it was regenerated by the encryption module using the inserted encrypted string. If the token fails, a bad read status can be output.

Accordingly, simply providing data encryption at the data capture device (e.g. at the magnetic stripe reader) could result in data incompatibility with the terminal, and with the rest of the network in some applications. As such, this embodiment packages the encrypted portions of the data with the clear text portions of the data in the same package format as the data would otherwise be presented to the terminal 114. As such, transactions (credit card transactions in this example) can be carried out in their usual fashion, without requiring terminal upgrades. As a further example of this, consider the example described above, but now assume that the personal account number of a credit card is encrypted as follows: the first six digits, or the bank identification number, are left in clear text, the next six digits are encrypted, and the last four digits of the account number are left in clear text. Thus, in this example, the encryption can be implemented such that the original six digits of the account number that are encrypted are replaced by an identical quantity (i.e. six) of encrypted digits, and these six encrypted digits are placed in the same position as the six clear text digits occurred in the account number of the data stream. As a result, the original packaging format of the Track Data is intact, and the data capture device with the encryption features (whether a new device or a retrofitted device) can be integrated into the network and be compatible with terminals that are expecting data from non-encrypting magnetic stripe readers.

In another embodiment, the encrypted data can be output in the same signal format as that anticipated by conventional terminals. For example, in the example environment, conventional magnetic stripe readers include a read head that reads the magnetic transitions and outputs the data as a string of transitions representing the track data. In such an environment, terminal 114 is expecting to receive a string of transitions in a given signal format (at specified signal levels or ranges) from the head. Accordingly, in this embodiment, encryption module 132 can be further configured to convert the encrypted data stream into a series of transitions at the signal levels expected by the terminal. As such, in this example, this embodiment allows the data capture device 113 to communicate with conventional terminal equipment without the need to change or upgrade the terminals.

Continuing with this example, in one embodiment, the head is configured to read the magnetically encoded data and to output a series of data transitions. The transitions can be converted to a series of characters representing the track data by encryption module 132. Encryption module 132 can further be configured to generate an LRC and check sum, if appropriate to the application. Thus, encryption module 132 creates track data character strings. Encryption module 132 is further configured to parse this track data to select appropriate portions of this data for encryption. For example, encryption module 132 may select portions of the account information for encrypting, while masking other data such as, for example, the BIN and expiration date. In one embodiment, encryption module 132 can be configured to re-package the data so that it is in the same format package as the unencrypted data. Then, encryption module 132 can be configured to convert this data to transitions that would otherwise be output by the read head absent the encryption technology. Thus, in this example, data stream 135 is formatted (both from a layout and signal perspective) in a manner as would expected by terminal 114 from a conventional head.

In embodiments where encryption module is packaged with (or otherwise integrated or included with) the head or other data capture device, the head unit can be used to replacing existing non-encrypting heads with encrypting heads that include the encryption module and that output the data in the same format as the non-encrypting head. Thus, in one embodiment existing terminals or other transaction processing equipment can be easily upgraded to be PCI compliant or to otherwise include encryption functions by swapping out a non-encrypting head with an encrypting head configured to output a compatible data format. Because in this embodiment the output is compatible, the head can be swapped out without impacting terminal 114.

In one embodiment, as discussed the encryption technology can be packaged with head technology into a smart head module package. The encrypting head module can be encapsulated to deter tampering. The head module can include, for example, encapsulated electronics to provide encryption, power management functions, and intelligent interfaces for any terminal/POS environment. The encrypting head can, for example, replace the existing read head in a conventional POS device; be connected externally to the POS device via a RS232 or USB port or other connection, wired or wireless; or be integrated into the device using methods such as I2C or SPI. Once an encrypting head is installed in a terminal, its new functionality can be configured to remain transparent ("hidden"). As further discussed below, the functionality can remain dormant until activated via a command token.

The encrypting head can be configured to encrypt the Track 2 card data selectively based on BIN number and POS/system requirements or otherwise. The data can be tested for accuracy with parity, LRC, and a Mod 10 check. If the card fails the parity or LRC checks, a "bad read" status is output. If the card passes the other checks and passes the Mod 10 check, the card BIN number is used to access the encryption parameters and keys. In one embodiment, each time the terminal head successfully decodes and encrypts card data, a counter can be incremented. In one embodiment, different counters can be established and updated for particular BINs or BIN ranges. In one embodiment, a six-digit counter is sufficient to allow enough "uniqueness" in each transaction. In one embodiment, the two least significant digits are output with the card data (for example, in the PVV (pin verification value) field or other field) for use by the decryption module.

Illustrated in FIG. 2, is a secure data stream 135 in which some or all of the data has been encrypted by encryption module 132 before transmission to terminal 114. In a step 94, secure data stream 135 is forwarded to terminal 114 in furtherance of the transaction. As such, terminal 114 can use or forward some or all of the elements of data stream 135 as appropriate in conducting the transaction. Continuing with the example of a credit card sale, terminal 114, such as a point of sale terminal or a card-swipe terminal, can use this transaction data to obtain authorization for the transaction, obtain user input (for example, press "Yes" to approve the sale) as well as to print the receipts (or communicate with a cash register or other device to print receipts) or otherwise consummate the transaction.

In a step 96, terminal 114 routes the data to the transaction-processing network 123 to obtain authorization or approval for the transaction from one or more entities as appropriate. The data stream 137 routed by terminal 114 can include some or all of the data provided in the secure data stream 135, and can be augmented to provide additional data as may be appropriate for the environment or type of transaction. In one embodiment, transaction data stream 137 is the same data and in the same format as secure data stream 135. In one embodiment, transaction data stream 137 can be formatted by terminal 114 in formats compatible with existing transaction processing equipment or in other formats as may be desirable or appropriate for a given application or network. For example, in one embodiment, a secure data stream 135 can be packaged in conformance with conventional terminal standards and sent to a conventional terminal 114, and processed and output by terminal 114 in accordance with its conventional standards. As another example, data stream 135 can be received by terminal 114 and terminal 114 can be configured to provide the packaging and signal conditioning for compatibility with downstream equipment. In yet another embodiment, to function with legacy transaction processing equipment, a replacement terminal with a compatible data capture device 113 (integrated or otherwise) can be provided to be plug-and-play compatible with the transaction-processing network.

In some environments, the links between terminal 114 and the transaction processor(s) are relatively secure. As such, in one embodiment, terminal 114 can decrypt the data prior to transmission for transaction processing. Although not illustrated, terminal 114 can thus include decryption algorithms and keys used to decrypt the data prior to transmission. The decrypted data can be kept or formatted into in the same format as expected by the transaction processor. Additionally, terminal 114 can include an encryption module to encrypt some or all of the data output by terminal 114. Thus, the data can be encrypted or re-encrypted at the terminal prior to transmission. In one embodiment, the terminal processor, ASIC or other control logic used to decrypt or encrypt the data, and the associated keys, can be packaged in a secure manner such that if it is tampered with, the keys or other encryption information are automatically erased or otherwise destroyed. In another embodiment, the data capture device along with terminal components can be likewise packaged in a secure manner.

Illustrated in the example provided in FIG. 2 is a gateway 120 that also can be used to route the data stream. As discussed above with reference to FIG. 1, a gateway 120 may or may not be involved in the transaction routing depending on the application or transaction and the network configuration and participants, and other parameters such as, for example, the complexity of the network and the routing options available. For example, where multiple terminals 114 can be used to carry out transactions for credit cards from a plurality of issuing authorities, a gateway functionality can be useful to route the transaction data among the terminals and the elements of the transaction-processing network.

As also discussed above with reference to FIG. 1, as used herein, the term "gateway" is broadly used to describe an entity, such as a server or other processing system, in the transaction stream that can be included to perform functions such as, for example, routing, interfacing, format or protocol conversion, storage, buffering and so on. For example, in one embodiment a gateway can be equipped for interfacing various terminals 114 with transaction-processing network 123 or with various entities in transaction-processing network 123. Further, in one embodiment, a gateway can be included to provide interfaces among various entities involved in the transaction. In terms of the example environment, a gateway may provide a common interface between a plurality of merchants and their terminals 114 on the one hand, and various banks, institutions or other entities on the other hand. Functionality that might be included in a gateway 120 can be, for example, protocol translation, data formatting, impedance matching, rate conversion, fault isolation, signal translation, buffering and storage, routing, or other functions as necessary or useful to provide interoperability or communications among transaction participants.

Gateways can be implemented using hardware software or a combination thereof. In one embodiment, gateway 120 is implemented as one or more processing devices configured to run software applications for the gateway functionality. In one or more embodiments discussed in this document, functions such as encryption, decryption, key storage and other related functions are at times discussed as being performed at or by a gateway. This description encompasses implementations where functions are performed using a separate module or appliance called by or otherwise accessed by the gateway. For example, in one or more embodiments, these functions are described as being performed by a secure transaction module that can be either a part of the gateway or accessed by the gateway. As will be apparent to one of ordinary skill in the art after reading this description, such discussion can indicate that the same devices that perform gateway functionality can also include hardware or software modules used to perform these encryption, decryption or other functions as well.

Alternatively, separate modules can be in communicative contact with the gateways and their functions called, accessed or used by the gateway to perform the encryption, decryption or other related functions. Indeed, in one embodiment, one or more separate appliances are provided to perform various decryption, encryption, key storage and updating and other functions, and the appropriate transaction data routed to the appropriate appliance for processing. Such appliances can themselves be implemented using hardware software or a combination thereof, and can be coupled in communicative contact with the gateway. As discussed herein, such appliances (sometimes also referred to as secure transaction modules) can be associated with entities other than the gateway, including issuing banks, acquiring banks, clearing houses, merchants and other entities that may be associated with, the transaction-processing network 123.

In a step 98, the encrypted information is decrypted for processing of the transaction. In the example illustrated in FIG. 2, the transaction data stream or other appropriate transaction data is routed to the transaction-processing network 123 entity or entities that will perform the authorization or other approval. In this example illustrated, the decryption occurs in this network or at this institution such that the clear text information can be recovered to facilitate transaction processing. The invention can be implemented so as to provide the decryption functions at any point in the transaction process as may be appropriate or desired for given security purposes. For example, once the transaction data reaches a secure processing network, it may be appropriate to decrypt the data within that network and handle the data as clear text because the network is secure. As another example, once the transaction reaches a clearing house, a secure transaction module can decrypt the information at or for the clearing house, and the transaction forwarded to the issuing bank for consummation. As yet another example, the transaction can remain encrypted until it reaches the issuing bank and can be decrypted at the issuing bank for processing. Where information is decrypted for handling or other processing (or for other purposes) prior to reaching its final destination, that information can be re-encrypted for subsequent transmissions.

As another example, connections between the gateway 120 and the transaction-processing network 123 may themselves be secure connections. In such situations, it may be desirable to decrypt some or all of the transaction data stream at gateway 120 prior to routing to the transaction-processing network 123. In furtherance of this example, consider a credit card transaction in which the entire account information is encrypted. It may be desirable in such a situation to have the gateway decrypt the account information to obtain the bank identification number to facilitate routing. With a secure connection, the decrypted information can be left in the clear for transfer to the transaction-processing network 123. In another embodiment, the gateway can be configured to re-encrypt some or all of the decrypted information prior to routing.

As another example, even where the routing data is clear, it may be desirable to have a secure transaction module available at the gateway to decrypt the transactions routed by that gateway. As such, a centralized (or somewhat centralized in the case of multiple gateways) decryption process can be implemented to handle decryption in one location (or in predetermined locations) for multiple transactions for multiple merchants and multiple issuers. In such an application, centralized decryption can be implemented to provide centralized key management or centralized of other encryption algorithms or information.

Thus, to illustrate two of the possible decryption-placement scenarios, a decryption module is illustrated as decryption module 122A associated with transaction-processing network 123 and a decryption module 122B associated gateway 120. As these examples serve to illustrate, decryption of some or all of the information can be performed at one or more points along the network as may be appropriate for a given transaction. As also discussed in further detail below, various levels of encryption and decryption using one or more keys for portions of the data can be included to facilitate routing and handling of transactions in a secure manner.

For example, the gateway can be configured to decrypt the transaction data stream, determine the routing or other gateway-specific information (for example reading the bank identification number for routing), and re-encrypt the data before forwarding it along to the transaction-processing network 123. Additionally, in another embodiment as discussed above where the bank identification number, or a portion thereof, may be left in clear text, the gateway or other network components can be implemented to route the transaction based on the clear-text bank identification number such that interim decryption and re-encryption is not used to determine this routing.

In another embodiment, where the secure transaction module is configured to decrypt account information, the secure transaction module can be configured so as to not store clear text account information for security purposes. Thus, in this embodiment, the appliance can be configured to receive encrypted information, perform a decryption and forward the clear text information without storing a local copy of clear text information. In one embodiment, however, hashes of the account information or other token data can be maintained at the secure transaction module to enable the module to check for duplicate transactions. In another embodiment, the secure transaction module can be configured to provide data for reporting or record keeping purposes. For example, the secure transaction module can provide hashes, transaction amounts, merchant IDs, terminal IDs, transaction dates, etc. for reporting transaction information or other data.

In one embodiment, each encrypted transaction from a merchant that is "hashed" would generate a unique hash code since each encrypted swipe is unique. The hash stored in the secure transaction module could be used to verify that subsequent encrypted transactions are not "replays" of an earlier transaction. This concept would work, however, in an implementation where "merchant A" and "merchant B" may not use the same gateway, a duplicate H-TDES transaction may not be caught since the hash would be stored in separate gateways. Therefore, in one embodiment, secure transaction modules at various gateways (or elsewhere in the processing network) may be configured to share generated hash codes (share information with one another or provide them to a central repository, for example) for comparison purposes to detect fraudulent transactions. The same situation can hold true when signature detection is implemented. Signature detection in one embodiment generates a unique identifier or data stream to represent the original card. To detection of a skimmed card or other fraudulent activities, signature data can be shared among secure transaction modules.

In one embodiment, the bank identification number or other processing information can be encrypted with a first key and account or other information encrypted with a second key. In this embodiment, the gateway or other designated entity can be provided with the first key such that it can decrypt the bank identification number or other transaction processing information that it may use in providing its services in the transaction. For example, where the bank identification number is encrypted and the gateway holds the keys (for example using a secure transaction module), transactions are routed to the gateway to decipher the bank identification number and determine routing. In one embodiment, routing of transactions can be determined based on which entities hold the keys. Additionally, because the account number or other information is encrypted with a second key, this information is not decrypted by the gateway but is passed along in encrypted form to facilitate the transaction. With this embodiment, it can be implemented such that the second key is not stored at the gateway or otherwise maintained at the gateway thus, making it more difficult for the account information to be compromised at the gateway. As such, in one embodiment, the system can be implemented such that the second encryption key is only stored at the transaction-processing network to provide an enhanced measure of security for the account information. As another example, all but the first digit of the BIN can be encrypted. Leaving the first digit of the BIN in the clear can be used to facilitate routing by the terminal or other processing device.

As another example, in one embodiment, there can be a plurality of keys to manage different encryption functions. Furthermore, in one embodiment, the invention can be implemented such that the level and type of encryption performed by the encryption module is managed through various keys and also, in some instances, through command tokens (discussed further below). Thus, in one embodiment, a hierarchy key management can be established to include primary keys, OEM keys, merchant keys and terminal keys. In one embodiment, the primary keys can be used during the manufacture of encryption modules to manage serial numbers, and used to generate and enable the OEM key and command card. The OEM key can be used to generate command cards for various levels of encryption (for example, for various BIN ranges); and can also be used to generate and enable the merchant key and command card. The merchant key can be configured to use the same key and command card for all of a merchant's terminals, enabling the terminals to encrypt the Primary Account Number, for example. The merchant key can also be used to generate and enable the terminal key and command card. The terminal key can be used in conjunction with a corresponding command card to delineate which discretionary data to encrypt in each of the tracks.

In one embodiment, keys can be automatically managed and maintained by a key management module, which can be used as a service or as an appliance. As a service, keys can be remotely managed by merchants. Each merchant's terminal or group of terminals can be assigned a unique key that is used to decrypt the encrypted card data.

As these examples serve to illustrate, a number of different encryption and decryption scenarios can be provided, encrypting various portions of the data with various keys as well as providing appropriate decryption or re-encryption along the way, as may be appropriate for a given application or for the desired level of security or privacy in some or all of the data.

In a step 99, an authorization response is provided from the transaction-processing network 123 indicating the status of the authorization. For example, where the transaction is approved, such authorization is transmitted to terminal 114 and can be stored at the terminal or in a storage device associated with the terminal for record-keeping purposes or further transactions. For example, considering again the application in a credit card transaction, when the initial transaction is carried out, terminal 114 typically seeks authorization from the transaction-processing network 123 and, once authorized, stores transaction information in a data file or other database for later settlement of the transaction. Thus, in this example, terminal 114 could store information associated with the authorized transaction for later settlement as illustrated by step 100.

In one embodiment, an administrative toolkit can be provided for remote management of terminals and services. A variety of access mechanisms can be provided including, for example, an XML API that provides an interface for entities to extract critical reporting information from the secure transaction module and key management module, as well as providing the ability to manage terminal statuses remotely with or without the use of command cards. The reporting data available through the API can include information such as: vital statistics for the terminals, the security integrity of the terminals, the number of swipes per terminal, the number of rejected credit cards, and various other key metrics.

Figure 4:
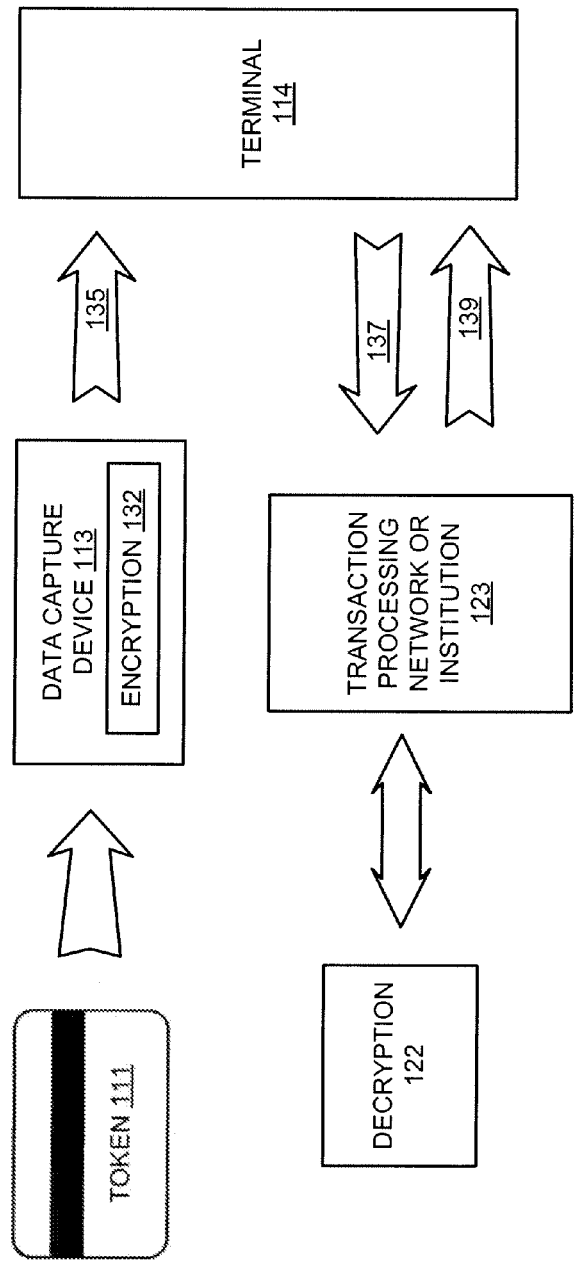
FIG. 4 is a diagram illustrating an example in which a transaction can be processed with the use of a gateway for routing in accordance with one embodiment of the invention.

FIG. 4 is a diagram illustrating an example in which a transaction can be processed with the use of a gateway for routing in accordance with one embodiment of the invention. As discussed above, transaction data stream 137 is routed to the transaction-processing network 123 for processing of the transaction, decryption 122 can take place at an appropriate point in the transaction-processing network to ensure security of the transaction data. The appropriate authorization response 139 can then be sent back to the terminal in furtherance of the transaction.

Figure 5:
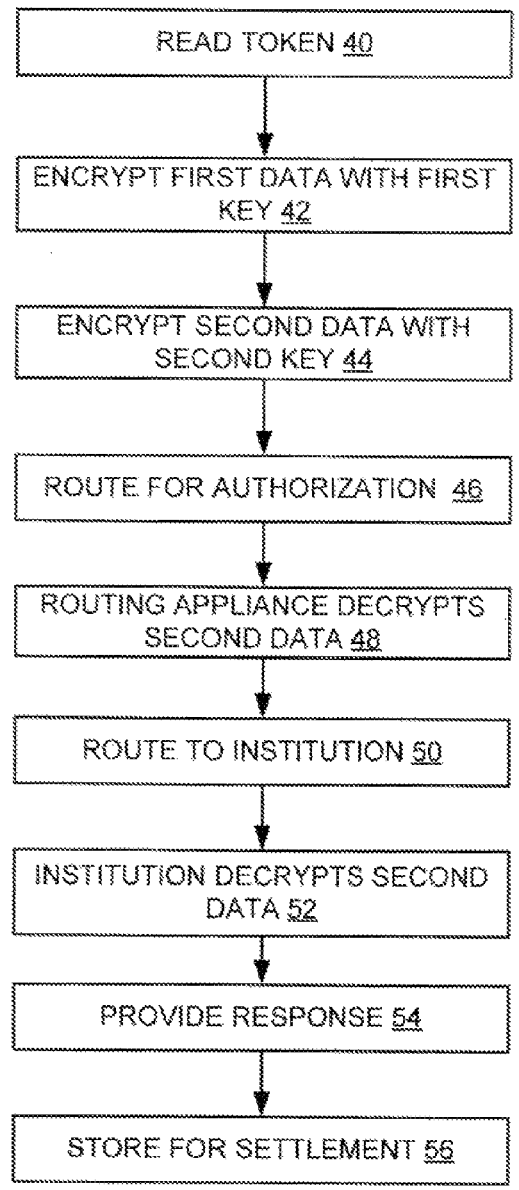
FIG. 5 is an operational flow diagram illustrating an example process using multiple encryption keys to handle a transaction in accordance with one embodiment of the invention.

As discussed above, various scenarios can be implemented to provide encryption of some or all of the token data with one or more keys, and decryption at appropriate points in the transaction processing chain to facilitate secure handling of transactions. To illustrate this feature further, another example embodiment is now described. To provide further illustration of this example embodiment, it is discussed in terms of the example environment and more particularly in terms of a credit card transaction. FIG. 5 is an operational flow diagram illustrating an example process using multiple encryption keys to handle a transaction in accordance with one embodiment of the invention. Referring now to FIG. 5, in a step 40, the token is read. Particularly in terms of this example, the token that is read in a step 40 is a credit card, and more particularly the Track 1 and 2 data can be read from the credit card by a magnetic stripe reader or other data capture device 103.

In a step 42, a portion of the credit card data is encrypted with a first key. Particularly, in this example, the primary account number (referred to as a PAN in some applications) read from the token is encrypted with the first key. As discussed above, in one embodiment, only a portion of the account number, or PAN, is encrypted while other portions are left unencrypted. The first key that can be used to encrypt the account number (or a portion thereof) can be selected by any of a number of techniques and properly distributed to the appropriate decryption device to facilitate data handling. In one embodiment, a terminal ID is used for the first encryption key. That is, either the terminal ID itself is the first key or the terminal ID can be used to generate or otherwise identify the first key for encrypting this portion of the account number. For example, the terminal ID can be used with a random number generator, substitution table or other algorithm to generate a key. As another example, the terminal ID can be used as an address or other identifier of the appropriate key stored in a table or database. Using the terminal ID as the encryption key or as a way to identify the encryption key can provide flexibility and features as further described below.

In a step 44, in this embodiment another encryption takes place. Particularly, in this embodiment, a different portion of the account number is encrypted with a second key. For example, the bank identification number, or a portion thereof, is encrypted using the second key. In some applications, the bank identification number (sometimes referred to as a BIN) is part of the account number. In some credit cards, for example, the BIN is the first six digits of the account number.

In one embodiment, the second key can be a key based on the merchant ID, or it can be some other key as may be appropriately selected and distributed. A key based on the merchant ID can be the merchant ID itself or a key generated from or identified by the merchant ID (as discussed above with respect to the Terminal ID). As such, as a result of steps 42 and 44, the token data is encrypted in such a way that a part of the account number is encrypted with a first key (for example, from the terminal ID) and the bank identification number is encrypted with a second key (for example, from the merchant ID).

In the step 46, the properly encoded data is routed for authorization. This data can be packaged so as to be compatible with various data formats, including conventional bank card transaction formats. Additionally, in one embodiment the data can be output at signal levels expected by terminal 114. This data may or may not be altered by a terminal such as terminal 114, depending on the transaction.

In this example, a gateway 120 is used to facilitate the routing of transactions. As such, in this example, the data is routed to the gateway 120 for further handling. Because the encryption in this example takes place at the data capture device 113, routing from the point of sale, point of authorization, or other terminal 114 might, in one embodiment, be accomplished via un-secure networks as some or all of the account information has been encrypted with one or more keys.

Although the routing appliance used in transaction processing in this and other examples is described as a gateway, any of a number of routing appliances, modules or mechanisms can be implemented or utilized to facilitate transaction routing or handling as may be deemed appropriate for a given application or environment. Thus, the term gateway, is used to generally describe such appliances or modules.

In a step 48, gateway 120 receives the transaction data and proceeds to determine appropriate routing for the transaction such that the transaction can be processed. Because, in this example, the bank identification number is encrypted, and it is this number that is used to determine routing, the gateway first decrypts the bank identification number such that the true bank identification number can be determined for routing. For example, the gateway can perform the decryption by sending the information to a secure transaction module for decryption. Once decrypted, gateway 120 routes the transaction to the appropriate institution as depicted by a step 50. In one embodiment, the gateway can re-encrypt the bank identification number using the same or different key.

Note that in one embodiment described above, the bank identification number was encrypted with a key based on the merchant ID. Thus, the gateway can use information about the merchant included with the transaction data to perform the decryption of the bank identification number as appropriate. For example, the gateway may be provided with a database of encryption keys indexed by merchant ID numbers. As such, the gateway can use the appropriate merchant ID to retrieve the appropriate decryption key from the table to perform the bank-identification-number decryption. In another example, where the merchant ID is used to create the encryption key, a similar algorithm can be provided at the gateway to generate the correct decryption key based on the merchant ID to perform the BIN decryption.

Prior to routing the transaction to the appropriate institution, gateway 120 can either re-encrypt the BIN or leave it in clear text as may be appropriate or desired for the transaction. Note that in one embodiment, it is preferred that the secure transaction module at the gateway not have access to the first key that is used to encrypt the remainder of the account information. As such, a measure of security can be provided to prohibit or deter decryption of the sensitive account information at the gateway 120. Stated another way, using separate keys to encrypt respective portions of information, enables the use and distribution of keys that can provide the ability to control selective decryption of the information at various points in the transaction network.

In a step 52, the appropriate institution receives the transaction routed by the gateway and decrypts the first portion of the account number with the first key. Following with the above example, where the first key is based on the terminal ID, the institution can use information about the terminal ID to recreate the key and provide the appropriate decryption. Once decrypted, the institution can determine whether to authorize the transaction and provide an appropriate response as illustrated in step 54. Thus, the terminal ID (which can refer to an ID of the data capture device or of the terminal 114), or other identifier, is, in one embodiment, appended to the data stream to enable the decrypting appliance (at the authorizing institution in this example) to identify the terminal ID and thus obtain the correct key for decryption.

In a step 56, the terminal can store the transaction for later settlement. For example, in terms of the example credit card transaction, the authorization can be stored for batch settlement purposes. Because, in this scenario, the terminal only had access to the information as encrypted by the data capture device, the information stored in the settlement file for later settlement remains encrypted. Thus, the system can be implemented to maintain or enhance data security during subsequent batch settlement or other settlement operations.

Figure 6:
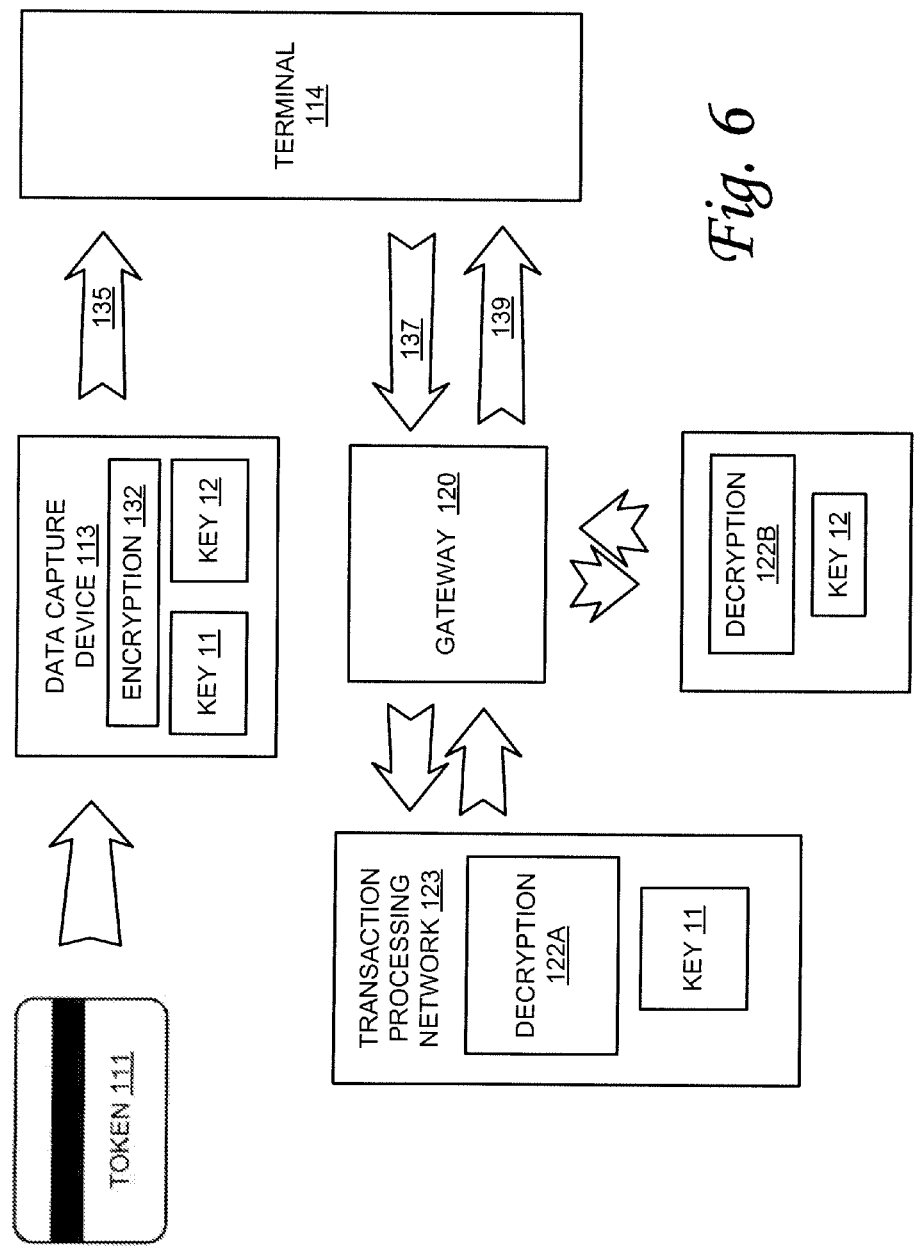
FIG. 6 is a block diagram illustrating one example implementation of encryption and decryption of multiple components of token data using separate keys for each component.

FIG. 6 is a block diagram illustrating one example implementation of encryption and decryption of multiple components of token data using separate keys for each component. Referring now to FIG. 6, and keeping with the example described above with respect to FIG. 5, encryption module 132 has access to and utilizes at least two keys, key 11 and key 12. In a given application, there may be many more keys available to encryption module 132 depending on the actual implementation. However, to conform to the example described above wherein a portion of the account number was encrypted with a first key, and the bank identification was encrypted with a second key, two keys, key 11 and key 12, are illustrated and used.

Still following the above example, encryption module 132 uses key 11 to encrypt a portion of the account number (for example, a portion of the PAN), to provide a measure of security in the account number. Encryption module 132 uses key 12 to encrypt the bank identification number (for example, another portion of the PAN) to provide additional security to the token data. In applications where the bank identification number, or other similar number, is part of the account number, this encryption also provides additional security for the account number. The data is packaged and sent as secure transaction data to the terminal in furtherance of the transaction.

In this and other embodiments, either or both encryption steps need not be performed at the data capture device 113, and can instead be performed by terminal 114 or at another point along the communication channel. However, as described above, in a preferred embodiment encryption is performed as close to the origin of the data as possible or practical to better secure the information.

Continuing with the above example, terminal 114 routes the transaction data for processing by the appropriate institution or institutions. In keeping with the example environment, routing can be accomplished through a gateway 120, or other instrumentality, and onto a transaction-processing network 123, which can include one or more entities to perform authorization or settlement functions. As discussed above with reference to FIG. 5, gateway 120 decrypts the portion of the data containing the bank identification number (or other routing data in other embodiments) utilizing the appropriate key. Thus, a decryption module 128B and the appropriate key 12 are illustrated as being a part of, or otherwise associated with gateway 120. Decryption module 122B accesses the appropriate key 12 to perform the appropriate description.

Although only one key is illustrated as accessible by gateway 120, other embodiments may include additional keys that can be accessed by gateway 120 in the service of transactions. For example, a given gateway 120 may service more than one merchant and each merchant may have his or her own set of keys. Carrying this example further, each merchant may have multiple terminals 114 and multiple data capture devices 113. Further, in embodiments where terminal IDs and merchant IDs can be used as unique keys for given terminals and merchants, respectively, a gateway 120 handling these transactions might be provided with multiple keys to enable decryption and routing of the various transaction data from the plurality of sources.

As this example illustrates, regardless of the particular encryption and decryption scenarios implemented, embodiments can exist wherein the gateway 120, transaction-processing network 123 and encryption module 132 can each have access to a plurality of keys as might be appropriate for a given configuration.

Continuing with the example discussed above with reference to FIG. 5, having determined appropriate routing, gateway 120 now routes the transaction data to transaction-processing network 123 for appropriate action. Because the portion of the account number encrypted with the first key was not decrypted by the gateway, this data remains as encrypted text, and thus a measure of security is maintained with respect to this data. Additionally, in one embodiment, gateway 120 can re-encrypt the bank identification number (or other data that may have been decrypted at gateway 120) to provide additional security during communication to transaction-processing network 123. Such re-encryption can be performed using the same or different keys.

At transaction-processing network 123, decryption module 122A can retrieve the appropriate key, in this example key 11, to decrypt the remainder of the account number to further process the transaction. Additionally, in embodiments where gateway 120 may re-encrypt the bank identification number and that data is needed to resolve the transaction, transaction-processing network 123 can also decrypt that portion of the data to complete the transaction. In such case, transaction-processing network 123 may have available to it the appropriate key for such decryption such as in this embodiment where separate keys are used.

As discussed above with respect to gateway 120, transaction-processing network 123 may have plurality of keys for scenarios such as where transaction-processing network 123 processes transactions for a plurality of merchants, terminals, data capture devices and so on. As discussed above, transaction-processing network 123 can be comprised of a single entity to process a transaction or a plurality of entities with some level of interconnection therebetween. Thus, where transaction-processing network 123 includes multiple entities, transaction data may be sent from one entity to another within the transaction-processing network 123 to process the transaction appropriately. As such, decryption within transaction-processing network 123 can be placed with any of these entities as may be appropriate for the given network, configuration or scenario. For example, in one embodiment, where transaction-processing network 123 comprises a plurality of entities with secure communications therebetween, it may be desirable to decrypt the information upon entry to the network as the network is a secure network and the clear text communication can be freely shared among the appropriate entities. Alternatively, decryption and re-encryption may take place as appropriate to utilize the data at a given entity, and resecure the data prior to communication to another entity over a communication channel.

In one embodiment, the system can be configured to route transactions directly from terminal 114 to a designated processing entity. For example, the system can be configured such that terminal 114 can route a designated transaction to a payment processor, to an issuing bank, acquiring bank or other designated entity. The routing can be performed through a gateway or other interim server, but the routing path, at least to some extent, can be predetermined. For example, using BIN ranges, or other data identifiers, a routing path for a token or group of tokens can be designated. As a further example, an issuer may designate that transactions for certain of its cards be routed directly to the issuing bank, bypassing payment processing clearing services.

Secure transaction modules can be implemented in a variety of ways to accomplish the desired features and functionality described herein. In one embodiment, the secure transaction module is configured to receive the following information from the gateway to conduct a transaction:

Gateway Identifier/Key
Host Identifier (ID)
Merchant ID
Terminal Number
Track I
Track II
Track III These elements are further described in one embodiment. Gateway Key element can be a pre-defined key that is passed by the gateway to the secure transaction module to ensure the service is not being executed outside the gateway's location. The Host Identifier can be a host (gateway) provided internal Transaction ID that is passed back with the response message. It can be used, for example, for the gateway's insurance that the response message is for the transaction that was previously posted to the secure transaction module. The Merchant ID and Terminal ID can be provided by the terminal or generated by the gateway (for example, after the Gateway receives the transaction from the Terminal/POS device). In one embodiment, clear text track data is returned as is, and encrypted data is decrypted as specified and returned.

In one embodiment, the secure transaction module can be configured to send data to a transaction monitoring module. The transaction monitoring module can be configured as a master database for secure transactions. In one embodiment, the database does not contain personal information or credit card data that could be used for identity theft or fraudulent transactions. For example, in one embodiment, the secure transaction module provides the transaction monitoring module with information such as:

Transaction Date/Time

Originator ID (what gateway, processor, etc, created the source data)

Merchant ID (or a hash of the Merchant ID . . . to be determined)

Terminal ID (or a hash of the Terminal ID . . . to be determined)

Auth #

Ref #

Hash of the Encrypted Track data

Hash of the Encrypted PAN

Hash of the Decrypted PAN

Transaction Amount

Transaction Type (Credit Sale, Debit, Void, Refund, Command Card, etc)

*Encrypted Transaction Flag

Note that in one embodiment each transaction is routed through the secure transaction module. In some applications, this is desired or required because the gateway cannot determine whether a transaction is an encrypted transaction or a clear text transaction and the secure transaction module makes this determination. Therefore, in such an embodiment, the secure transaction module can also be capturing "clear text transactions" to determine which merchants are using encryption. For merchants that are using encryption, secure transaction module can determine whether they are using other terminals that are not using encryption. The secure transaction module can also be configured to determine whether an enabled terminal is has its encrypting "turned off" and now is no longer encrypting.

Figure 7:
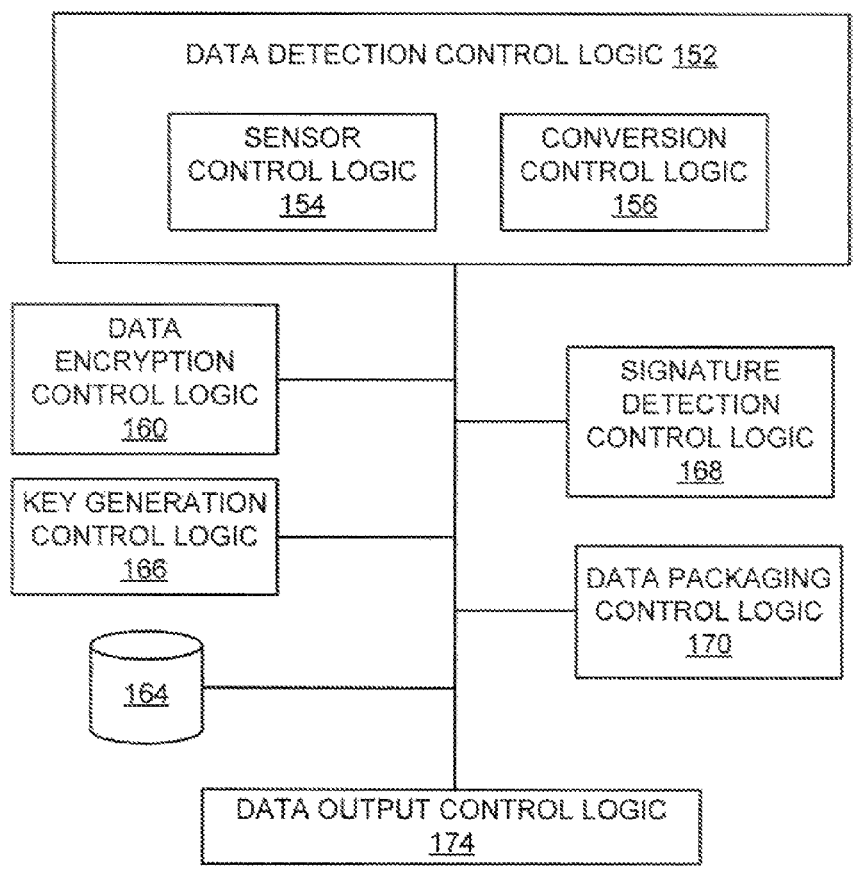
FIG. 7 is a block diagram illustrating an example configuration for a data capture device such as, for example, data capture device 113, in accordance with one embodiment of the invention.

As discussed throughout this document, various embodiments of the invention contemplate providing data encryption functionality as close to, or at the point of, data detection to provide additional security. As discussed with respect to magnetic stripe token environments, such an embodiment can be implemented to provide data encryption at the data detection circuitry or other control logic that is used to ascertain data from the magnetic field patterns detected by the read heads. FIG. 7 is a block diagram illustrating an example configuration for a data capture device such as, for example, data capture device 113, in accordance with one embodiment of the invention. Referring now to FIG. 7, the data capture device in the illustrated example includes data detection control logic 152 that is used to detect data from token 111. Preferably, in one embodiment, data detection control logic 152 is configured to read or otherwise detect the data from token 111, and if appropriate, to convert the data into a usable form.

As such, one embodiment of data detection control logic 152 includes sensor control logic 154 and data conversion control logic 156. In such an embodiment, sensor control logic 154 can be configured to sense, detect or otherwise read the data from the token 111, and to pass electronic signals representing this data to conversion control logic 156. Conversion control logic 156 can be configured to convert, reformat, or otherwise alter the data such that it is compatible with downstream components. For example, consider again the scenario where the example token includes a magnetic stripe with data encoded thereon. In such an embodiment, sensor control logic 154 can be implemented utilizing technology such as, for example, magnetic transducers to read the magnetic information encoded into the stripe. Because the output of the magnetic transducer can be an analog signal, or may otherwise have characteristics or properties that make it incompatible with data handling control logic, one embodiment can also include conversion control logic 156 to properly format or convert the data. For example, conversion control logic 156 can include analog to digital converters to convert the detected data to a digital data stream compatible with digital logic circuitry.

In the above example, sensor control logic 154 included magnetic transducers to read magnetic stripe data. As this example illustrates, in other applications, other control logic can be utilized to scan, read, or otherwise extract the data from token 111, depending on the type or format of data at token 111. For example, sensor control logic 154 can include optical sensors to read optical data elements (including, for example, bar codes), RFID transponders, near-field communication devices, or other like transponders to read inductive elements, and others. In one embodiment, data from tokens 111 using formats different from traditional bank-card track data can be converted into track data by the data capture device or by the terminal. For example, a data capture device configured to receive a contactless token (e.g., an RFID token) may accept the data, encrypt it, and format it into track data prior to sending to terminal 114. In another embodiment, terminal 114 may accept data in formats other than track data and properly package the data for the downstream processing equipment.

Regardless of whether an embodiment includes sensor control logic 154 and conversion control logic 156, it is preferable that data detection control logic 152 output data in a format that is compatible with downstream circuitry such as, for example, data encryption control logic 160. As discussed with respect to various embodiments herein, a data capture device 113 can be implemented to include the feature to encrypt some or all of the data detected from the token 111. As such, data encryption control logic 160 can be included to encrypt the designated data items to provide a measure of data security. Any of a variety of encryption algorithms can be used to perform the data encryption on some or all of the data items. Additionally, memory or other data storage 164 can be provided to maintain one or more encryption keys that may be used in the encryption process or to store other data or information as may be desired.

In one embodiment, keys can be generated locally at the data capture device 113. In another embodiment, keys can be downloaded or otherwise provided to data capture device 113 for inclusion in storage 164. Therefore, in one embodiment, key generation control logic 166 can be included to provide functionality to generate keys for use in the encryption process. For example, as discussed in greater detail below, command cards and other techniques can be used to prompt the system to generate a new key. As such, key generation control logic 166 can responsively generate the key and provide it to a key storage 164 for use by data encryption control logic 160.

As discussed above, in one embodiment data encryption control logic is sufficiently encapsulated with data detection control logic 152 to provide a measure of security against tampering with the device. Additionally, key storage 164 and key generation algorithm control logic 166 can likewise be encapsulated in the same module to provide a measure of security against the theft of keys or key generation algorithms. Indeed, in one embodiment, any or all of the functionality described with reference to FIG. 7 can be encapsulated with the head. Although not illustrated in FIG. 7, power management functions can also be included and encapsulated as well.

Also illustrated in the example configuration of FIG. 7 is data packaging control logic 170 that takes the encrypted data as well as the clear text data, if any, and packages it into a format that is acceptable to downstream componentry. For example, in one embodiment discussed above, data packaging control logic 170 can reformat encrypted and clear text data for credit card, charge card, debit card and other like tokens into the same format as output by conventional magnetic stripe readers without encryption circuitry. As such, in such an embodiment, electronic data capture device 113 can output transaction data in a format that is recognized by conventional point of sale terminals, point of access terminals, cash registers, and other terminals in use in the industry.

Also illustrated in FIG. 7 is data output control logic 174 that can be included to properly format the data for transmission to the terminal 114 or other downstream appliance. For example, data output control logic 174, may provide appropriate signal conditioning to format the data to proper signal levels for acceptance by receivers at a terminal 114. As a further example, where data capture device 113 is at a location remote from terminal 114, data output control logic 174 can provide the appropriate line drivers (or, as another example, radio transmitters in a wireless environment) to transmit the data across the chosen communication channel to terminal 114. As another example, data output control logic 174 can also be configured to provide the encrypted output data in a format as would be output by a conventional or passive magnetic head.

Also illustrated in FIG. 7 is signature detection control logic 168 that can be included to provide a measure of authentication of the token 111 by detecting a signature associated with the data of that token. Various signature detection algorithms, circuitry, or techniques can be used to determine the signature of the token data which can be compared to a known signature for a given token to determine whether the token is authentic. As one example, in one embodiment signature detection is performed using the SECURESTRIPE® authentication technology available from Semtek Innovative Solutions, Inc., in San Diego, Calif. Other authentication techniques could be used in alternative embodiments.

Signature detection and authentication can be performed locally within electronic data capture device 113 and in other embodiments can be conducted remotely. In still a further embodiment, signature detection occurs in data capture device 113 as the data is detected and signature authentication is performed at a downstream appliance where it may be more practical to maintain a database or other infrastructure to support authentication of a large number of signatures. Signature detection techniques for various types of tokens are well known to those of skill in the art. As one example of such techniques, U.S. Pat. No. 5,770,846 to Mos, et al., provides an example of determining a token signature.

As illustrated in FIG. 7, the signature detected by signature detection control logic 168 can be forwarded to data packaging control logic 170 for inclusion in the data stream. In one embodiment, the signature can be packaged in the data stream. For example, in one embodiment it is packaged in the otherwise masked data fields of track one to maintain a format that is compatible conventional transaction processing equipment. Although, the encryption method and data placement can be varied to suit particular applications.

In alternative embodiments, signature data may bypass data packaging control logic 170 and sent to terminal 114 or other downstream apparatus in a separate packet or other package from the token data stream. As still a further embodiment, signature data created as a result of signature detection control logic 168 can also be encrypted using one or more encryption keys and forwarded as encrypted data for further processing. In one embodiment, the signature data can be encrypted with the same key as the token data. However, in an alternative embodiment, different keys are used to decrypt the signature data and the token data. In still a further embodiment, the signature can be used as a key to encrypt some or all of the token data.

Although the architecture in FIG. 7 is illustrated as having somewhat of a common bus structure, other architecture and configurations are contemplated. Indeed, after reading this description, it would be apparent to one of ordinary skill in the art how to implement the features and functionality described in these various embodiments using this or alternative architectures.

Figure 8:
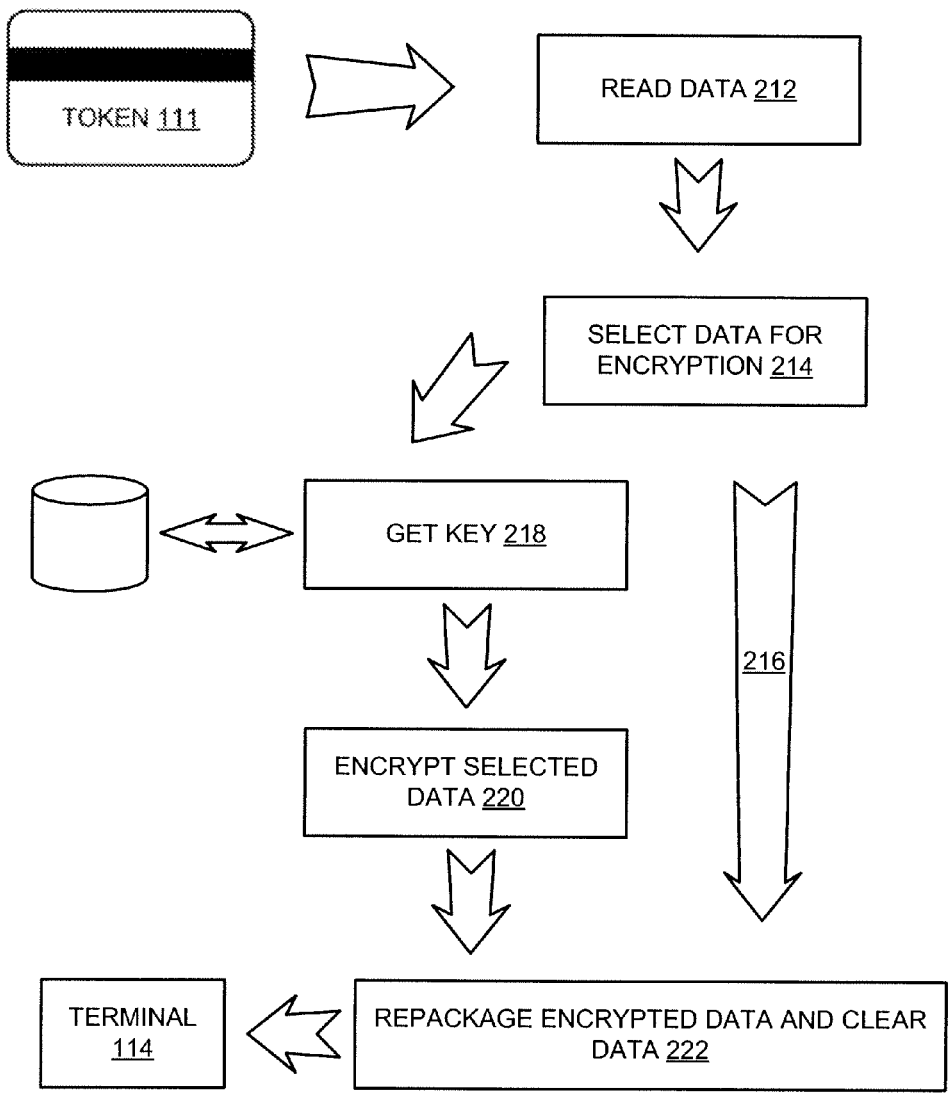
FIG. 8 is a diagram illustrating an example flow for data encryption at a capture device in accordance with one embodiment of the invention.

FIG. 8 is a diagram illustrating an example flow for data encryption at a capture device in accordance with one embodiment of the invention. Particularly, the example illustrated in FIG. 8 provides encryption of selected data from a token 111 and repackaging of the encrypted data with clear text data for transmission to a terminal 114. Referring now to FIG. 8, the data is read from token 111 in read data block 212. For example, in terms of the architecture described with reference to FIG. 7, data detection control logic 152 or other similar mechanism, can read the data from token 111.

Figure 9:
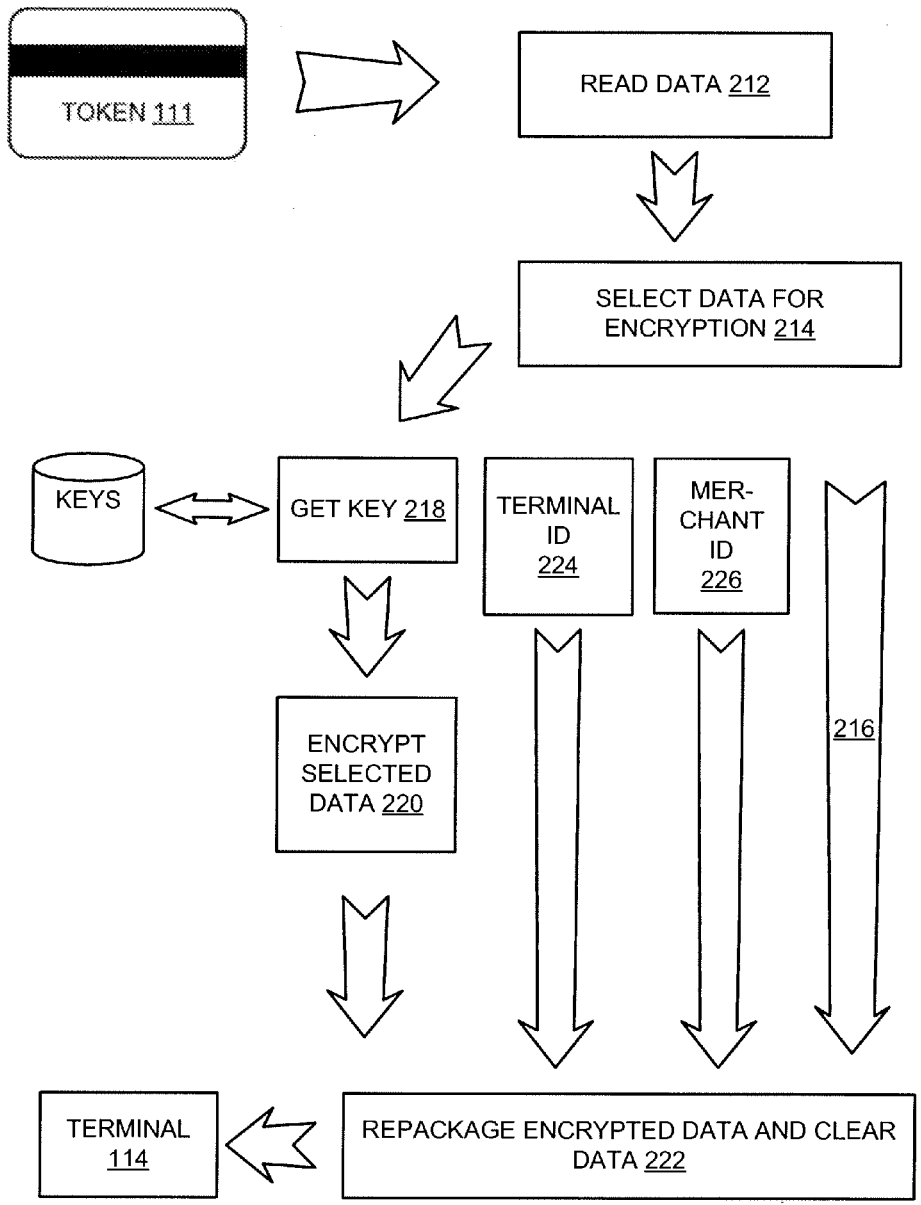
FIG. 9 is a diagram illustrating another example of data encryption in accordance with another embodiment of the invention.

In block 214, the appropriate data items from the gathered data are selected for encryption. Data that is not selected for encryption can be passed on for packaging as illustrated by flow arrow 216. In functional block 218, encryption module retrieves one or more keys from a memory or other storage and uses those keys to encrypt the selected data in block 220. In block 222, the encrypted data is packaged with the clear text data for transmission to terminal 114. FIG. 9 is a diagram illustrating another example of data encryption in accordance with another embodiment of the invention. In contrast to the example illustrated in FIG. 8, the example of FIG. 9 illustrates the inclusion of a terminal ID and a merchant ID in the package data stream. In the illustrated embodiment, the terminal ID 224 and merchant ID 226 can be stored locally at the data capture device 113 and selected for inclusion in the transmitted data when appropriate for a given data format. Although not illustrated in FIG. 9, the terminal ID 224 or merchant ID 226 can also be encrypted prior to transmission for transaction processing. Encryption of these items may be accomplished by a common key to both items or by the same key as used to encrypt the token data. Additionally, separate keys can be used to encrypt any or all of these items.

As these examples illustrate, various keys and data items (for example terminal ID 224 and merchant ID 226) can be included with encryption module 132, or otherwise provided in data capture device 113. In one embodiment, any or all of these data items can be stored into memory associated with the encryption technology at some point in the manufacturing process before the data capture device 113 is distributed to its destination for use. As such, these items can also be embedded and properly encased to prevent or deter tampering and detection thereof.

As discussed elsewhere in this document, certain embodiments can use a terminal ID 224 or a merchant ID 226 as encryption keys or as ways to determine an encryption key. As these examples illustrate, other data items might be used for such purposes as an alternative to terminal ID 224 or merchant ID 226.

As discussed above with reference to FIG. 7, in an embodiment of the invention, a "fingerprint" or signature associated with the token can be used to authenticate the token. For example, with magnetic stripe data, the magnetic transitions or changes in flux polarities or densities in the magnetic data are often disposed on the medium with a certain level of uncertainty. For example, in some cases, the timing of the data may include variations or jitter. In other words, the spacings between the transitions may vary from transition to transition and from card to card. Additionally, because of these variations and the characteristics of the flux patterns, it is difficult to accurately recreate, or copy, magnetic stripe data from an original token to a new token sufficient to maintain the same characteristics. As such, these transition characteristics create a level of uniqueness in the magnetic stripe data.

Other characteristics or variations in token data, card data or other characteristics can also be used to identify a fingerprint or signature for a given token. For example, remanent noise technology developed by the Washington University in St. Louis, Mo. might be another technique for identifying token signatures. Other token data systems, including optical data storage, biometrics, RFID tags, and the like might similarly use signature techniques to authenticate the token.

Figure 10:
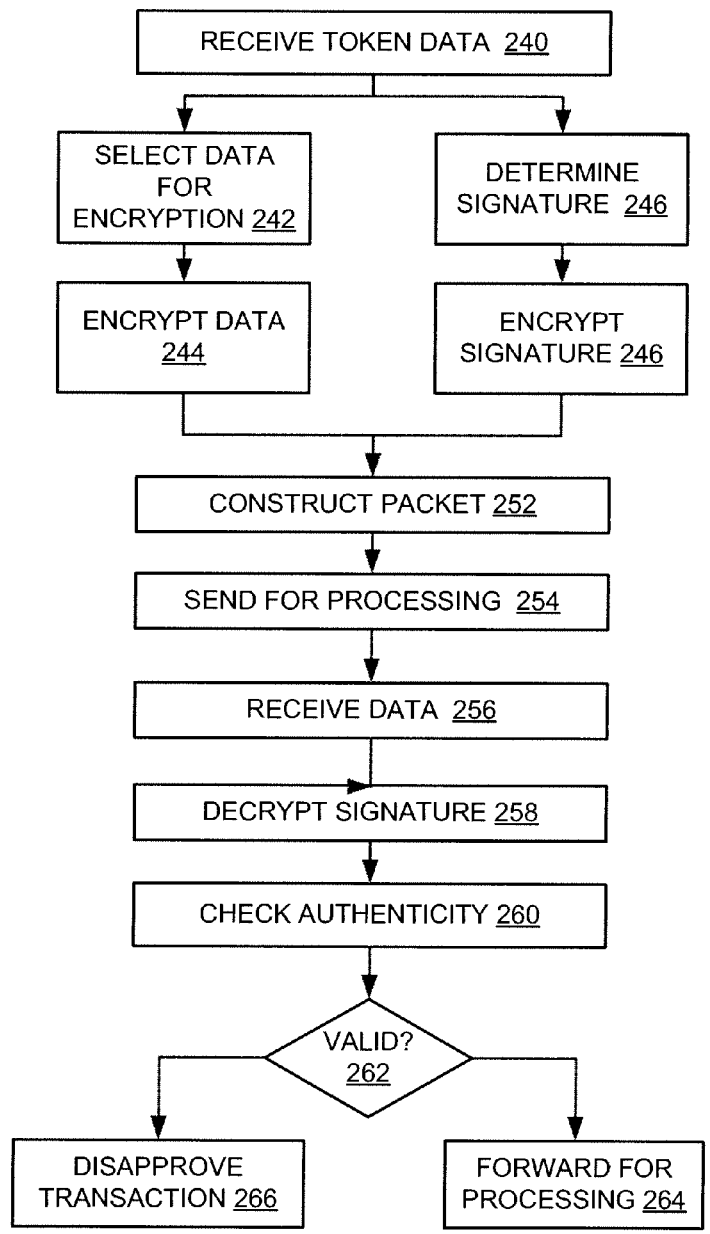
FIGS. 10 and 11 are diagrams illustrating one example application of a data encryption and token signature features in accordance with one embodiment of the invention.
Figure 11:
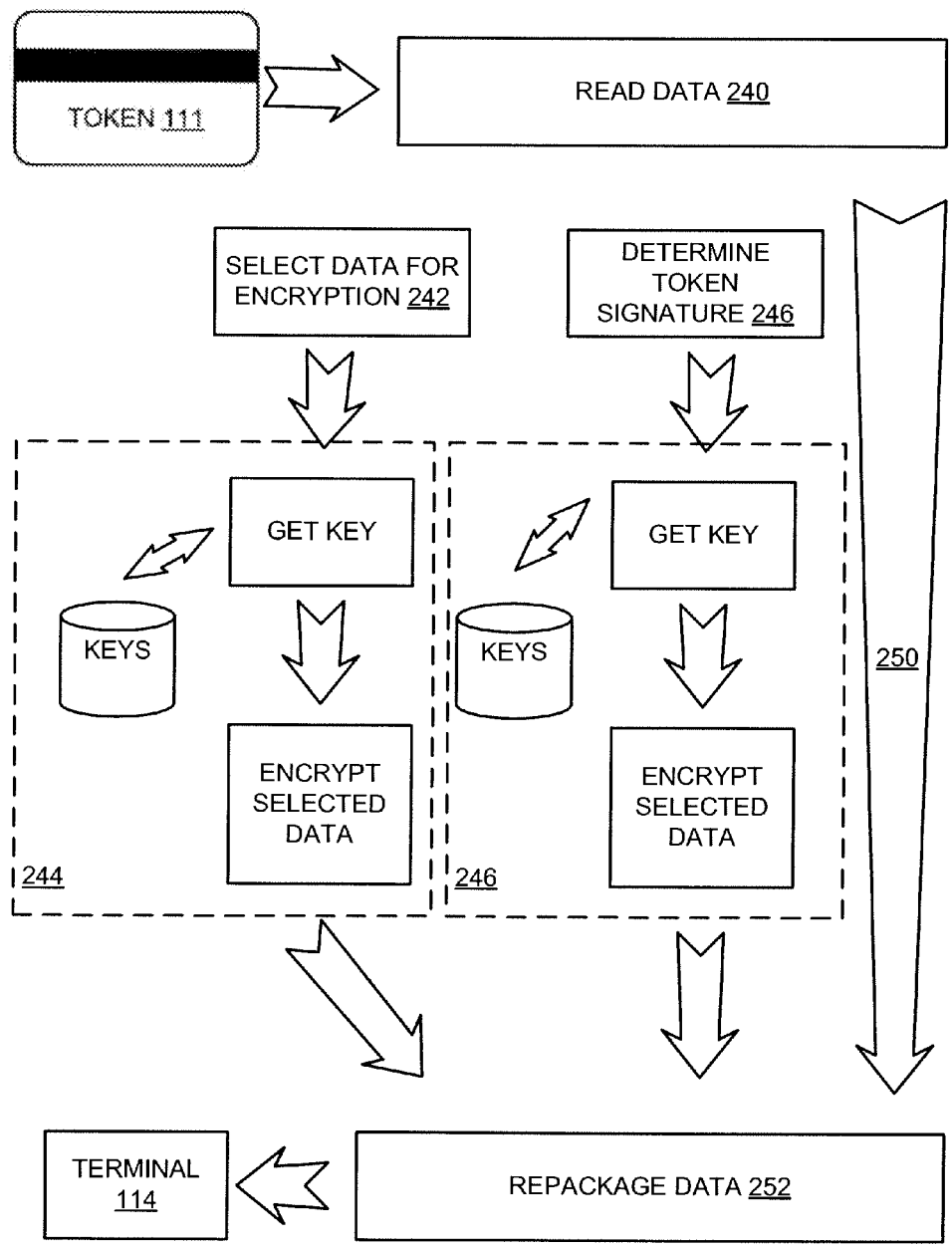

Therefore, in one embodiment, token authentication using a signature can be coupled with encryption of some of all of the token data to provide enhanced security measures for token transactions. For example, in addition to encrypting some or all of the token data to protect its integrity against possible compromise, the token signature can also be detected and checked against a known or verified signature for that token to determine whether the token is an authentic token or whether it may be a fraudulent token such as, for example, a copy of the original token. FIGS. 10 and 11 are diagrams illustrating one example application of this feature in accordance with one embodiment of the invention. Referring now to FIGS. 10 and 11, in a Step 240, token data is received from token 111. For example, in one embodiment, data detection control logic 152, such as that illustrated above in FIG. 7, can be used to obtain, detect, or otherwise read data from token 111. As a further example, where the token is a magnetic stripe card, magnetic read heads and data conversion logic can be used to read and provide a representation of the token data.

In a Step 242, certain of the token data is selected for encryption. As already discussed, some or all of the token data can be selected for encryption depending on a number of factors including, for example, the level of security required, the desirability of having certain of the data in clear text for reporting, authentication, routing, etc., or to otherwise allow conformance with the transaction-processing network.

In a Step 244, the data is encrypted. As described with respect to various other embodiments, in this Step an encryption key is obtained and the data encrypted using the selected key. As also discussed, multiple keys can be used to encrypt multiple pieces of data. The encrypted data can be provided for packaging for transmission to terminal 114.

In a Step 246, the token signature is determined. As already discussed, a number of different techniques can be used for signature determination. In the illustrated embodiment, this signature is encrypted in a Step 248, again using an encryption key. In one embodiment, the key used to encrypt the signature can be different from the key used to encrypt the token data. In a Step 252, the encrypted token data is packaged with the encrypted signature to allow these items to be provided for transaction processing.

In a Step 254, the packaged data is sent for processing. For example, in terms of the example environment the packaged data can be sent to a transaction-processing network to authorize the current transaction. Further with this example, the package data can be routed through a terminal 114 in furtherance of completing the transaction.

In a Step 256, the packaged data is received by an appropriate transaction processing entity, which can decrypt the signature in a Step 258, check the authenticity of the signature in a Step 250, and make a determination as to whether the token 111 is valid based on the authenticity of the signature in a Step 262. If valid, the transaction can be forwarded for further processing based on the token data itself as illustrated by Step 264. On the other hand, if the signature is not valid the transaction can be disapproved as illustrated by Step 266.

Note that it is not necessary for signature data to be packaged with token data for transmission in a single data package to the various processing entities. In an alternative embodiment, the signature data can be separately transmitted for authentication and an indication of the authentication status can be provided to the appropriate transaction processing entity for final authorization. Additionally, as illustrated by flow line 250, clear text token data that is not encrypted can also be packaged for transmission with the transaction data. As also discussed with respect to other embodiments, other data such as a terminal ID, merchant ID, and so on, can be sent to facilitate transaction processing, packaged either with the transaction data or separately.

In one embodiment, signature decryption and authentication can take place in the same entity and even the same appliance that is used to authorize the transaction. Alternatively, signature decryption and authentication can take place in a separate appliance and even at a separate point in the network from the authorizing entity. Also note that in one embodiment, authentication of the signature can be a positive or yes/no authentication. Alternatively, authentication of a signature can be provided as a weighting factor, figure of merit or other score that can be used to provide a ranking of the authenticity of the signature. Such embodiments may be useful in applications where, for example, signature is determined based on magnetic stripe data, wherein absolute precision in the detection and timing of flux transmissions can be difficult to obtain. As such, for a given card, its own signature may vary within a certain degree from one read operation to the next. Therefore, an authenticity score can be used to show the level of confidence with which the signature was authenticated. Thresholds or other techniques can be used to identify for example a cut off range below which a signature will be determined to not be authenticated.

In one embodiment, a signature decryption appliance or module can be located, for example, with Gateway 120 so as to allow signature authentication at the gateway prior to routing the transaction to the transaction-processing network for authorization. Such an embodiment can avoid otherwise unnecessary routing and handling by transaction-processing network 123. Additionally, where the gateway is configured to decrypt some or all of the encrypted token data, this functionality can be kept separate or bundled with the signature authentication functionality. If the signature is not approved or the rating is below a certain threshold, notification can be returned to terminal 114 to disapprove the transaction without further processing. In such embodiments, re-swipes may be permitted in the event that the failure to authenticate is a result of faulty read equipment or a poor swipe. In yet another embodiment, the signature data can be sent in a separate transaction prior to initiating transmission of the account data for authorization.

Because signature verifications can be accomplished in a single or separate location with a signature database, signature authentication can be shared from among multiple institutions while providing a level of data security in the account information because the shared facility does not have access to the encryption keys used to encrypt the account information.

In one embodiment, the gateway 120 can be configured to receive transaction requests from multiple devices employing encryption modules. The transaction data can be configured to include one or more components. In one embodiment, the transaction data includes two components: token data and control data. In one embodiment, these can be encrypted using different keys. As such, in this embodiment, the gateway can be configured to not have control data keys, but not the keys used to decrypt the token data, therefore providing a measure of security in that data. Whereas providing the gateway with keys to decrypt the control block to detect information contained therein that may be useful for the particular application and transaction. For example, in one embodiment, the card signature or other token signature can be included in the control block that can be decrypted by the gateway.

In one embodiment, the results of the signature authentication along with other control information can be encrypted with a transaction process server's private key to which the transaction is being sent and the request forwarded. As such, the gateway can perform signature verification and the transaction process server can determine whether to accept the transaction or not based on the signature, or signature rating, along with any other information the transaction process server has access to.

Additionally, the signature can be sent with an encrypted or hashed account data to the signature verification module. The system can be configured to use encrypted or hashed PAN (or other token data item) to index the signatures for comparison. As such, in one embodiment, the signature database can be configured to hold encrypted data rather than sensitive clear text information. With a secure database, in one embodiment, the database might be made accessible to multiple entities, allowing a clearing place for authentication while maintaining a measure of security in the token data. Thus, a signature module (for example, as part of a secure transaction module or otherwise) can be configured to perform signature authentication, and transactions routed thereto for authentication. The signature database can be maintained for multiple entities and updated from multiple sources.

In one embodiment, the gateway with one or more appliances or modules to decrypt (and, in some embodiments re-encrypt) routing information, signature information, token data, or other information can be used to provide a standardized interface to multiple transaction processing entities. The gateway can also be configured to provide a standardized interface to terminals 114. Additionally, gateways can be configured to provide a plurality of interfaces to terminals 114 for transaction processing entities 123 as may be appropriate to facilitate flexibility in communications among these entities. Thus, gateways can be used not only to provide interim decryption, re-encryption and routing but also to provide a way to conform interfaces among various entities within a network.

In one embodiment, the invention can be configured so as to operate with tokens that present data in clear text or encrypted form. For example, in one embodiment, tokens can include data that is encrypted on the token itself. As a further example, token data or portions thereof can be encrypted before the data is embodied on the token. As such, a level of security can be provided for the underlying token data even if the token is lost, stolen, copied, or otherwise compromised. For example, providing encrypted data on the token (at manufacture or otherwise) can provide the advantage of protecting data from those who use card readers for skimming data or otherwise reading and storing the data for improper purposes.

To consider yet a further example consider again a scenario where token 111 is a bank card having a magnetic stripe. A bank patron who loses his or her card may have sensitive information such as his or her name or account number compromised. Additionally, in some scenarios, fraud perpetrators use magnetic stripe readers to copy the data from cards for fraudulent purposes. Encrypting some or all of this date before writing the magnetic stripe allows a certain measure of security in this data.

In such embodiments, it may be useful or desirable for the entity or entities involved with transaction processing, including the paying institution, to have the ability to decrypt this data that was originally encrypted. Such decryption capability will allow the transaction processing entity to recover the original information (for example the account information) to complete the transaction. Additionally, in some embodiments, terminal 113 or other local device may have the ability to decrypt at least part of the data (for example, the expiration date, last four digits of account number, or user name) to provide the ability for an operator to provide local authentication. In other embodiments, these data items may be left in clear text on the card (and not encrypted by encryption module) to allow this authentication.

In embodiments where an encryption module is used with a data capture device or elsewhere in the transaction chain, such encrypted data would be encrypted again by encryption module 132. As such, it may be desirable in some applications to provide two layers of decryption to not only decrypt the data provided by encryption module 132 but also the decrypt the original data as encrypted on the token. Such original token encryption can be accomplished, for example, by encrypting the data prior to writing it to the token or via encryption technologies embedded with the token. For example, smart card or chip card tokens can be provided that include functionality to perform encryption prior to making the data available to a data capture device.

In one embodiment, sufficient information can be left in clear text on token 111 to allow operation of conventional point of sale, point of access, or other terminal equipment. In an alternative embodiment, all the information on the token is encrypted data.

In one embodiment, when the original token data is encrypted, the encryption key can be stored and provided to the appropriate processing entities such that the original data can be decrypted. Additionally, a hash code can be generated. The hash code can be used to create a digital fingerprint or signature from the data. Hash codes can use substitution transposition and other techniques to create the signature, which is often referred to as a hash value. Thus, in one embodiment, the hash code can be used as the encryption key that is used to encrypt the original data. Additionally, a hash code can be used as a fingerprint to authenticate the original data such that upon subsequent decryption, the hash code can be used at the processing entity to validate the recovered data. Thus, in such an embodiment, the hash function can be provided to the processing entity such that the processing entity can rehash the decrypted data to arrive at the correct hash code. In a preferred embodiment, the hash code or hash function is a one-way operation minimizing the likelihood that a would-be hacker would be able to calculate particular data input that results in the desired hash value. In such embodiments, it can thus be very difficult to forge the hash value.

Figure 12:
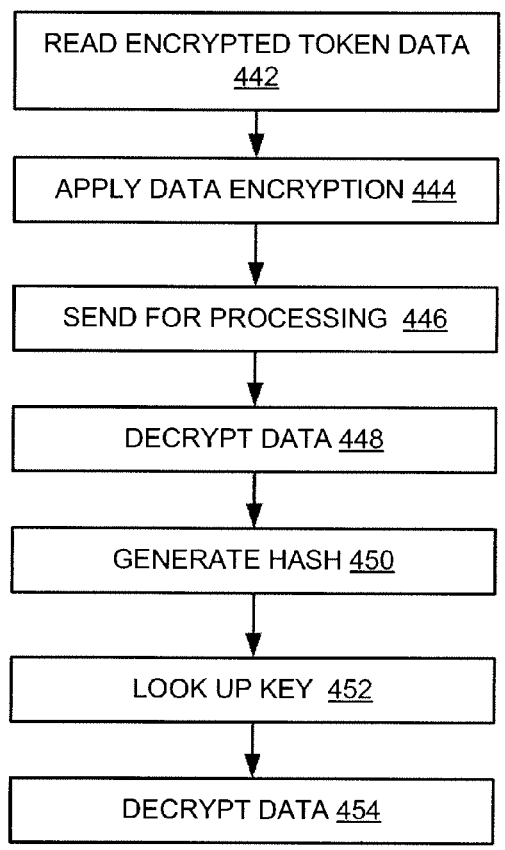
FIG. 12 is an operational flow diagram illustrating an example process for handling token data that is encrypted on the token in accordance with one embodiment of the invention.

FIG. 12 is an operational flow diagram illustrating an example process for handling token data that is encrypted on the token in accordance with one embodiment of the invention. Referring now to FIG. 12, in a step 442, the encrypted data is read from the token. That is, in one embodiment, a data capture device such as, for example, data capture device 113, can be used to read the data from the token. This example embodiment, applies data encryption to some or all of the token data that is read in step 442 despite the fact that some or all of this data may already be itself encrypted. Thus, in a step 444, some or all of the token data, including the encrypted token data, is encrypted. This can be accomplished, for example, using an encryption module 132 or other like device. As discussed with reference to other embodiments, the data output from the data capture device can be packaged into formats appropriate for the processing network (including conventional terminals) and, in step 446, the packaged data sent for processing.

In a step 448, the encrypted data is decrypted. For example, in this step, the data encrypted by encryption module 132 is decrypted to once again arrive at the originally encrypted token data that was read in step 442 (along with any clear text data that may have been on the token and read in step 442). Having the original encrypted token data, this original data can now be decrypted to arrive at the actual account number or other actual token data in clear text form. Thus, in one embodiment, the key originally used to encrypt the token data is now used to decrypt this data to arrive at the original information. As stated above, in one embodiment the key that was used for this encryption is distributed or otherwise provided to the appropriate transaction processor such that the decryption at that location can take place. In embodiments where a hash code is generated from the encrypted data, in a step 450 the hash code can be regenerated using the same hash function. The generated hash code can then be used in a step 452 to look up a decryption key that is used to decrypt the data in step 454.

Figure 13:
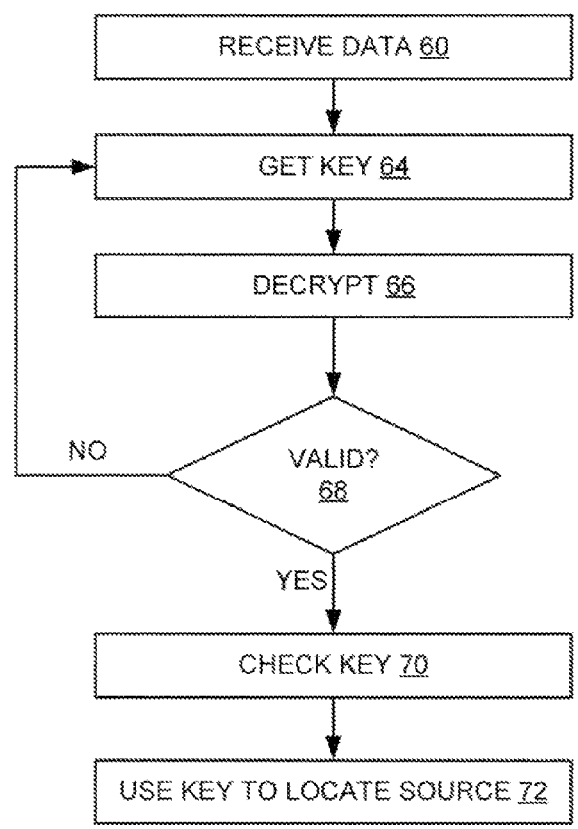
FIG. 13 is an operational flow diagram illustrating an example process for detecting a source of suspected fraudulent transactions in accordance with one embodiment of the invention.

In one or more embodiments as previously discussed, a terminal ID, merchant ID, or other identifying string can be used to encrypt some or all of the data that is encrypted for the transaction. As briefly mentioned, using an identifiable string or encryption key can facilitate identification of the sources of suspected fraudulent transactions. FIG. 13 is an operational flow diagram illustrating an example process for detecting a source of suspected fraudulent transactions in accordance with one embodiment of the invention. To facilitate description of this example process, it is described in terms of encryption using a terminal ID as the encryption key. However, after reading this description, it will become apparent to one of ordinary skill in the art how to implement this and other embodiments using alternative forms of encryption keys.

Referring now to FIG. 13, in a step 60 token data that has been encrypted (for example, by an encryption module 132 in a data capture device 113) is received by a transaction processing entity. For example, it can be received by gateway 120, a designated entity in a transaction-processing network 123 or other transaction processor. This is the entity that is designated as performing the decryption to recover the card data. Remember, in this example scenario, fraudulent activity is suspected. Suspicion may arise based on, for example, the failure of the designated key to decrypt the data properly. Thus, to locate the source of the suspected fraudulent data, an encryption key is retrieved from the database in a step 64, the data decrypted in a step 66, and in step 68 the data is checked for validity. Validity checks can be used to determine, for example, whether a valid account number is decrypted, whether the decrypted information matches other records, and other validity checks that may be used.

If the retrieved key does not result in a valid decryption, another key is retrieved and the process continues. This process is repeated until a valid decryption is detected at step 68. Once a valid decryption is detected, in a step 70 the key that resulted in the correct detection is identified in step 70 and that key is used to locate the source of the data in step 72. For example, because the data was encrypted with the terminal ID, location of the correct key can be used to point back to the terminal that read the data and performed the encryption.

In another embodiment of the invention, ancillary information such as, for example, timing information or location information can be included with transaction data to tag the transaction data with date, time, or location information. Such information can be retrieved or obtained by, for example, the terminal 113, or other control logic that may be embedded in or included with data capture device 113. For example, real time clocks can be included with the transaction processing equipment to appropriately tag transaction data with date and time information.

Likewise, global positioning system (GPS) or other position determination technology can be used to identify a location and cause a location code to be embedded in the data stream. Additionally, the location information can be added to the encryption mask generation because, in one embodiment the decryption service knows the location of the terminal. Therefore, if a terminal is stolen, or sold and moved to another location, the location information will be invalid, making the terminal unusable. Similarly, position information can be hard coded or otherwise embedded in the devices to enable it to be packaged with the transaction data. This could be useful where portable devices such as cell phones, PDAs, smart phones, or other portable terminals are used to conduct transaction. Additional examples of portable terminals may include portable check-out devices used at car rental facilities, portable cash registers in large retail outlets, portable package delivery and tracking devices such as the DIAD used by UPS drivers, just to name a few. Indeed, after reading this description, it will be apparent to one of ordinary skill in the art how these and any of a number of other terminals can be used in this and other embodiments.

Locational information can be useful in embodiments where, for example, the point of sale, point of access or other terminal is a mobile terminal. In such embodiments, this information can be utilized to verify where the transaction occurred. Additionally, time stamp information can be likewise used to verify when the transaction took place. As a further embodiment, time stamping can also be used to compare data across multiple transactions to determine whether potentially fraudulent activities are occurring. For example, where token data has been copied and used to make multiple transactions, the occurrence of these multiple transactions with the same time stamp information, or even the same location information, may identify potentially fraudulent activities. Additionally, the time stamp information in a transaction can be compared with current date and time information in the transaction processing server and out-of-date transactions rejected or other questioned. In such circumstances, a new card swipe can be requested.

Figure 14:
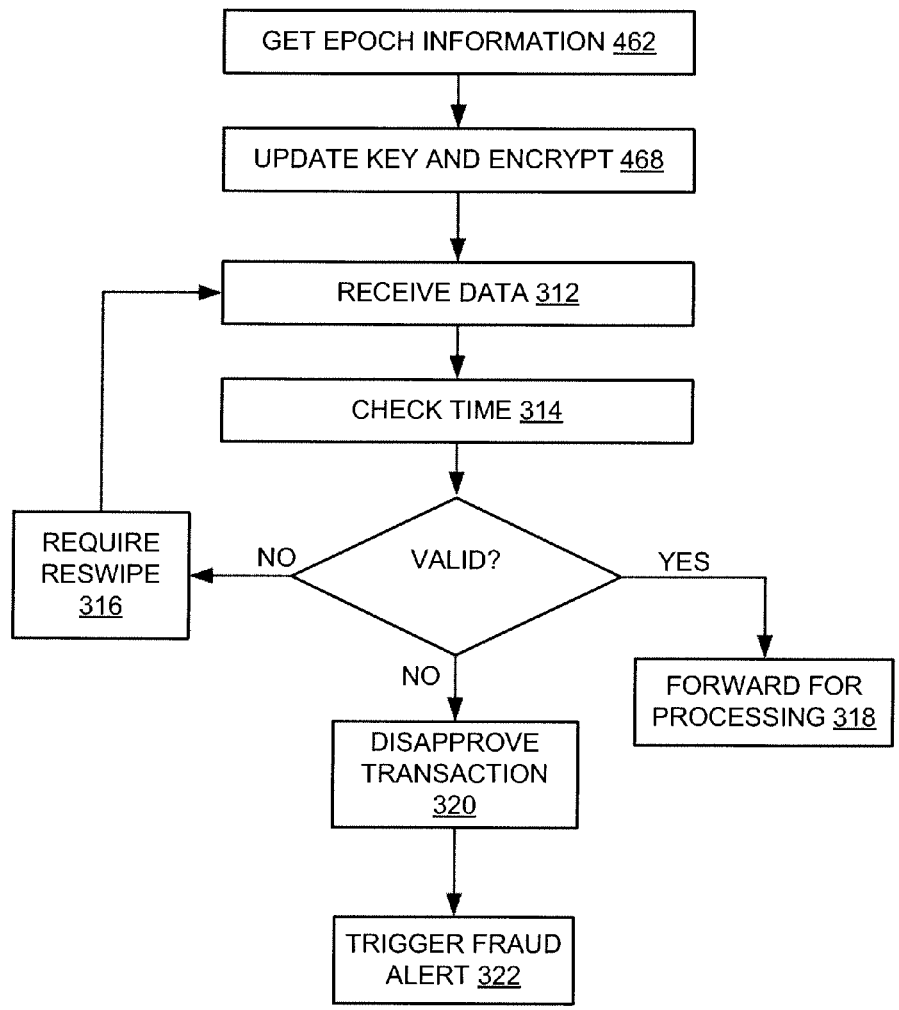
FIG. 14 is an operational flow diagram illustrating a process for using time stamp information to detect potentially fraudulent activities in accordance with one embodiment of the invention.

FIG. 14 is an operational flow diagram illustrating a process for using time stamp information to detect potentially fraudulent activities in accordance with one embodiment of the invention. Referring now to FIG. 14, in a step 462, timing information is obtained, for example, from a clock or other data source. In a step 468, the data is tagged with the epoch information and sent for the transaction to be processed. In one embodiment, the time stamp data can also be encrypted.

At a designated point in the transaction-processing network, the transaction data is received for processing as illustrated by a step 312. In a step 314, the epoch information is checked to determine whether it is a valid time stamp. For example, the information can be checked against previous transactions to detect recurrence of a given time stamp. Additionally, the information can be checked against a real-time clock to determine whether the transaction compares favorably to a contemporaneous clock in the processing system. For example, to check to see if the transaction data has arrived within a reasonable timeframe of it's time stamp considering network latencies. If invalid, in a step 316, a re-swipe may be required and the check performed again. If valid, the transaction can be forwarded for further processing as illustrated by a step 318.

In the event of an invalid time stamp check, the transaction can be disapproved in a step 320 and a fraud alert triggered in a step 322. Although not illustrated, a designated number of re-swipes (including zero) can be permitted before final disapproval or fraud alert triggering.

In one embodiment, if the re-swipe results in a time stamp that is delayed by an amount somewhat equal to the duration between swipes, this could indicate a synchronization issue with the time stamp clock or the server clock, or abnormal network delays. This can provide a metric to determine whether to allow the transaction and could also trigger an investigation into the source of the synchronization issue or delay.

In addition to time stamps or location information, counters can be maintained to track the number of uses of equipment in the processing chain such as, for example, electronic data capture devices 113 and terminals 114. Thus, count values during a transaction can be compared with an expected count value based on a previous transaction to check for potentially fraudulent activity. This can help to test for reused transaction data that had been previously fraudulently recorded. That is, in one embodiment the real time count information might be embedded in the data stream by either the data capture device or the terminal (or count values for both) and the count values in the transaction to verify to ensure proper incremental counts.

A counter can also be used to update or otherwise alter encryption keys that are used for encrypting the information. That is, rolling encryption keys or other like changes can be made based on date and time information, location information or a counter. For example, incrementing the counter with each transaction may cause a predetermined or determinable change to the encryption key, and, at the transaction processing server, a similar change is made based on the counter to yield the appropriate decryption key. This rolling or updating key implementation can provide an additional measure of security. For example, the keys will change and thus be harder to duplicate and the output of data capture device will change each time the token data is entered. Thus, in the bank card example, multiple swipes of a bank card will result in different data output for each subsequent swipe of the same card because the encryption key has changed each time. As a result, this will facilitate fraud detection if data is stolen from a terminal or other server and attempted to be reused to make fraudulent or duplicate transactions. In other embodiments, the keys might be designated to change after a given number of entries or after a predetermined period of time.

As discussed in the above example with reference to FIGS. 5 and 6, the present invention can be implemented so as to include a serial number or other identifier of the data capture device or terminal, along with the transaction data to allow the correct keys to be retrieved for subsequent decryption. Thus, where some of all of the data is encrypted using a terminal ID, that terminal ID (or a code allowing determination of the terminal ID) is included in the data stream to facilitate identification of the appropriate decryption key, or otherwise sent to the decrypting entity. In one embodiment, the terminal identification number can be a serial number or other identification string associated with a data capture device. Particularly, in one embodiment, this identification number can be unique to a given data capture device such that additional functionality can be provided as discussed below. For example, as will be further discussed, the serial number or unique identifier can be used to track the movement and usage of the electronic data capture devices. For example, if an electronic data capture device is stolen, misused, or used in a fraudulent fashion, the terminal ID, serial number or other information included with the transaction data can be used to detect the unauthorized use. As another example, received encrypted data can be decrypted against several keys to find the key that correctly decrypts the data. When that key is identified, the terminal ID (which is either the key or used to get the key in this example) can be determined. Now, with a known terminal ID as a result of decryption, the source of suspected fraudulent activity can be determined.

In one embodiment, the terminal ID can be a serial number or other string unique to an electronic data capture device. In another embodiment, the terminal ID can be unique to a point of sale, point of access or other terminal to which an electronic data device is connected or with which an electronic data capture device is integrated. Where a terminal may be in communicative contact with a plurality of data capture devices, the assignment of a terminal ID or a plurality of IDs to uniquely identify each data capture device individually, a subset of data capture devices, or simply the terminal with which one or more data capture devices is associated can be chosen based on desired implementation goals.

Discussed above are various embodiments where token data can be encrypted, in whole or in part, using one or more keys, to provide a measure of security for various token transactions. Examples described above include applications where the token 111 is a bank card such as, for example, a credit card, charge card, or debit card. With transactions such as these, and particularly in the case of debit or ATM cards, personal identification numbers, or PINs are often used to authenticate (or verify that the cardholder is an authorized cardholder) for the transaction.

To provide an additional measure of security for transactions using PIN identification codes, other user-entered or user-supplied data or other additional data in general, it may be desirable that such ancillary information also be encrypted. As such, in accordance with one embodiment of the invention, such additional data (for example some or all of the PIN data) is encrypted. One such embodiment is now described in terms of the example application wherein the token 111 is an ATM or debit card, and the additional data to be encrypted is the user's PIN code. Generally speaking, in accordance with one embodiment of the invention, the PIN code can be received by a PIN pad or other like data entry device, the PIN code encrypted, and included (packaged or otherwise) with the transaction data.

Figure 15:
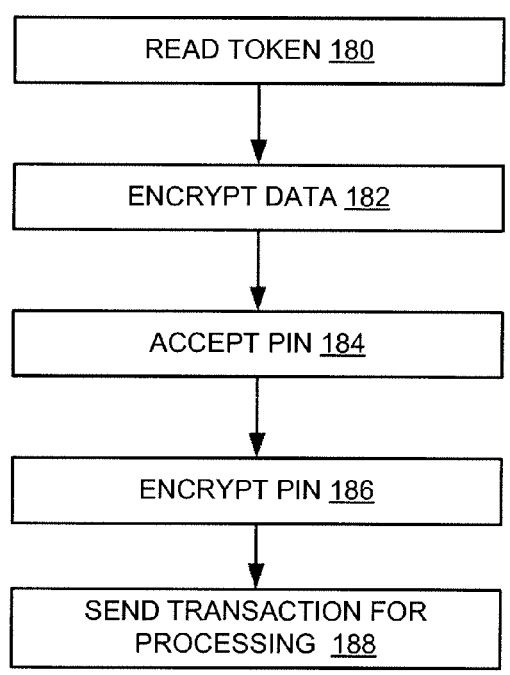
FIG. 15 is an operational flow diagram illustrating an example process for encrypting some or all of the additional data, such as PIN data, in accordance with one embodiment of the invention.
Figure 16:
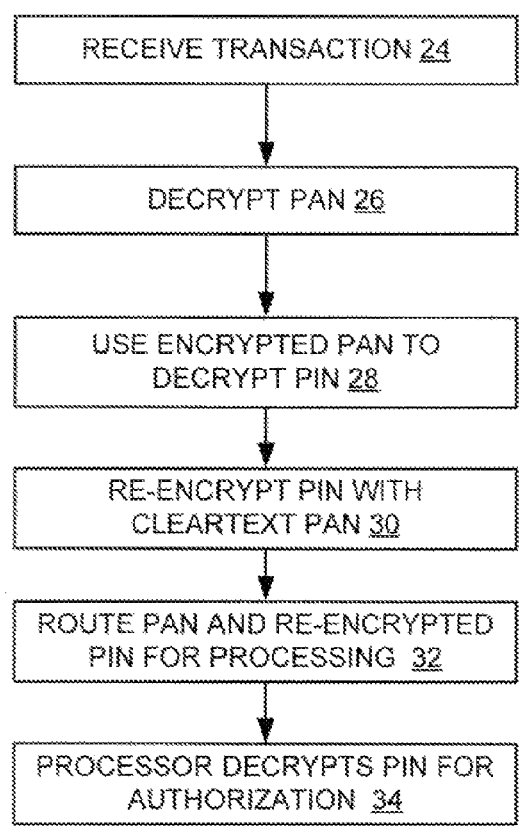
FIG. 16 is an operational flow diagram illustrating an example process for decrypting additional information such as, for example, PIN data, in accordance with one embodiment of the invention.
Figure 17:
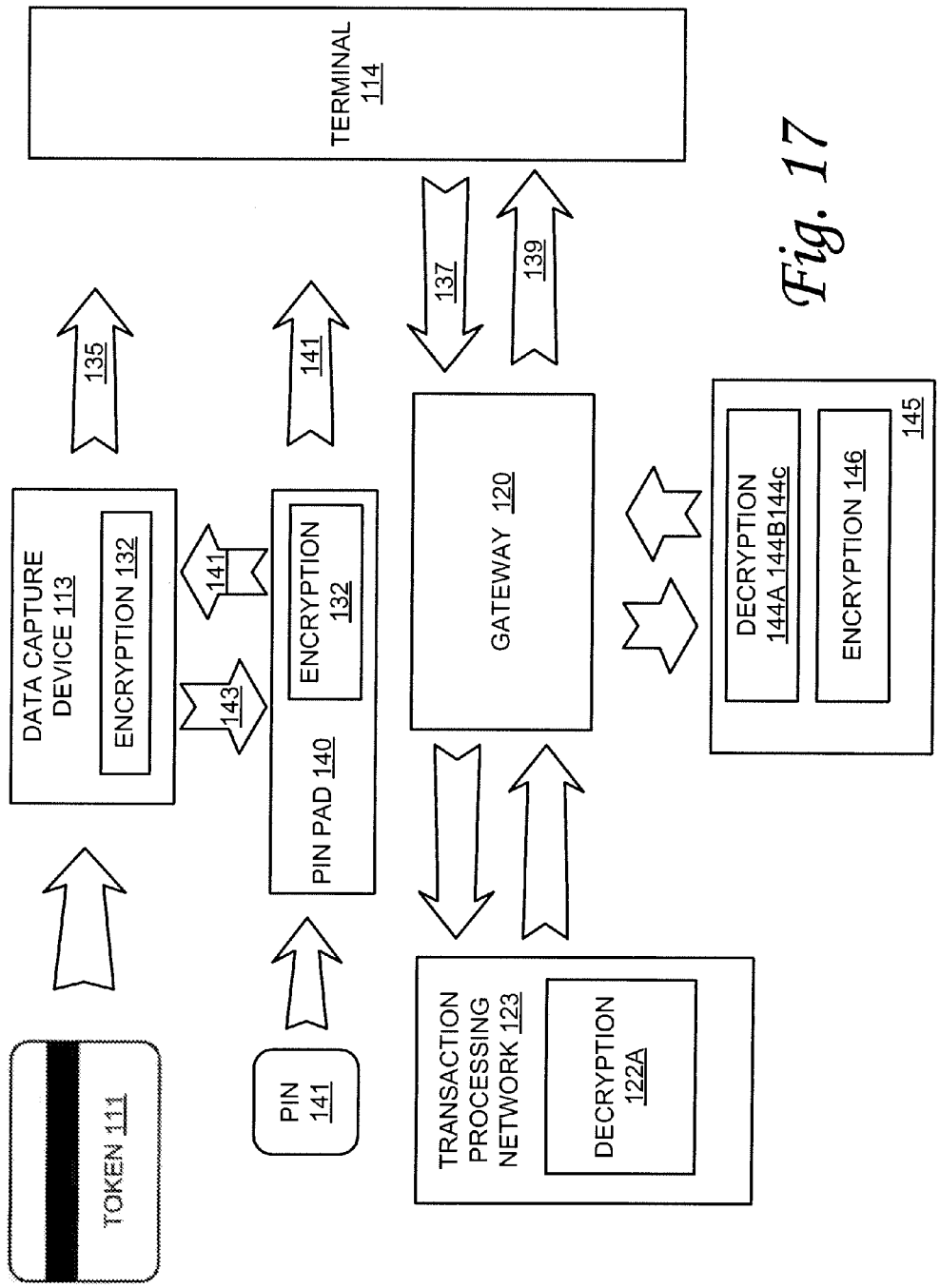
FIG. 17 is a block diagram illustrating an example application for PIN encryption in accordance with one embodiment of the invention.

FIG. 15 is an operational flow diagram illustrating an example process for encrypting some or all of the additional data, such as PIN data, in accordance with one embodiment of the invention. FIG. 16 is an operational flow diagram illustrating an example process for decrypting additional information such as, for example, PIN data, in accordance with one embodiment of the invention. FIG. 17 is a block diagram illustrating an example application for PIN encryption in accordance with one embodiment of the invention. Referring now to FIGS. 15, 16 and 17, in a step 180, the token data is read. For example, in terms of the example application wherein token 111 is a debit card, a data capture device 113 such as a magnetic stripe reader can be used to read the magnetic stripe data from the debit card. In one embodiment, data capture device 113 can include an encryption module 132 to provide encryption of some or all of the token data. Such encryption can, for example, be performed in accordance with the various embodiments discussed in this document. The step of encrypting token data is illustrated by step 182 in FIG. 15.

For the example of a debit card transaction, in conducting the transaction, the cardholder enters his or her PIN 141. This is typically accomplished using a PIN pad keypad 140 or other device that allows the user to enter the additional information (in this case, a PIN). Thus, in a step 184, the entered PIN is accepted by PIN pad 140.

In a step 186, part or all of the entered PIN is encrypted using encryption techniques. In one embodiment a module such as, for example, an encryption module 132, is provided with PIN pad 140 to perform the PIN encryption. In one embodiment, the encryption can be performed using an encryption key stored in memory or generated based on any number of parameters such as those discussed above with token data encryption. In another embodiment, PIN data can be encrypted using some or all of the token data that is read from token 111. For example, in one embodiment, the account number, user name, or other data field or fields from token 111 can be passed to encryption module 132B to perform the PIN data encryption as illustrated by flow arrow 143. It is noted, however, that providing clear text account or other token information across a communication channel to a PIN pad 140 may provide an opportunity for such information to be compromised. As such, in a preferred embodiment, this information is encrypted and the illustrated example uses the encrypted PAN to encrypt the PIN.

Therefore, in a preferred embodiment, encrypted token information is passed to encryption module 132B to serve as a key to encrypt the PIN data. More particularly in one embodiment, the encrypted portion of token 111 is used as the encryption key for encryption module 132B. As such, the PIN data in this example embodiment is encrypted with the encrypted portion of the PAN. For ease of discussion, the remainder of the description of PIN encryption is discussed in terms of this example embodiment wherein the PIN is encrypted using the encrypted PAN (or partially encrypted PAN) as the encryption key.

The encrypted PIN data can be passed back to encryption module 132 for packaging into secure data stream 135, or passed to terminal 114 for subsequent transmittal for transaction processing. These alternatives are illustrated by flow arrows 141. Although illustrated as separate blocks in FIG. 17, data capture device 113 and PIN pad 140 can be integrated as a single device or in a single housing. However, in some embodiments, and in numerous conventional existing applications with which this technology can be implemented, PIN pad 140 may be physically separate from data capture device 113. As such, passing encrypted data from data capture device to PIN pad 140 via flow line 143, provides a measure of security that may otherwise not be present were the PIN data to be encrypted with a clear text account code or other information. Additionally, as noted above, encrypting the token data as close to the source as possible or practical provides an additional measure of security, and not using a clear text PAN can help protect the PAN from compromise.

In a step 188, a transaction is sent for processing. In applications where a terminal 114 is involved such as, for example, a point of sale or point of access terminal, transactions can be routed through terminal and sent to transaction-processing network 123 as illustrated by flow arrow 137. As discussed above in token encryption embodiments where a PIN pad 140 was not used, the encrypted token data and PIN data can be repackaged into a desired format as may be compatible with downstream processing devices. For example, in one embodiment, the encrypted token and PIN data are repackaged into the same format used by conventional point of sale or point of access equipment to provide compatibility with conventional processing networks.

With continuing reference to FIGS. 16 and 17, in some embodiments, a gateway 120 can be included to facilitate routing of the transaction from the merchant or other point of sale or point of access, to the appropriate entity or entities in transaction-processing network 123. As such, the example illustrated in FIG. 16 includes a gateway 120 to provide such routing functionality. Additionally, in the example illustrated in FIG. 17, the various decryption operations are illustrated as occurring at or within gateway 120 (e.g., at the gateway data center). As discussed above in other embodiments, this decryption need not occur at a gateway 120 (an indeed certain applications may not even include a gateway 120), but instead the decryption can occur at the appropriate transaction processing entity or elsewhere along the channel as may be appropriate given security considerations. In one embodiment, decryption at the gateway 120 can allow the gateway to decipher the token data (and, in some cases, PIN data) for routing and other purposes. In fact, decryption at the gateway can serve to return the encrypted data to clear text form for processing by the network 123, thus providing another mechanism to achieve compatibility with conventional processing servers.

In keeping with the current example, in a step 24 gateway 120 receives the transaction data 137 for processing. In one embodiment, gateway 120 can be used to decrypt, or arrange the decryption of, the PIN to facilitate transaction processing. In this embodiment, in one application, gateway 120 can route the PIN to a secure transaction module 145 for decryption. In an alternative application, secure transaction module 145 functionality can be included within or as a part of gateway 120.

In one embodiment, secure transaction module 145 can include a decryption module 144 to decrypt data items including, for example, some or all of the PIN, the PAN, or other data as may have been encrypted. Secure transaction module 145 can also be implemented to include the functionality to encrypt (or re-encrypt) data as well. As such, an encryption module 146 can be included to provide additional data security for subsequent routing to transaction-processing network 123. Although not illustrated, secure transaction module 145 can include access to a storage device for key storage and the like.

Continuing with FIG. 16, in a step 26 decryption module 144A is used to decrypt the PAN or portion thereof that was encrypted by data capture device 113. In a step 28, the encrypted PAN (encrypted by encryption module 132A at data capture device 113) is used to decrypt the encrypted PIN. This step can be included in embodiments where the encrypted PAN is used to encrypt the PIN as discussed above.

In embodiments where it is desirable to transmit the PIN in encrypted form to transaction-processing network 123, gateway 120 (or in the case of the illustrated example, more particularly, secure transaction module 145) re-encrypts the PIN in step 30. This re-encryption can be performed with the clear text PAN that was arrived at by decryption in step 26.

Thus, the gateway now has the encrypted PAN, as encrypted by encryption module 132A, and a re-encrypted PIN encrypted with the clear text PAN. In a step 32, the encrypted PAN and re-encrypted PIN are routed to transaction-processing network 123 for final processing. The processing entity in transaction-processing network 123 decrypts the PAN and then using a decrypted PAN to decrypt the PIN to perform the final authorization. Upon authorization, confirmation thereof can be routed back to terminal 114.

In the example described above, the PIN data was encrypted using encrypted PAN information. However, because, in that example application, transaction-processing network 123 is expecting the receive PIN information encrypted by the clear text PAN, the example illustrated in FIG. 16 performs a decryption of the encrypted PIN using the encrypted PAN to get the clear text PIN then re-encrypts the clear text PIN with the clear text PAN so that it is encrypted with a key as expected by transaction-processing network 123. However, to arrive at the clear text PAN used to decrypt the PIN, the encrypted PAN is also decrypted at the gateway and then re-encrypted for transmission. These additional steps can be included to allow the encrypted PAN to be used for PIN encryption, thus providing the additional measure of security to the PAN data during the PIN encryption process. As this example illustrates, other data can be used to encrypt the PIN and the PAN-encrypted PIN recreated at the gateway as well.

As stated above, these decryption and re-encryption steps can be performed at other points along the communication channel. As would be apparent to one of ordinary skill in the art after reading this description, the various decryption/encryption steps can be performed at points along the network as would be appropriate for a given application. Also note that in another embodiment, re-encryption need not be performed by gateway 120. This alternative might be useful, for example, in applications where the communications between gateway 120 and transaction-processing network 123 are across secure communication channels. In other words, gateway 120, in some applications may be part of a secure communication network, or even included as a part of transaction-processing network 123.

In one embodiment, a web portal can also be provided for management of terminals, data capture devices (which can be included in terminals) gateways, secure transaction modules and other entities in the secure transaction processing chain. The portal may also be used to provide an authorized user the ability to toggle encryption on or off at one or more terminals, change keys, update encryption information and so on. The portal may also be used to display data and other statistics about terminals, transactions, cards and card usage, and so on. For example, in one embodiment a web portal is provided to allow merchants to control their terminals as an alternative to command tokens.

Dashboard displays can be included with the portal to give merchants an overview of the status of or statistics of their terminals including, for example, security, integrity, encryption status, number of swipes, number of rejected cards, and so on. As another example, an issuing bank portal may be provided to give the issuing bank the ability to view statistics or other information on its cards and transactions with its cards, or to a merchant to enable or disable encryption for its cards (to request a merchant to do so, or to send a command to one or more terminals to toggle encryption on or off). Terminals can also be implemented to allow multiple logins per account with security rights per user; dashboard displays to visually shows each terminal with status information; provide the ability to turn off a terminal in real-time, which in one embodiment can be accomplished by rejecting any transaction originating from a serial number; and the ability to set thresholds, for example, for Analytics Ratings by terminal/serial number, geographic regions, etc.

In another embodiment, the web portal can be used to allow a user to generate command tokens or to update command tokens. For example, in one embodiment, command cards can be ordered using the portal and shipped to the merchant or other user. In another example, a printer or other token writing device can be provided to allow the merchant, or other user to create his or her own tokens on site. Additionally, techniques can be provided to allow existing command cards to be updated using the web portal.

In one embodiment, the returned information for a transaction, such as, for example, a returned authorization, can signal the completion of a transaction. In another embodiment, the authorization can simply be approval for the transaction and a subsequent transaction is used to actually consummate the transaction, or to otherwise complete or settle the accounts. For example, in terms of the bank card examples, the initial communication and authorization received may simply be an approval for the transaction and a subsequent settlement transaction typically takes place such that the funds can be allocated appropriate to the transaction. In some conventional transaction-processing networks, a batch settlement file is maintained at the terminal 114 or other merchant location where multiple transactions accumulated and are saved in a file. For example, a day's worth of transactions may be saved in a batch settlement file. For settlement, the batch settlement file can be transmitted to the transaction-processing network 123 for account settlement.

Because merchants may accept bankcards from a variety of different financial institutions, the batch settlement file may contain transaction information to be processed by more than one transaction processor. For example, a merchant may accept cards from various entities such as VISA, MASTERCARD, AMERICAN EXPRESS, and so on. Additionally, some or all of the token information for some or all of the tokens may have been encrypted by electronic data capture device or other device when the transaction occurred. As such, information in the batch settlement file may include encrypted information such as encrypted account information (in whole or in part) or other encrypted information.

Figure 18:
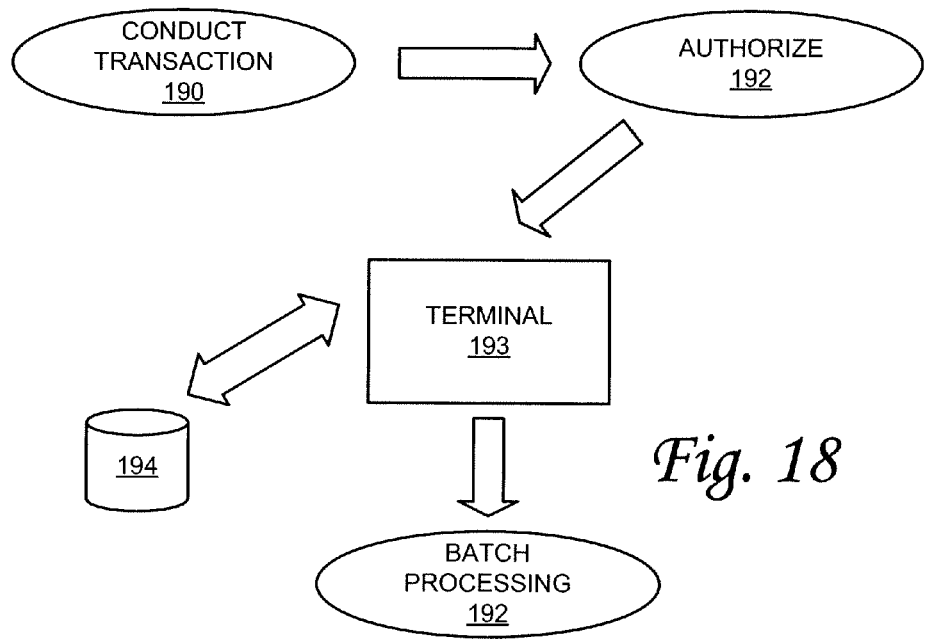
FIG. 18 is a diagram generally illustrating such a batch settlement process in accordance with one embodiment of the invention.

FIG. 18 is a diagram generally illustrating such a batch settlement process in accordance with one embodiment of the invention. As discussed, a transaction is conducted 190 and sent to transaction-processing network 123 for authorization 192. In one embodiment, some or all of the token data can be stored by terminal 193 (for example, in batch settlement file 194) while it awaits authorization from the transaction processor. When the authorization is returned from the transaction processor, the settlement file 194 can be updated to include that transaction as an authorized transaction. At a predetermined time, the file containing the authorized transactions can be sent to a transaction processor for batch processing 192. In batch processing, the transactions can be processed and the accounts settled accordingly.

In conventional processing networks, such a batch settlement technique can be performed in a relatively straightforward fashion where all of the information is in clear text form. For example, with clear text routing and account information, transaction in the batch settlement file can be routed relatively easily to the appropriate transaction processors, the account information processed and the settlement consummated. However, where some or all of the token information is encrypted, this may require certain considerations for handling settlement data to ensure that the appropriate decryption can take place and the appropriate routing can take place across a number of different transactions with different merchants and different institutions.

For example, consider one or more embodiments discussed above where PAN or other data is encrypted using a terminal ID or a merchant ID. In such embodiments, the encrypted token information for a given token may vary from merchant to merchant or even from counter to counter within a given merchant. Additionally, where sequence numbers or other rolling key techniques are implemented, token information can vary from transaction to transaction, even for the same token used at the same terminal. As such, this could present a challenge when processing the data from that token for settlement. Therefore, in one embodiment, a decryption service can be included to provide decryption for settlement transactions between merchants (or other transacting entities) and institutions or other transaction processors.

Figure 19:
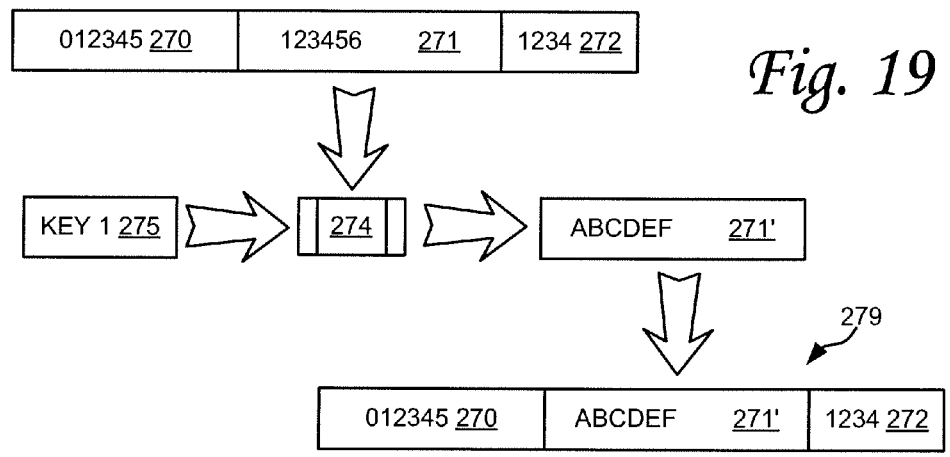
FIG. 19 is a diagram illustrating one possible encryption technique in accordance with one embodiment of the invention.

Before describing such a decryption technique, one possible encryption technique is described with reference to FIG. 19. FIG. 19 is a diagram illustrating one possible encryption technique in accordance with one embodiment of the invention. Referring now to FIG. 19, the PAN portion of token data is illustrated as having BIN data 270, a portion of account data 271, and the last four digits of the account number 272. In this example, the six middle digits of the account number 271 are encrypted using a key 275 via encryption module 274 to create an encrypted six account digits 276. As discussed above, in one embodiment key 275 can be, for example, a merchant ID. The encrypted account information 271' can be reinserted with the BIN 270 and last four 272 to create a new PAN 279 that includes part of its data in encrypted form. Thus, in this example, a card swipe of the same card at different merchants would provide a different transaction data 279 for each transaction. Likewise, if a counter or other rolling technique is used the account information can change even at the same merchant.

Figure 20:
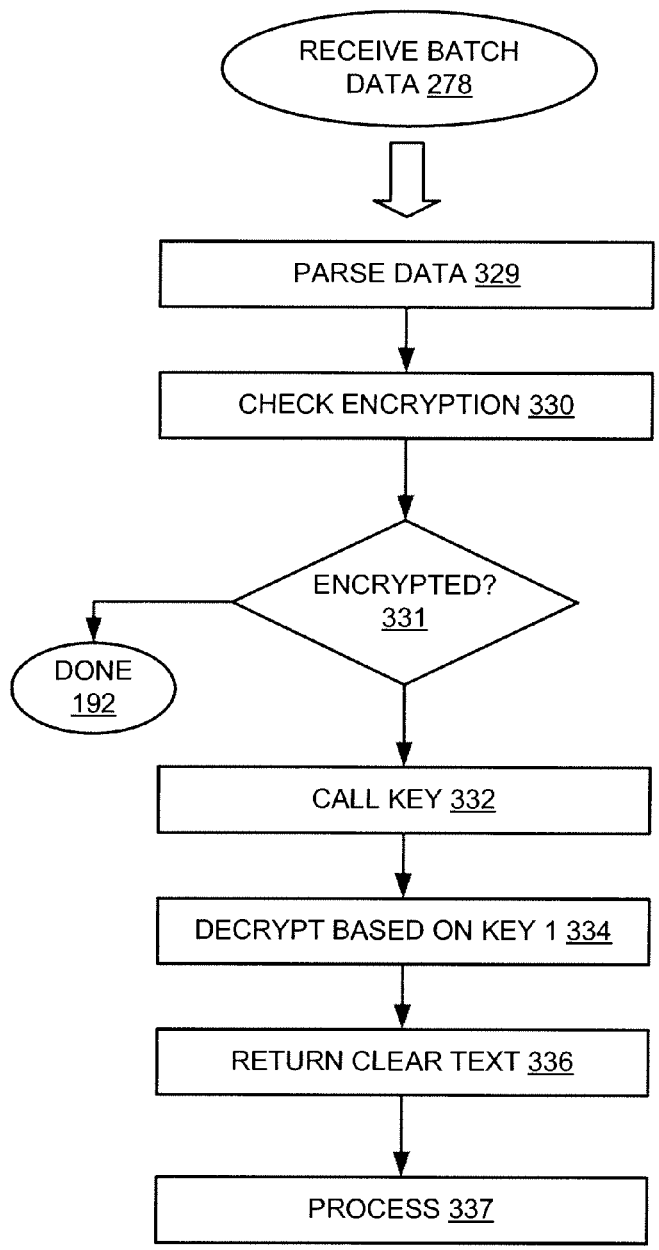
FIG. 20 is an operational flow diagram illustrating a process for processing batch settlements where some or all of the account data has been encrypted, in accordance with one embodiment of the invention.

FIG. 20 is an operational flow diagram illustrating a process for processing batch settlements where some or all of the account data has been encrypted, in accordance with one embodiment of the invention. The example of FIG. 20 is described in terms of the above example illustrated in FIG. 19 where a portion of the PAN is encrypted utilizing the merchant ID as the key 275 and repackaged into an encrypted PAN 279, wherein, in this example, the encrypted PAN 279 includes a concatenation of clear text data and encrypted data. Referring now to FIG. 20, in a step 278 the batch data is received. In one embodiment, this is received as a batch settlement file that can be a text or other like file and can include a plurality of records for a plurality of transactions.

As discussed, in one embodiment, and indeed in the preferred embodiment, the decryption described herein can be performed at a gateway or other server, and the gateway can then communicate the appropriate information to the designated transaction processor. Thus, the gateway can include the appropriate decryption and encryption modules or otherwise have access (preferably secure access) thereto. More particularly, in one embodiment, the gateway can send the batch settlement file to a secure transaction processor for processing.

In a step 330, the process checks to determine whether a given data record in the batch settlement file contains encrypted data. If not, the process is completed and the clear text data can be forwarded to the appropriate transaction processor for settlement. In one embodiment, a flag can be set in the record, or some other indication can be made to indicate whether the data is encrypted or in clear text. This can be useful, for example, in applications where an interim server (for example a gateway), does not need to know whether a received account number is a valid number (receipt of an apparently invalid number could indicate the presence of encryption).

To illustrate by way of example, in one embodiment, to avoid adding additional characters to the transaction data stream and thereby facilitating compatibility with conventional processing systems, one technique for flagging the encryption status of a data package is to increment the expiration date by a large enough number to unambiguously indicate the presence of encryption. For example, in one embodiment, the expiration date is incremented by 12 years. Thus, in such embodiments, expiration dates can serve as a flag and can be checked to determine the encryption status. One advantage of incrementing the year by 12 (or some other value) is that the original expiration date can easily be recovered by reversing the operation. This scenario is suitable for current bankcard transactions, as such cards typically have expiration dates that are two to five years in the future. Thus, when an expiration date occurs that is 12 or more years in the future, the system can determine with a fairly high degree of certainty whether the data is encrypted. As another example, in one embodiment the expiration date or a part thereof can be substituted with a flag string such as, for example, all zeroes or all nines. As another example, a separate field can be added to the record to indicate whether some or all of the data is encrypted.

Thus, for encrypted data sets, in a step 332 the appropriate key is called from a data store. For example, in the example embodiment illustrated in FIG. 19, the merchant ID or key associated with the merchant ID is called to decrypt the transaction data. In one embodiment, the batch settlement file can include an indication of the merchant from which the file was sent thus informing the decryption engine which key to use. For example, header or other file information included in the batch settlement file can indicate the merchant ID or other information that may be useful in generating, retrieving or otherwise determining the appropriate keys for decryption. Likewise, each record can also be appended to include information (for example, sequence information) for generating, retrieving or otherwise determining keys associated with the particular transaction. Also, because different institutions may have different encryption standards or requirements, the encryption process may vary based on information such as, for example, a BIN range, or other factors. In such applications, the decryption process (whether for batch settlement or otherwise) can likewise be tailored to enable appropriate decryption. Thus, in one embodiment, the BIN range (or other factors) can be used to retrieve the appropriate key(s) to be applied to decrypt the appropriate data item(s).

In a step 334, the data is decrypted using the appropriately retrieved key(s) and clear text information is returned in step 336. Additionally, in embodiments where the expiration date has been changed to indicate encryption, the expiration date can be returned to its original date and reinserted into the data.

In embodiments where this cash settlement decryption occurs at a gateway or other interim server, the server can now forward the transaction to the transaction processor where it is processed in step 337. Where this step occurs at the transaction processor, the data may be used by the transaction processor upon decryption. In one embodiment, the transactions can be separated from the overall batch file and sent individually or in subsets to their respective transactions processors. In another embodiment, the batch file can be reconstructed with the clear text information and sent for processing, for example, to a clearinghouse or other central processing site, or to another routing device to route transactions to their appropriate processors.

In embodiments where a gateway or other interim server is utilized to perform the batch settlement decryption, re-encryption of the data can be performed prior to sending the data onto the transaction processor for final settlement. For example, particular key regimes can be instituted between the gateway 120 and appropriate transaction processing entities to ensure that the data can be encrypted (for example, by a secure transaction module 145 associated with the server) for transmission by the gateway and appropriately decrypted by the transaction processing entity. As one example, a secure transaction module 145 may maintain a set of keys with the gateway and those keys can be used to encrypt transactions that are to be forwarded to that given entity. After reading this description, it will be apparent to one or ordinary skill in the art how to use other encryption techniques between a gateway 120 or other interim server and the transaction processing entity.

Performing settlement file decryption at an intermediary entity or entities such as a gateway 120 or other server can provide the advantage of allowing the interim server to accept data from multiple diverse sources and, in embodiments where encrypted data may change from transaction to transaction, to accept data from multiple transactions. Thus, in such an embodiment, the server can act as a data formatter to put the data from diverse sources in diverse forms into a common format for a given transaction processor.

As discussed above, a variety of different encryption techniques can be utilized to provide encryption of some or all of the token data 111, pin data, or other data. As just a few examples, hash functions, substitution tables, electronic code book encryption, modulo additions can be used to encrypt the data. Indeed, as would be apparent to one of ordinary skill in the art after reading this description, any of a variety of encryption techniques can be utilized. Now described are one or more techniques that can be used to perform encryption in accordance with various embodiments of the invention.

Figure 21:
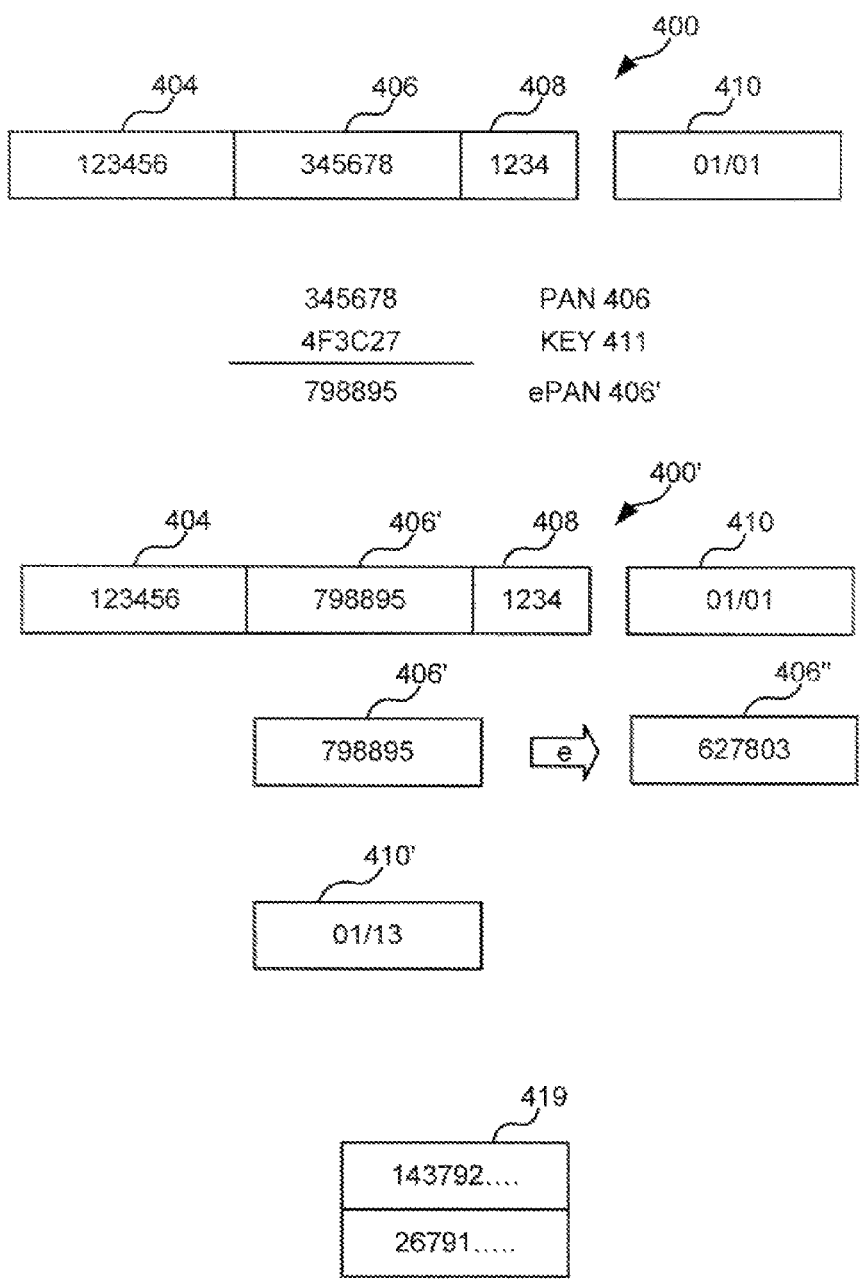
FIG. 21 is a diagram illustrating an example process for data encryption in accordance with one embodiment of the invention.

FIG. 21 is a diagram illustrating an example process for data encryption in accordance with one embodiment of the invention. Referring now to FIG. 21, the example illustrated describes an embodiment wherein a portion of the received data stream 400 is encrypted. More particularly, in the illustrated example, a portion of the account number (sometimes referred to as a PAN) is encrypted. In the illustrated example, the bank identification number 404, the last four of the digits of the account number 408, and expiration date 410 are left in clear text, while the middle six digits 406 of the account number are encrypted. For ease of discussion, the middle six digits of the account number 406 are referred to as PAN 406, even though they make up only a portion of what might typically be considered the account number string.

Referring to the illustrated example, the portion of the account number that is encrypted (PAN 406) is made up of the numeric string 345678. The key in the illustrated example is represented in hexadecimal form by the sequence 4F3C27. As discussed above, key 411 can come from any of a number of sources such as, for example, a merchant ID, a terminal ID, a serial number, or other key source as may be determined for a given application. In this example, the central portion of the account number 406 is modulo 10 added to key 411 to arrive at an encrypted PAN 406'. In the illustrated example, as a result of the modulo 10 addition the encrypted PAN 406' yields the string 798895.

Illustrated as data block 400' is the reconstructed data string with the encrypted PAN 406' put in place of the original account number portion 406. In one embodiment, this data can repackaged and transmitted as the transaction data with a portion of the account number rewritten as encrypted PAN 406'. In another embodiment, the encrypted portion of the PAN 406' can be encrypted again to result in an encrypted PAN 406", which in this example is the string 627803.

For example, in one embodiment, the encrypted portion of the account number 406 is encrypted using a key such as, for example, a merchant key. This portion of the data can be re-encrypted with a second key for enhanced security or to provide additional features. For example, this portion of the data can be encrypted again with the terminal ID and a rolling counter to ensure that the data looks different for each merchant as well as for each swipe even at the same terminal. Although in the example illustrated in FIG. 1 performs the second encryption on the encrypted portion of the account number 406', other embodiments contemplate this second encryption step being performed to the entire data set or other portions of the data set as may be determined appropriate for a given application. Thus, some or all of data block 400' can be encrypted with the second key and repackaged to create a new data block. Additionally, this operation is not limited to the data items shown (bin, middle portion of account number, last four, and expiration date) but can be used with any or all of the data on one or more tracks of a bank card or other data as may be associated with a given token 111, regardless of token type.

Also illustrated in FIG. 21 is an updated expiration date 410'. As stated above, in some embodiments a flag or other indicator can be set to provide an indication to subsequent processing equipment regarding whether the transaction data includes encrypted data. In this example, the expiration date is incremented by twelve years to indicate that the transaction has been encrypted in accordance with a given encryption paradigm. As would be apparent to one of ordinary skill in the art after reading this discussion, alternative flags or indicators can be utilized. One advantage that might be obtained by altering the expiration date (or other token data item) is that the indicator can be included in the data set without requiring additional fields to be included. Another advantage that might be obtained by altering the data in a predetermined manner is that the original data can be recovered for use in processing.

Also illustrated in FIG. 21 is a substitution table 419 that can be further utilized in the encryption process. For example, an entry in a substitution table can provide an additional measure of security in the encryption process. For example, when the encryption is performed utilizing modulo 10 addition, a would-be perpetrator of fraudulent activities could, given multiple sets of encrypted data, work backwards to determine the encryption key. Thus, using a substitution table, to substitute table entries for key values is one way to hinder the ability of someone to work backward to obtain key information. For example, in terms of the scenario illustrated in FIG. 21, key 411 is made up of the string 4F3C27 and the first entry in the substitution table 419 includes the string 143792 . . . . To use the substitution table, the process first determines that the leftmost digit in key 411 is the numeral 4. Thus, the process would look to the fourth digit in the appropriate entry of the substitution table 419, which in this case is the numeral seven (enlarged in the Figure for emphasis), and this numeral substituted for that digit of the key. The process could be implemented to continue in a like manner for the remaining digits of the key such that a given key is properly substituted with a designated entry in a substitution table.

In one embodiment, the substitution table entries themselves can be changed on a periodic basis or from time-to-time to provide further data security. With changing values in a substitution table, it can require even more effort to trace backwards to find an encryption key. For example, in embodiment, substitution table entries are generated using a random number generator or other algorithm and like entries can be generated at the decryption end using a similar algorithm to duplicate the substitution table at the server. More particularly, in one embodiment, the seed for the random number generator is a merchant key itself As this example serves to illustrate, a number of different configurations can be implemented to populate and utilize a substitution table in the encryption process. This also serves to illustrate that other mechanisms alternative to substitution tables can be implemented to further obscure the key or the encryption process.

In some applications, token data can include a mod 10 check character or other code, character or characters to provide a check to the data. In such applications, a receiving system will perform a designated operation on the received data to see if the check character matches that provided. For example, the digits of the received string might be modulo 10 added together to see if they arrive at the same modulo 10 checksum. If so, this is an indication of the validity of the received data. However, in above-described embodiments, some or all of the token data is encrypted. Where at least some of the data is used to generate a check character or check sum, re-computing the check sum at the receive end would (or statistically should) result in an error. Therefore, in one embodiment of the invention, this character or string of characters is recreated and inserted into the data stream after encryption, such that the check can occur at the receiving end using the encrypted data. Such an embodiment would be useful to enable the identified encryption techniques to be used with conventional data processing systems, for example, that have been configured for operation with unencrypted data sets. As another alternative, the encrypted data items can be decrypted prior to performing the error check.

Figure 22:
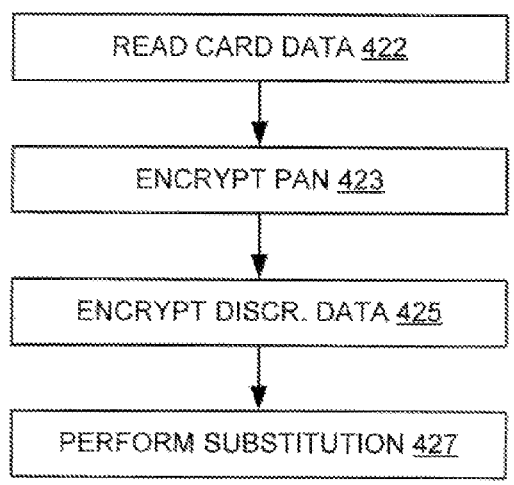
FIG. 22 is a diagram illustrating a process for performing such encryption in accordance with this embodiment of the invention.

Embodiments have been described above wherein some or all of the token data 111 is encrypted for secure transmission. For example, one embodiment associated with bank cards was described as encrypting a portion of the account number while leaving the bank identification number and other information in clear text form. Another embodiment is now described wherein a portion of an account number is encrypted and discretionary data on the card is also encrypted. FIG. 22 is a diagram illustrating a process for performing such encryption in accordance with this embodiment of the invention. Referring now to FIG. 22, in a step 422 the token data is read. In this example, the token data is the track data from a bank card or other like card. In a step 423 the designated portion of the account number is encrypted. For example, in keeping with one of the above-described scenarios, the first six digits (or BIN) are kept in clear text, the next six digits are encrypted (PAN 406 in an above example), and the last digits remain in clear text. In a step 425, the discretionary data is encrypted and in a step 427 the encrypted data is repackaged with the remainder of the track data for transaction processing.

Figure 23:
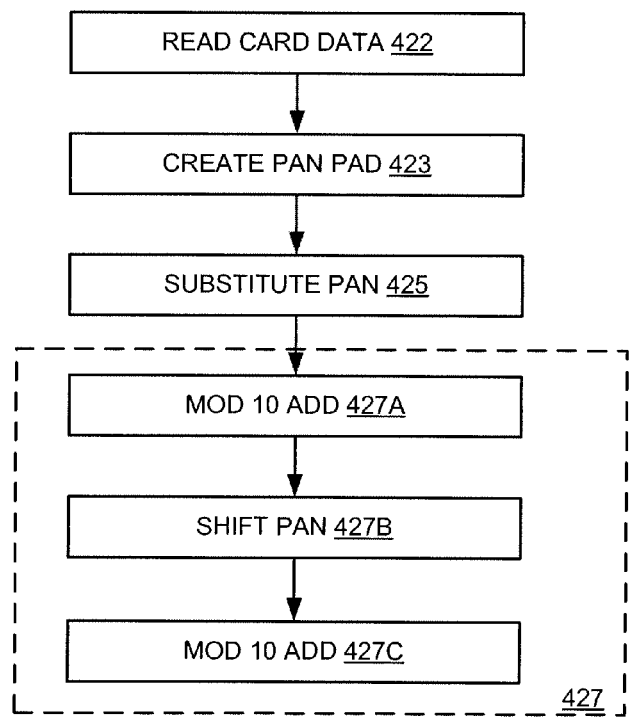
FIG. 23 is an operational flow diagram illustrating a process for encrypting a portion of the account number in accordance with one embodiment of the invention.
Figure 24A:
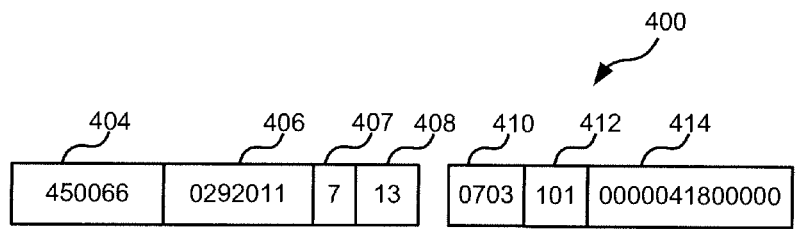
FIGS. 24A, 24B and 24C, is a diagram illustrating an example of creating a pad and translating the PAN (primary account number) using substitution tables in accordance with one embodiment of the invention.
Figure 24B:
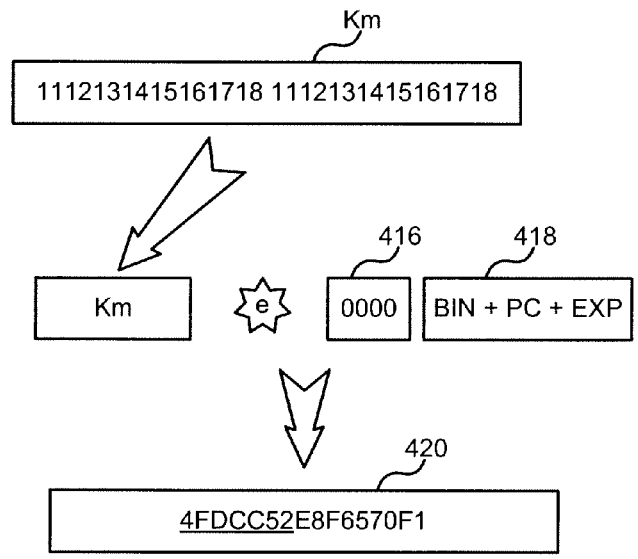
Figure 24C:
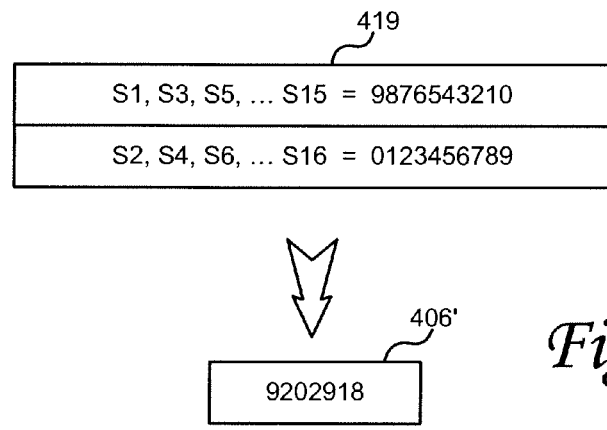
Figure 25:
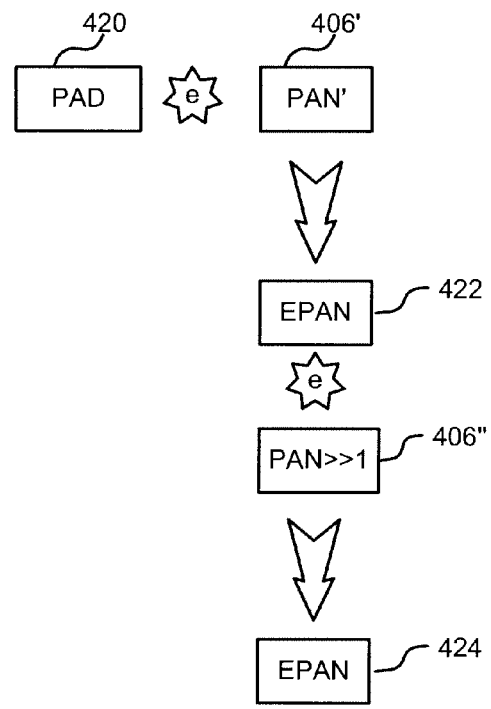
FIG. 25 is a diagram illustrating encryption of the PAN in accordance with one embodiment of the invention.

One example scenario for performing encryption of the account information and discretionary data in accordance with the example of FIG. 22 is now described. After reading the following description, it will become apparent to one of ordinary skill in the art how alternative encryption techniques can be used with this and other embodiments. FIG. 23 is an operational flow diagram illustrating a process for encrypting a portion of the account number in accordance with one embodiment of the invention. FIG. 24, which comprises FIGS. 24A, 24B and 24C, is a diagram illustrating an example of creating a pad and translating the pan using substitution tables in accordance with one embodiment of the invention. FIG. 25 is a diagram illustrating encryption of the PAN in accordance with one embodiment of the invention.

Referring now to FIGS. 23, 24 and 25, in a step 422 the token data is read. For example, in the case of a bank card, the data from tracks 1, 2 or 3 is read. FIG. 24 illustrates an example of track data 400, or a portion thereof, comprised of a bin 404, a portion of account number 406, a checksum 407, the last two digits of the account number 408, an expiration date 410, a service code 412, and discretionary data 414. In this document and in this example, the central portion of the account number that is going to be encrypted designated by reference character 406 is referred to as the PAN 406. It should be noted that the account number in this example includes all sixteen digits 404, 406 and 408 and this is sometimes also referred to as the PAN. However, for this example, PAN 406 refers to the central portion of the account number, which in this example is the seven-digit string 0292011.

In a step 423, a pad is created for later use in encryption. In one embodiment, the pad is created by encrypting the bin 404, the last clear digits 408, and the expiration date 410 with a key. Although any of a number of keys can be used, in one embodiment, the key utilized is a merchant key Km. This is illustrated in FIG. 24B wherein the key Km is used to encrypt the bin, the clear digits, and the expiration date (represented by string 418) to create a pad 420. In this example, the encrypted string is filled with leading zeros 416 prior to encryption.

As a result of this operation, the pad 420 is created that can subsequently be used to encrypt PAN 406. In one embodiment, because PAN 406 is seven digits, the first seven digits of the pad 420 are used to encrypt PAN 406, although other alternatives are contemplated. Key Km can be a key from a number of different sources and stored in the detection device for use by encryption module 132, for example. In one embodiment, key Km is a merchant key, although other keys can be utilized.

In a step 425, a substitution table is used to translate pan 406 to create a translated pan 406'. An example is illustrated in FIG. 24C where a substitution table 419 includes two entries: one entry containing a string for the odd-placed digits and a second entry containing a string for the even-placed digits. In this example, each digit of PAN 406 is run through its respective odd or even table entry to find the substitution character to put in place thereof. Thus, the first digit of pan 406 would be run through the odd entry. As this first digit is a zero, the first entry (entry 0), which is a nine, is pulled from substitution table 419 and placed in the left-most digit of translated pan 406'. Likewise, the second digit is an even-placed digit and in this example is the numeral two. Thus, the third entry (the first entry corresponding to place 0) from the even entry of substitution 419 is placed in the second digit of the translated pan 406'. This operation continues in a like fashion to arrive at the string 9202918 for translated pan 406'.

In a step 427, the translated pan 406' is encrypted to result in an encrypted pan 422. One example process for this is illustrated in FIG. 25 wherein translated pan 406' is encrypted with pad 420 to result in an encrypted pan 422. In one embodiment, translated pan 406' is modulo 10 added with pad 420 to result in encrypted translated pan 422. In keeping with the current example, pad 420 comprises this string 4FDCC52 and translated pan includes the string 9202918. Note that in this embodiment where the encryption is modulo 10 addition, the first seven digits only of pad 420 are used. Pad 420 is modulo 10 added to translated pan 406' and results encrypted translated pan 422, which in this example is the string 3734160.

In a step 427B, the original pan is shifted by one digit and in a step 427C modulo 10 added to the encrypted translated pan 422 to result in a final encrypted pan 424. In keeping with the illustrated example, the result of this addition yields the string 3753361 for final encrypted pan 424.

As would become apparent to one of ordinary skill in the art after reading this description, the above process can be implemented in reverse at the processing end of the transaction to arrive at the clear text pan 406.

Figure 26:
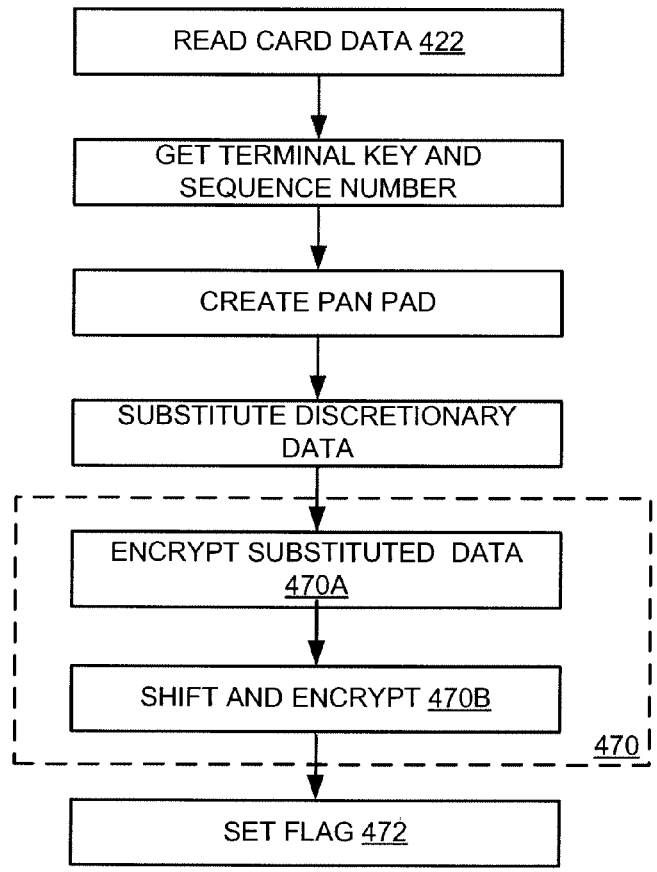
FIG. 26 is an operational flow diagram illustrating an example process for encrypting discretionary data in accordance with one embodiment of the invention.
Figure 27A:
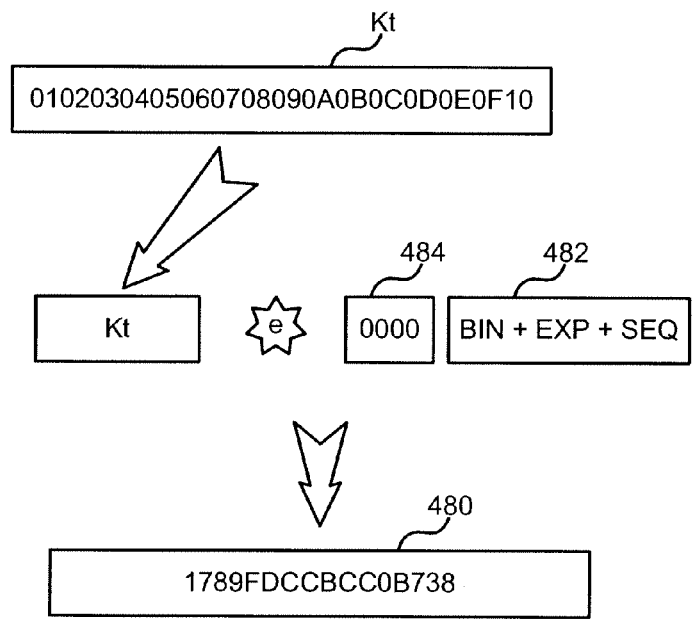
FIGS. 27a and 27b, is a diagram illustrating an example of creating a pad and translating the PAN using substitution tables in accordance with one embodiment of the invention.
Figure 27B:
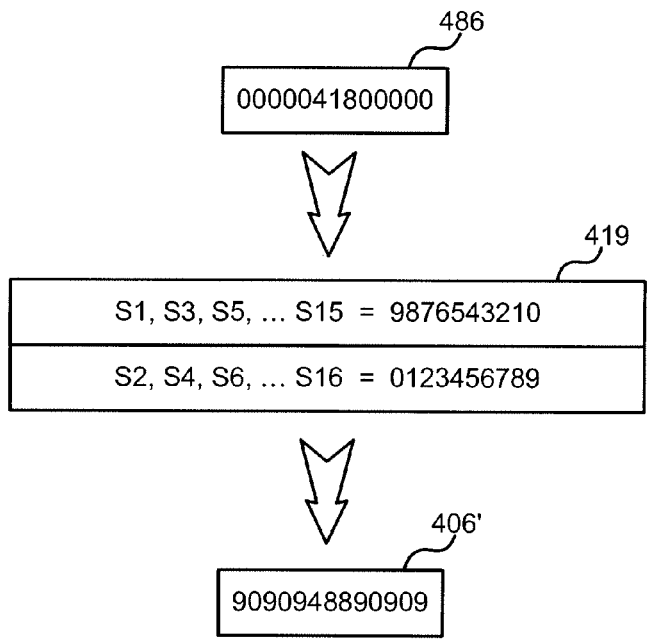
Figure 28:
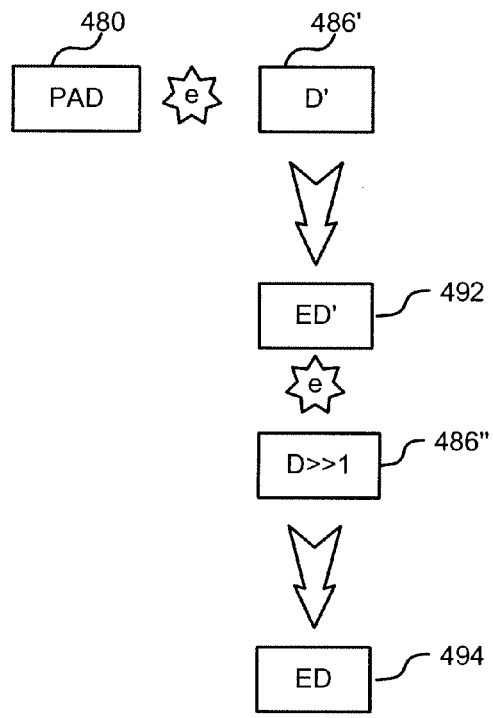
FIG. 28 is a diagram illustrating encryption of the discretionary data in accordance with one embodiment of the invention.

Referring back to FIG. 22, in the described example embodiment, discretionary data is also encrypted. Although a number of techniques can be used to encrypt discretionary data (as is the case with other encryption processes described herein). One example technique for encrypting discretionary data is now described with reference to FIGS. 26, 27 and 28. FIG. 26 is an operational flow diagram illustrating an example process for encrypting discretionary data in accordance with one embodiment of the invention. FIG. 27, which comprises FIGS. 27a and 27b, is a diagram illustrating an example of creating a pad and translating the pan using substitution tables in accordance with one embodiment of the invention. FIG. 28 is a diagram illustrating encryption of the discretionary data in accordance with one embodiment of the invention. Referring now to FIGS. 26, 27 and 28 in a step 462 the card data is read to obtain the discretionary data. In embodiments where encryption of discretionary data is performed along with encryption of other data, the discretionary data can be read at the same time.

In one embodiment, a terminal ID and sequence number are used to generate the encryption key for the discretionary data. Thus, in this embodiment, in a step 464, the system retrieves the terminal key and sequence number for use in this process. As one particular example, a terminal key Kt is illustrated in FIG. 27A. In a step 466, the terminal key is used to encrypt portions of the token data to obtain the pan pad 480. In the particular example illustrated in FIG. 27A, the bin number, expiration date number and sequence number 482, with a leading zero fill 484 are encrypted with key Kt to arrive at pad 480.

Additionally, the sequence number can be used to update the service table entry, or service code as may be appropriate. For example, in one embodiment, a service code can be replaced with a predetermined leading digit (for example, nine) and the least significant two digits are the sequence number. For example, in the example environment, it is common for credit cards to have a service code of 101. In the present example, the leading one can be replaced by a nine, and the second two digits, 01, can be replaced by the sequence number. As such, when a 9 is detected in the service code leading digit, the second and third digits are recognized as the sequence number, which can be used as such. The sequence number is used, and the service code can then be restored (for example, to 101). This can be another way to identify the presence of encrypted data.

In a step 468, the discretionary can be translated such as, for example, using a discretionary data substitution table. Thus in the example illustrated in FIG. 27b, the original discretionary data string 0000041800000 is replaced by translated discretionary data string 486' 9090948890909. In one embodiment, the same substitution tables can be used (i.e., tables 419) resulting in the above arrived at substitution, or different substitution tables can be used.

In a step 470, the discretionary data is encrypted. In accordance with the illustrated example, in a step 470A the pad 480 is used to encrypt substituted discretionary data 486' to result in encrypted substituted discretionary data 492. In one embodiment, this encryption can be accomplished by modulo 10 addition of pad 480 with translated discretionary data 486'.

In a step 470B, the discretionary data is shifted by one as illustrated by block 406" and encrypted with encrypted translated discretionary data 492 to arrive at encrypted discretionary data 494. In one embodiment, this encryption can be performed by modulo 10 adding encrypted translated discretionary data 492 with shifted discretionary data 406" to arrive at encrypted discretionary data 494.

Referring again to FIG. 22 in this example it was noted that after the PAN and discretionary data are encrypted a substitution can be performed in step 427 to package the data for the transaction. Particularly, in accordance with the example described with reference to FIGS. 23 through 28, the following string can be repackaged.

Additionally, a new mod 10 character can be generated and a new LRC resulting in the string illustrated in paragraph 8 of Appendix C. Additionally, a flag can be set such as adding twelve to expiration date. Thus, in the illustrated example, the repackaged data with the updated mod 10 character and LRC might look like: 4500663753361213= 19039130779474182100?.

To further illustrate the various encryption algorithm possibilities, an additional example encryption and decryption algorithm are now described. The example is described with reference to encrypting Track 2 data, but other data can be encrypted as well. In one embodiment, the algorithm can first check the data for the presence of a command card as described in more detail below. Then, in one embodiment, the algorithm generates a one time CTR (counter mode) 3 DES stream cipher encryption block, Ki. In this example, this is accomplished as follows:

a. Construct KA, a string of 64 bits consisting of concatenating, from left to right
      i. The Magnetic Stripe Reader key counter (MKC)
      ii. Pad the remaining area with the card issuer discretionary data (DD) up to and including the LRC character.
      iii. Pad any remaining area with '0', (0x30).
   b. Select the domain key (DMK) and the terminal key (TMK) set from the BIN mask key table
   c. Encrypt Ka with DMK, giving block Kb
   d. Decrypt Kb with TMK, giving block Kc
   e. Encrypt Kc with DMK, giving block Kd
   f. Expand 64 bit block Kd into a 20 digit decimal value into giving block Ke
   g. Drop the leftmost digit giving 19 digit stream cipher encryption block Ki In a next step, the data to be encrypted, (in this case, the track two data) is combined with the 3 DES stream cipher encryption block, Ki left to right as follows:

h. Using mod 10 addition, add Ki digits to the PAN excluding the first 1 through 6 digits based on the BIN mask key table** and the mod 10 check digit. Use the Ki digits from leftmost in succession.
   i. Using mod 12 addition, add the expiration month with the next Ki digit
   j. Using mod 100 addition add the expiration year with the next Ki digit
   k. Using mod 10 addition, add the next three Ki digits to the three service code digits.

The algorithm then generates a new mod 10 check character for the modified data, adds 5 to the new check digit (mod 10) and places it into the track two data. It then multiplies the MKC by 2 and places the decimal result in the PVV (5 digit pin verification field) track data field. Then it increments mod 50,000 (roll over at 49,000) and stores the new MSC, dropping the leftmost digit and mod 10 digit giving string EPAN.

For decryption in accordance with this example, in a first step, the decryption algorithm first completes a mod 10 check on the card data. If the check passes, it forwards the track two data without decrypting. If the check fails, the algorithm can check to see if this is command data. For example, in one embodiment, the algorithm can subtract 5 from the track data check digit (mod 10) and recheck using this new mod 10-5 check value. If check fails it forwards track data with mod 10 check error. Then, if the expiration year is 80 then the card data is a command. If so, it can process the command using the command decryption algorithm.

For decryption, the algorithm generates the one time CTR (counter mode) TDES stream cipher encryption block Ki as follows:
  a. Construct KA, a string of 64 bits consisting of concatenating, from left to right
    i. PVV from track data divided by 2, The MKC from reader.
    ii. Pad the remaining area with the card issuer discretionary data (DD) up to and including the LRC character.
    iii. Pad any remaining area with '0', (0x30).
  b. Retrieve terminal keys DMK and TMK and last MSC
  c. Compare the new MSC with the last stored value
    i. If new MSC is greater than the old MSC save the new value.
    ii. If new MSC is not greater than the old MSC flag a duplicate transaction error.
  d. Encrypt Ka with DMK, giving block Kb
  e. Decrypt Kb with TMK, giving block Kc
  f. Encrypt Kc with DMK, giving block Kd
  g. Expand 64 bit block Kd into a 20 digit decimal value into giving block Ke
  h. Drop the leftmost digit giving 19 digit stream cipher encryption block Ki The algorithm then combines the track two data with Ki left to right as follows and provides the clear text data.
  i. Using mod 10 subtraction, add Ki digits to the PAN excluding the first digit and the mod 10 check digit. Use the Ki digits from leftmost in succession.
  j. Using mod mod 12 subtraction, subtract the expiration month with the next Ki digit
  k. Using mod 100 subtraction, subtract the expiration year with the next Ki digit
  l. Using mod 10 subtraction, subtract the next three Ki digits to the three service code digits.

Using a stream encipher based on a merchant key, BIN and expiration date to encrypt the PAN can lead to the ability to uncover the encryption mask for cards with the same BIN and expiration date. In one embodiment, a hash code is used for the encrypted PAN digits and a hash table provided at the secure transaction module to contain the possible hashes and originating PANs.

In one embodiment, the encryption can be performed such that encryption of the data yields a plurality of bytes of encrypted data. For example, in one embodiment, encrypting six digits of the PAN can lead to binary data. The bytes can be selected and put back into the string. At decryption, the key can be used to generate al possible outcomes, and the secure transaction module can look up the PAN that generated the resultant outcome. As another example, the first for account digits representing the BIN or Bank Identification Number are left as clear text along with the card expiration date and the last four digits of the account number for the POS to use in card verification and receipt printing. Nineteen digits of the remaining card data can be converted to an 8-byte binary value. A time stamp can be added and the result encrypted. The 8 bytes of encrypted data can be converted to a 20 digit base 10 number, and the least significant 19 digits replace the selected card digits. The last digit, a 0 or 1, is added to a bank field. A new mod 10 character is generated and placed into the selected card digit. The combination of encrypted and clear text data output to the terminal.

In yet another embodiment, the encryption block size is may be larger than the available number of digits to be encoded. In such an embodiment, an output feedback mode or counter mode of block encryption may be employed. In these methods fixed data including such variables as the serial number and portions of the clear text card data along with a changing value such as a counter incremented with each block output is encrypted using the desired encryption algorithm. The output bits from the encryption can be combined (for example, XORed or modulo 10 added) with the data to be encrypted. In the case that the card digits to be encrypted range for 0 to 9, as commonly found for track 2 data, 3 bits of the encryption are XORed with each digit from 0 through 7. The digits 8 and 9 are left in clear text. Because fewer steps are often required for output feedback mode or counter mode of block encryption there use may preferred over other methods.

A BIN mask key table can be used to allow for selecting BIN ranges and encryption options for the installed keys. For example, in one embodiment a key is assigned to a BIN range based on a BIN Mask. Each entry might include a BIN mask, a domain key, a command key, a terminal key associated with the mask, and a MKC swipe key counter for the BIN mask. The BIN mask can include, for example, six bytes. In one embodiment, it is implemented such that any byte position that contains a digit 0-9 must match the corresponding card data to be selected; any byte position that contains 0xA or 0xB will match any value in the corresponding card data position; and byte positions containing 0xA will be encrypted while 0xB positions will be left in clear text in the track two data output.

In one or more embodiments described above, pin pads, magnetic stripe readers, RFID transponders, near-field readers, optical scanners, and other data capture devices can be configured or reconfigured to include encryption functionality to encrypt some or all of the token data as well as some or all of any associated additional data (for example, PIN data) for tokens 111 of various types. Encryption modules such as, for example, encryption module 132 can be included to provide functionality to perform desired encryptions. Additionally, as stated, memory or other data storage can be provided for keys, algorithms, associated firmware or software, interim and final processing results, and other encryption information. In some of the embodiments, some or all of the functionality, and particularly the encryption functionality and data storage, are described as being encapsulated within the token reader to provide a measure of data security.

At a point in time or from time-to-time it may be desired to upgrade or update or otherwise modify some or all of the encryption module to achieve, for example, updated keys, updated key generation algorithms, updated encryption algorithms, and other changes, modifications, additions or enhancements as may be desired from time-to-time. However, in embodiments where some or all of this functionality is embedded with the data capture device, such enhancements may be difficult to implement quickly, easily and in a cost-effective manner in the field. This can be exacerbated by the fact that in certain applications (for example, in the bank card applications) there may be thousands of data capture devices to update and maintain.

Therefore, in this and other embodiments, techniques can be implemented to perform such enhancements via download or other like mechanism. For example, in one embodiment, a command token can be provided that provides updates to encryption information such as, for example, keys, operational algorithms (for example, encryption algorithms, key-generation algorithms, hash functions and so on), stored data elements or other encryption information. For example, in one embodiment, a command token can be encoded with command information such that, when it is read by an electronic data capture device, it can cause the data capture device to be updated with the new encryption information. For example, particular characters or strings can be included with the command card to instruct the data capture device, upon reading the command token, to enter an update mode or to accept an update. Information on the command token or information from an external source can be downloaded to the data capture device to provide the necessary updates. In another embodiment, the electronic data capture device can be instructed to retrieve or receive downloads via a transaction communication data path or other data input path. For example, upon entry into an update mode, the data capture device can be configured to receive and accept information from a terminal, gateway, transaction-processing network entity, or other entity to perform the updates. As another embodiment, the electronic data capture device can be instructed to retrieve or receive downloads via a serial or parallel or other data port.

In another embodiment, an appropriate command or command string can be sent from the terminal, gateway, transaction-processing network or other entity to cause the electronic data capture device to enter an update mode or to otherwise accept updated algorithms, firmware, or other software, as well as encryption information items.

In one embodiment now described, a command token is used to initiate the update mode. To better illustrate this embodiment, it is described in terms of an example implementation scenario wherein the application of the electronic data capture device is a magnetic stripe reader configured to read bank cards. After reading this description, it will become apparent to one of ordinary skill in the art how command tokens can be implemented in other scenarios and applications as well.

Figure 29:
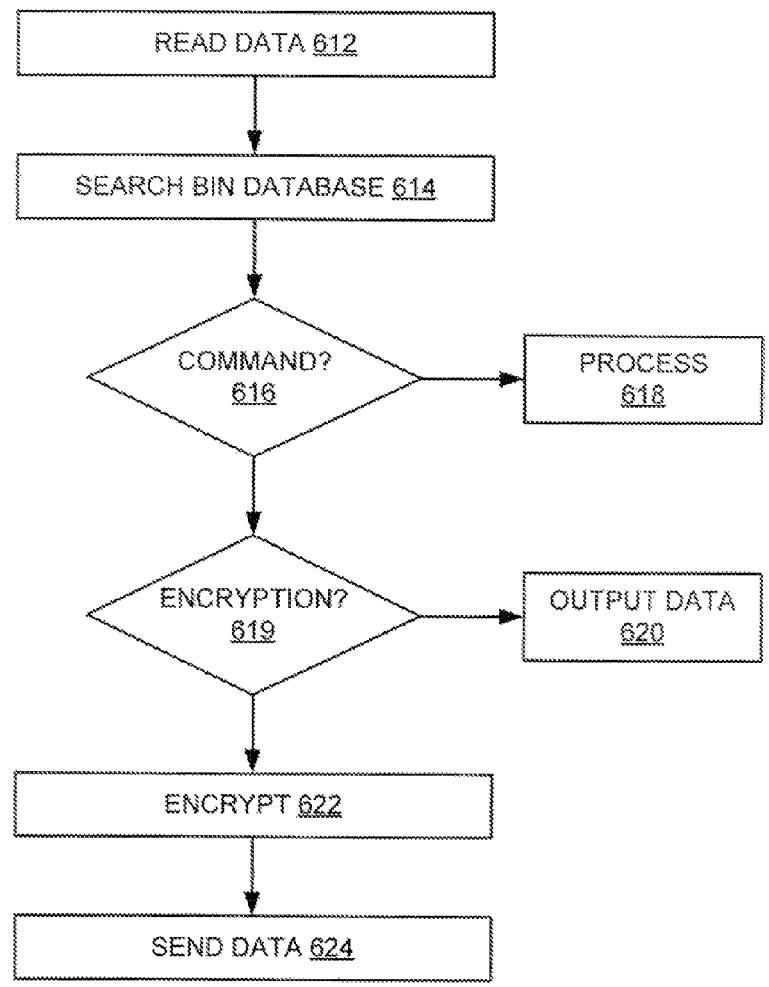
FIG. 29 is an operational flow diagram illustrating a process for initiating an update mode or other command mode in accordance with one embodiment of the invention.

FIG. 29 is an operational flow diagram illustrating a process for initiating an update mode or other command mode in accordance with one embodiment of the invention. This flow is described in terms of the example scenario where the command token is a magnetic stripe card. Referring now to FIG. 29, in a step 612, the command card is swiped at the magnetic card reader and its data read. In a step 614, the data on the command card is checked and in step 616 it is determined whether the data indicates that the card is a command card. For example, in one embodiment, a predetermined BIN number or range of BIN numbers is designated as being associated with a command card. As such, in this embodiment, in a step 614, the electronic data capture device can be configured to search the BIN data base to determine whether the received BIN information matches BIN information in the database indicating that the card swiped is a command card. Other characters or data strings can be used to indicate whether a given card is a command card, however, the present example is described in terms of a predetermined BIN or BIN range.

If, in step 616 it is determined that the card swiped is a command card, the command is processed in a step 618. For example, commands can be included to update algorithms, keys, merchant IDs terminal IDs, sequence numbers, or other encryption information. A few example embodiments for processing command card functions are discussed below. Other examples can include commands to turn encryption on or off for all cards or for certain cards. For example, commands can be generated to affect only cards with certain BINs or BIN ranges.

If the swiped token is not a command card, normal operation can ensue wherein in a step 619 the data capture device determines whether the data from the token is to be encrypted prior to sending it along for processing. If not, in a step 620, the data is output in clear text form. If, on the other hand, some or all of the token data is to be encrypted, in a step 622, the data can be encrypted, repackaged, and output as a token data stream as illustrated in step 624.

Figure 30:
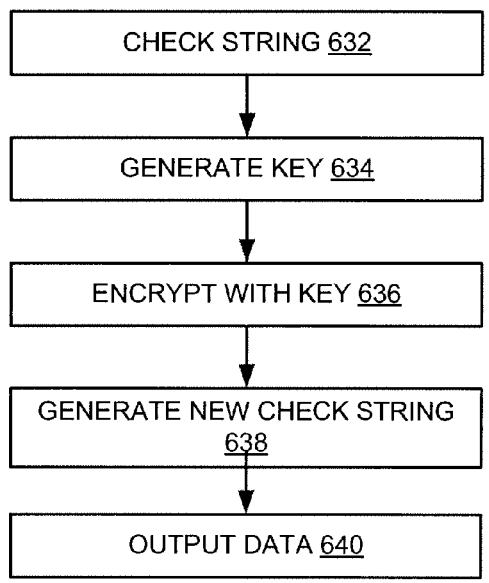
FIG. 30 is an operational flow diagram illustrating an example process for encrypting some or all of the token data in accordance with one embodiment of the invention.

FIG. 30 is an operational flow diagram illustrating an example process for encrypting some or all of the token data in accordance with one embodiment of the invention. As described above, with reference to one or more embodiments, a check character can be included in the token data to indicate card read errors or data transmission errors. Thus, in a step 632, the check character is checked to determine whether it is correct. If so, in a step 634, the appropriate key is generated or retrieved, the appropriate data encrypted with the key in a step 636. As also discussed above, to enable operation with downstream components a new check character can be created based on the encrypted data in step 638 and the data output for transaction processing in a step 640. In one embodiment, the system can be implemented such that an incorrect check character may indicate that the token is a command token (a command card in terms of the above-described example application).

Figure 31:
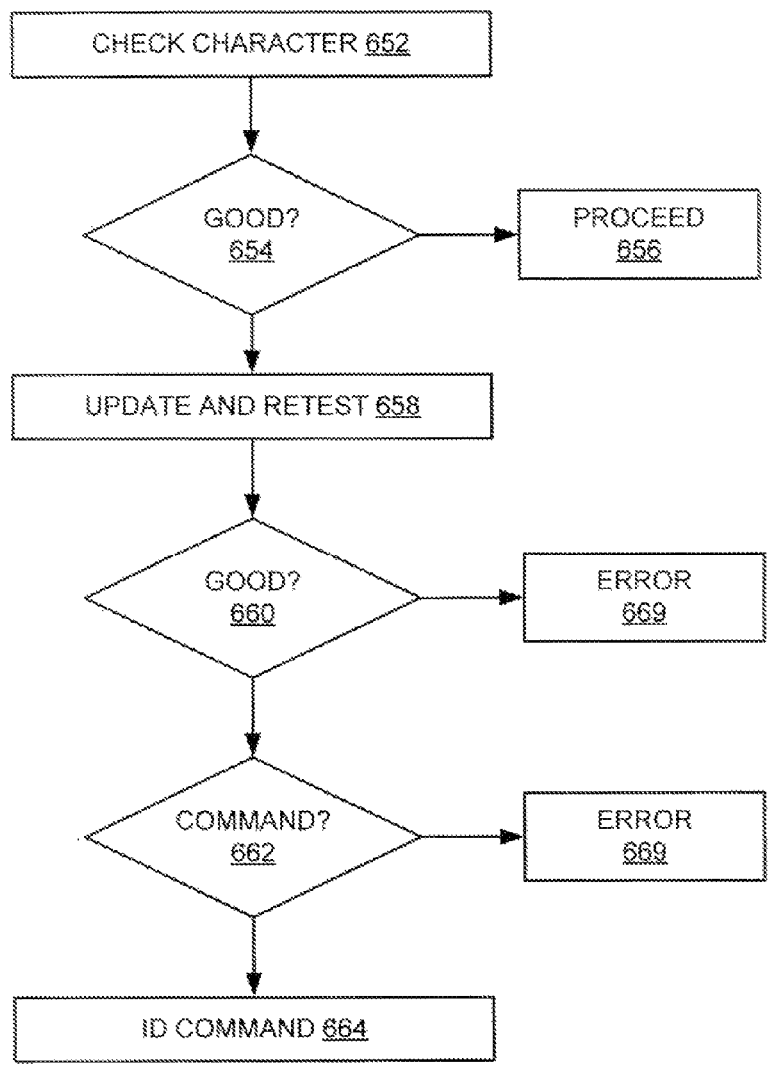
FIG. 31 is an operational flow diagram illustrating an example process for using the check character to determine whether the token is a command token in accordance with one embodiment of the invention.

FIG. 31 is an operational flow diagram illustrating an example process for using the check character to determine whether the token is a command token in accordance with one embodiment of the invention. Again, this description is provided in terms of the example application of a bank card. Referring now to FIG. 31, in a step 652, the check character is checked to determine whether it is correct. This can be the same as step 632 described above with reference to FIG. 30. If the check character is good, as illustrated by decision box 654, the encryption proceeds as illustrated by step 656. For example, in one embodiment, the encryption can proceed on a normal basis as described above with reference to FIG. 30. If, on the other hand, the check of check character reveals an error or otherwise invalid entry, the card can be retested.

In one embodiment, the check character can be modified in such a way such that a known error indicates the potential presence of a command card. For example, in one embodiment, the check digit is decremented by a predetermined value (for example, 5) to indicate the presence of a command card. Thus, in the illustrated embodiment, in a step 658, the value 5 is added to the check digit and the data retested. If the test fails in step 660, this may indicate an error in the data.

If, on the other hand, the test now passes with the updated check digit, this may be enough confirmation in one embodiment to indicate the presence of a command card. However, in another embodiment, additional information can be used to verify the presence of a command card or other command token. For example, as discussed above, in one embodiment a BIN or BIN range is used to identify a command card. In another embodiment, a particular expiration date value can also be used to identify the presence of a command card. As a further example, in one embodiment, the expiration date field of a command card is set to a value (for example, 80 or 99) to indicate that the card containing that data is a command card. Thus, in terms of this example, in a step 662 the expiration date is checked to determine whether it is set to the designated value and if so in a step 664, it is properly identified as a command card and the command can be processed. If, on the other hand, the expiration is not at the designated value, or the other command parameter does not match, depending on the embodiment, an error results as illustrated by step 669.

Figure 32:
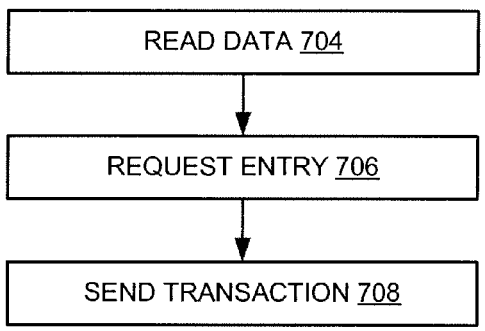
FIG. 32 is a diagram illustrating an example procedure for handling command tokens in accordance with one embodiment of the invention.

FIG. 32 is a diagram illustrating an example procedure for handling command tokens in accordance with one embodiment of the invention. Referring now to FIG. 32, in a step 704, data is read by the data capture device. For example, in the context of an example application using command cards having magnetic stripes, the magnetic stripe data is read by a magnetic stripe reader. As discussed above, one or more processes can be used to determine whether the card being read is a command card, or command token in other embodiments, or whether it is a conventional or non-command token.

As stated above, in numerous embodiments, the data that is read from the token, even if encrypted, can be packaged such that it contains the appropriate fields or at least is in the correct format as anticipated by the transaction processing equipment within the transaction-processing network. Also, as discussed above, in one embodiment, information resulting from the reading of a command token can be sent to downstream equipment for command processing. Thus, in one embodiment, in a step 706 the data capture device requests data entry of the user as if a conventional non-command transaction were taking place. Thus, for example, in terms of the bank card scenario, the data capture device might ask the user to enter a transaction amount such that this data can be plugged into the data package for transmission. In an alternative embodiment, fill data or dummy data can be included to ensure a complete data package is provided. In this manner, the transaction data can be complete for transmitting the command transaction to the server or other processing equipment.

In a step 708, the data is packaged and sent to the server or other processing equipment. As discussed, in one embodiment, this data can be packaged in accordance with a format expected by the downstream processing equipment. Additionally, in one embodiment, the data can be encrypted to provide a measure of security in the transmitted data.

In one embodiment, commands can be triggered at the data capture device upon reading the command token. Thus, encryption keys, encryption algorithms, firmware updates, and other command information can be provided to the data capture device or to the terminal directly from the command card. For example, command information might be included in the track data of the magnetic stripe card, or additional information might be included with the card to supply the appropriate command information. In another embodiment, tokens with memory or other data facilities can be used to provide command information updates to the token reader. For example, smart cards, chip cards, ICCs, etc can be used to provide command information to update the reader.

In one embodiment, command tokens can take the same form as conventional tokens, and provide data by the same mechanisms. In another embodiment, specialized command tokens can be provided. Consider again the bank card example, instead of a command card with a magnetic stripe containing command data, another form of token can be provided that can be read by the magnetic stripe reader. For example, a circuit card containing traces that carry electrical signals can be provided. The traces can be spaced along an area where the card is read by the reader. Electrical signals can be sent along the traces so that the magnetic head senses the electromagnetic field of the traces and reads this information as it reads magnetic stripe information. Thus, the use of traces and control logic to provide electrical signals along the traces in a desired pattern can be used to provide a command card. Such a command card could be programmable and reprogrammable, for example by programming the control logic associated with the card. In another embodiment, a magnetic transponder can be provided to be placed in proximity of the head and used to send electromagnetic pulses to the head such that it mimics the swipe of a magnetic card. The pulses are programmed to convey the command data to the head. Signatures or other keys can be provided with such alternative tokens to ensure authenticity. Additionally, PINs or other verification techniques can be used to verify the authenticity of the command token, the user and the location of use. In yet another embodiment, a card containing contacts can be used to make direct electrical contact with the read head to transfer command information via a physical conductive signal path. The contacts can be made to head structure items such as the casing, isolation plates between the tracks, the cores, or other contact points. Additionally, contact points can be added to make electrical contact with the command card for data transfer.

This information can also be sent to the terminal or other downstream processing equipment (including a PIN pad) to update the processing equipment as well. For example, for an update to keys, the updated set of keys can be transmitted to the transaction processing servers or secure transaction modules such that they have the correct keys to decrypt data that was encrypted by the data capture device. As a further example with respect to an update to keys, in an embodiment where the terminal decrypts the information prior to transmission, the keys can be provided to the terminal for decryption purposes.

These keys can be transmitted in an encrypted fashion to preserve their integrity. As another example, where a new random number generator or other algorithm that might be used to generate keys is provided as an update, this algorithm can be updated at the data capture device and sent, in some embodiments in encrypted form, to the transaction processing server to update their records as well. In an example where keys are generated at the data capture device or terminal, the new keys can be sent to the decryption service (for example, to a secure transaction module) in a transaction like message and can include the terminal identifier, new key and a new sequence starting number (sequence numbers need not be continuous). The decryption service may store historical keys for use with trailing transactions.

In one embodiment, the updated information sent to downstream equipment can be repackaged into the token data such that it replaces data that would otherwise be provided in a conventional token. For example, in the case of a bank card, the new information might be included as track data such that it can be extracted by the gateway or other transaction processing entity or server upon recognition that the transaction data includes command information.

In another embodiment, a command token can be used to trigger a data capture device to retrieve command or other update information from a terminal gateway transaction processing entity or other downstream transaction equipment. For example, a command card or other command token may result in a transaction being sent to a downstream processing device and upon decoding, the downstream transaction device retrieves the appropriate information (for example, updated keys, algorithms, firmware, and so on) and returns these to the electronic data capture device for updating. Preferably, in one embodiment, the returned items are returned encrypted so as to provide a measure of security.

As a further example to illustrate the possible functions that can be included, consider again an example for key updates. New keys might be included on the command card or the command card might instruct the data capture device to retrieve the keys from the terminal. Alternatively, the command card might initiate a transaction that causes new keys to be sent from another entity such as the secure transaction module. As another example, the command card might simply cause the data capture device or terminal to generate a new set of keys using a key generation algorithm, such as, for example, a random number generator.

Figure 33:
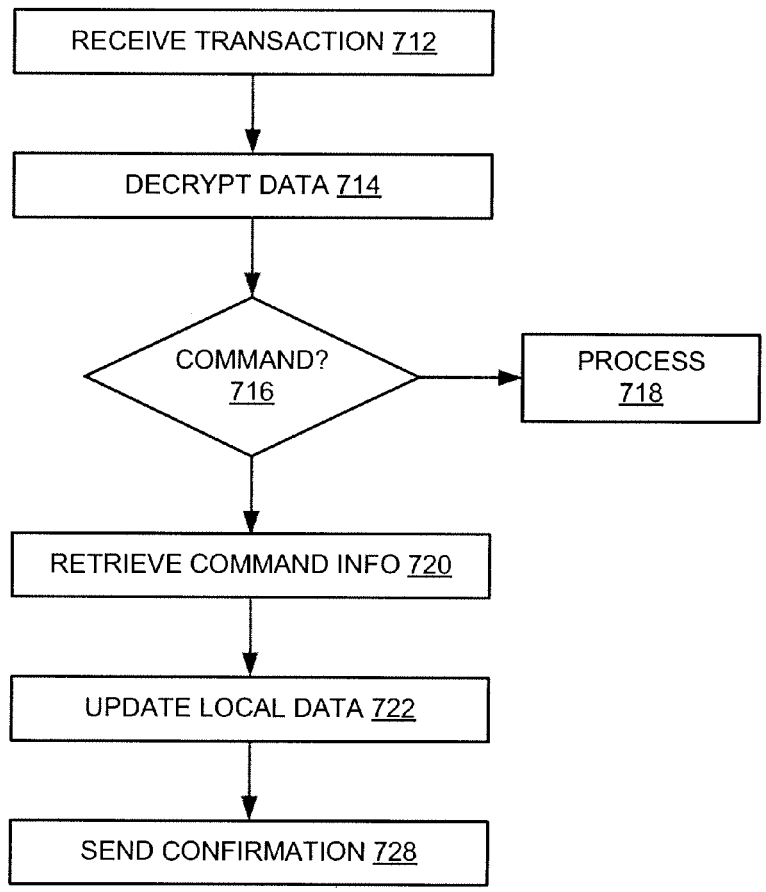
FIG. 33 is an operational flow diagram illustrating an example process wherein a gateway or other downstream entity receives a command transaction and returns command information in accordance with one embodiment of the invention.

FIG. 33 is an operational flow diagram illustrating an example process wherein a gateway or other downstream entity receives a command transaction and returns command information in accordance with one embodiment of the invention. Referring now to FIG. 33, in a step 712, a transaction is received at the processing entity. For example, in one embodiment, the transactions can be received at a gateway 120 and the transaction decoded and determined that it is a command transaction. For example, in terms of the embodiments described above, in a step 714, the appropriate decryption process can be called or the transaction sent to a secure transaction module such that the data can be decrypted and returned to the gateway or other transaction processing entity for handling.

Once decrypted, if it is not a command transaction, normal processing can ensue as illustrated by step 718. Alternatively, if the transaction is a command transaction as determined in step 716, the command information can be retrieved and acted on appropriately.

For example, in one embodiment described above, particular BIN ranges are assigned to indicate the presence of a command card and the bank card scenario. Thus, in such an application, the gateway or other transaction processing entity can check the BIN to determine whether it should be routed for normal processing or whether it is a command card and command operations should take place. In embodiments where the BIN range is sent is clear text, this information can be determined by the gateway or other processing entity upon receipt of the transaction. In embodiments where the BIN is encrypted, a decryption operation (such as that illustrated in step 714) may take place. To retrieve the clear text BIN such that the appropriate decision can be made. In yet another embodiment, only a portion of the BIN needs to be in clear text to make the determination. This example serves to illustrate how other fields in the transaction data might be used to identify the presence of a command transaction generated by a command token.

Continuing with FIG. 33, in this embodiment, command information is retrieved and returned to the data capture device for updating as illustrated in step 720. For example, in one embodiment, keys, algorithms, firmware updates, or other command information, can be retrieved as appropriate to the command and returned to the data capture device to update the device. Although not illustrated in FIG. 33, this information can be encrypted prior to transmission back to the data capture device for update.

In one embodiment, the information can be returned to a particular data capture device or alternatively broadcast to one or more data captures devices as may be appropriate for the given transaction. For example, a merchant may desire to update the merchant ID, or the keys, or a key generation algorithm from multiple terminals and may generate a command to update the information at the server (for example, at the gateway) and to have this information rebroadcast to all the terminals in that merchant's network. As such, the information can be broadcast to all of the terminals or a subset of the terminals as may be appropriately identified.

In a step 722 the local data at the gateway or other transaction processing entity or server can be updated as well to ensure that the appropriate keys, algorithms or other information are in place for use by the transaction processor in handling transactions generated by an updated terminal.

The process described with reference to FIG. 33 is one in which command information is retrieved by the server and sent back to the data capture device. In another embodiment, command information can be obtained based on the token data and used to locally update the data capture device or terminal prior to transmitting the information to the server. Thus, in this embodiment, the data capture device can be configured to update its local records and information to include the new command information. This information can be packaged for transmission in step 708 to the transaction processing server. As stated above, in the example application of bank card transactions, the information can be formatted and sent as track two data, or other track data, in one embodiment.

Figure 34:
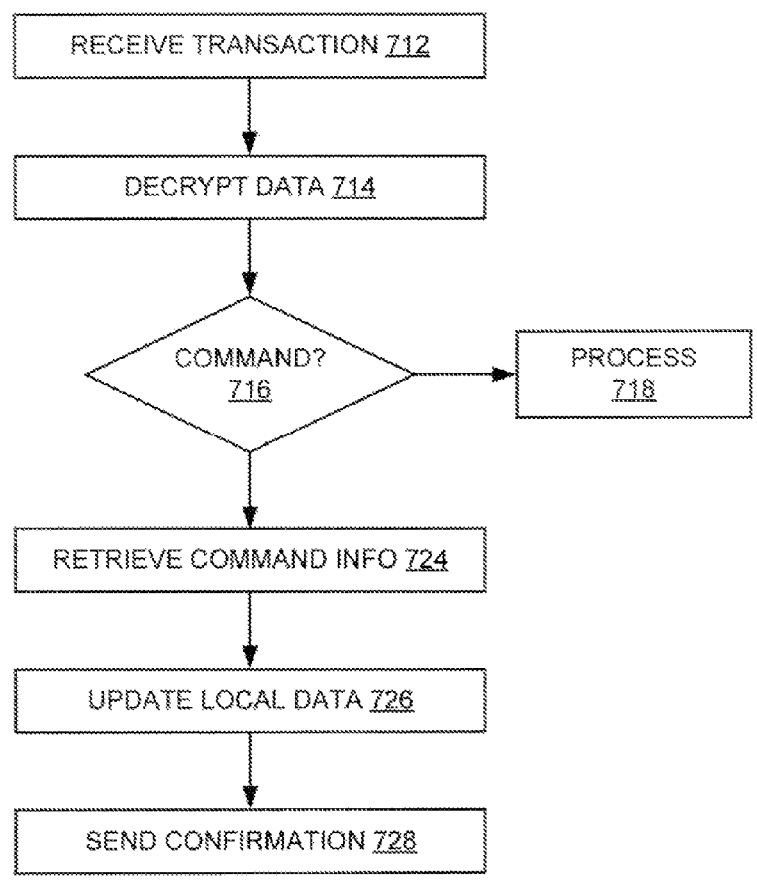
FIG. 34 is an operational flow diagram illustrating an example process for receiving this command information at the transaction processing server.

FIG. 34 is an operational flow diagram illustrating an example process for receiving this command information at the transaction processing server. Referring now to FIG. 34, in a step 712, the transaction is received by the transaction processor. For example, the transaction processor may be a gateway 120 or other transaction processing entity.

In one embodiment, reception of the transaction, decrypting information as appropriate, and determining whether the transaction is a command transaction can take place as discussed with reference to steps 712 through 718.

In a step 724 command information included in the transaction is extracted. Because this embodiment illustrates an example where the command information is sent from the data capture device to the processing server, this step 724 extracts that command information from the transaction and is used to update the local information in a step 726.

In one embodiment, including those discussed above with reference to FIGS. 33 and 34, a confirmation transaction can be returned to the data capture device to confirm that the updates have taken place. For example, instead of returning an "authorized" or "unauthorized" response to a purchase transaction, the server may return a command response that says, "keys updated" or "firmware updated" or "encryption enabled" other appropriate message indicating that the command information was successfully updated at the server. Or that the information was updated locally at the data capture device or terminal.

In one embodiment, the encrypted command information is stored as data in one of the tracks on the Command Card. Tracks 1, 2 or 3 can be used. Note that in one environment, a conventional bank card may have traditional track 2 information encoded at 75 BPI. In one embodiment in this environment, command data can be coded as track 2 data in place of the bank card information. In one embodiment, this data can be coded at a higher density, for example at 210 BPI. Thus, in such an embodiment, the different density can be used to detect the presence of a command card.

Once the command card has been swiped, the data capture device takes the appropriate action and then outputs track data to the POS device that is specially formatted to look and feel like a valid credit card swipe. For example, in embodiments where the encryption and command processing is embedded in the head, the head outputs the command information as Track II data to the terminal. In one embodiment, where the data is packaged as normal transaction data, the POS device is not aware that a command card has been swiped and treats the track II data as a normal credit transaction.

In one embodiment, the system can be implemented such that to use a command card, the user would perform the standard steps required to process a credit card transaction on the POS device. For example, the user would swipe the command card instead of a credit card to initiate the command card transaction. Once the command card transaction is initiated, the transaction is routed to a secure transaction module (for example, at the gateway or at a transaction processing entity). The secure transaction module decrypts the data and identifies that the transaction is a command card request. As stated above, in one embodiment this is accomplished by checking the BIN range used. In one embodiment, command cards can be configured to use a predetermined available BIN or BIN range.

After the command card is processed by the secure transaction module, in one embodiment a result code is returned to the gateway informing the gateway that a command card was just processed. In one embodiment, the gateway then routes the transaction back to the terminal with a DECLINE message (for example, such as those command responses outlined above). Also, because the result code received by the gateway indicates a command card, in one embodiment the transaction is not routed to the processor for authorization, but instead, back to the terminal.

In one embodiment, the following is a list of possible display elements that can be provided to a terminal user upon successful recognition of a command card, although others are possible. The below examples include examples where the commands are to toggle encryption on, toggle encryption off or set new encryption keys.

RESULT
DECLINE—TOGGLE ON
DECLINE—TOGGLE OFF
DECLINE—SET NEW KEYS

The reason a DECLINE message is used for the command cards in one embodiment, is that most conventional POS software applications are set up to do batch settlement. Therefore, a DECLINE message is sent to the POS device so that the POS application does not store the command transaction in the daily batch file.

To further illustrate the command token process, consider one example implementation of a command card that can perform one of three functions: TOGGLE ON, TOGGLE OFF, and SET NEW KEYS. Further consider an example where the encrypted data encoded on a track (for example, Track 3) of a "TOGGLE OFF" command card is:

+00001100644623463046405513090412157091607821470770813324442325529605762952169858225050?

The data capture device processes this command and formats the data to resemble typical Track II data found on a credit card. The data capture device turned off encryption and then generated valid Track II data to the POS device. Below is an example of the encrypted Track II data that is generated:

;5151111894206706=18109007592857178221?

In one embodiment, for example where a sequence number is used, each time the data capture device generates Track II data, it is a unique number. The secure transaction module is configured in one embodiment to store a one-way hash of this Track II data. With the track II example above, the track data is deciphered as:

;5151110302000206=06101015678901234560?

By looking at key elements of the track data, the secure transaction module identifies that this command was a TOGGLE OFF for specified BIN ranges and then removes the keys for this specific POS device.

The result is sent back to the gateway and the result code returned tells the gateway to return a decline with the accompanying decryption supplied by the secure transaction module. The terminal then displays DECLINE—TOGGLE OFF and the command card process is now complete.

Consider another example where the command card is configured to execute the command to set new keys. In this example, a swipe of the command card generates unique track II encrypted data with a specified BIN number. In one embodiment, the SET NEW KEYS command can be configured to generate new terminal keys each time the command card is swiped. This can be used to eliminate the need to have multiple SET NEW KEYS command cards. Continuing with this example, the user processes the Set New Keys command card as a normal credit card transaction. The user can enter a transaction amount to allow the transaction to be sent to the gateway. Again, the amount of the transaction is irrelevant, since in this embodiment, a decline will be received by the POS device.

The encryption module at the data capture device can be configured to encrypt track data using different keys based on a number of factors. One such factor is the BIN range. In other words, different BIN ranges can be set up to use different encryption keys. For example, VISA transactions (which have a bin range of 400000-499999) can be set up to use one set of keys while MASTERCARD transactions (which have a bin range of 500000-599999) can be set up to use a completely different set of keys. Likewise, command functions, including functions such as updating keys, modifying encryption algorithms, toggling encryption on or off, and so on can be performed for all transactions or for just a subset of transactions. For example, here too the BIN or BIN ranges can be used to establish the applicability of a given command. Thus, for example, a card issuer may issue a command card for its own token set.

Additionally, this approach can be configured to give the merchant, gateway, or processor the flexibility to handle a plurality of different transaction types. For instance, a merchant may have a loyalty card, stored-value card or store issued credit card that is routed to a different gateway or internal process than bank-issued cards. This functionality allows administrative selection of how different card types use (or whether they use) the encryption features of a data capture device application.

In one embodiment, signatures associated with command cards (or other command tokens) can be used to validate the command card prior to allowing the command transaction. For example, in the case of magnetic stripe cards, a SECURESTRIPE signature can be used to authenticate the card. Other signature techniques besides SECURESTRIPE can be used to verify the authenticity of the command card and the proper usage of the command card. Other information can be used to validate the usage of an authentic command token. For example, where a card is dedicated to a given merchant, the signature can be used to identify a card as belonging to that merchant, and the merchant ID in the datastream used to ensure that the command card is being used by the identified merchant. Likewise, a special key or other character string can be inserted in the command token to function like a signature, ensuring that the command card will only be used by a designated merchant, or in a designated fashion. As this example with merchant IDs illustrates, other data items can be used to authenticate a use of a command token, including serial numbers of the head or other data capture element, sequence numbers, location information, time stamps, user entered PINs or other codes, biometric data and so on.

A number of command algorithms can be implemented. A few example algorithms are now described. After reading this description, it will become apparent to one of ordinary skill in the art how other algorithms can be implemented.

In one embodiment a command decode algorithm can be provided. Where the processor determines that a command token data set is received it can, generate the one time CTR (counter mode) TDES stream cipher encryption block, Ki, as follows:
 a. Construct Ka, a string of 64 bits consisting of concatenating, from left to right
  i. PVV from track data divided by 2
  ii. Pad the remaining area with '0', (0x30).
 b. Retrieve the domain key (DMK) and the command key (CMK) for the BIN value given.
 c. Encrypt Ka with DMK, giving block Kb
 d. Decrypt Kb with CMK, giving block Kc
 e. Encrypt Kc with DMK, giving block Kd
 f. Expand 64 bit block Kd into a 20 digit decimal value into giving block Ke
 g. Drop the leftmost digit giving 19 digit stream cipher encryption block Ki The algorithm can then combine the track two data with Ki left to right as follows;
 a. Using mod 10 addition, add Ki digits to the PAN excluding the first 6 digits and the mod 10 check digit. Use the Ki digits from leftmost in succession.
 b. Using mod 10 addition, add Ki digits to the digits following the expiration date excluding the PVV. Use the Ki digits from leftmost in succession.

A command string can be constructed by concatenating left to right the expiration date month; expiration year (for future expansion); the card PAN minus the mod 10 check character; and all card data following the expiration date up to the end sentinel. The MSR Command Process Algorithm is selected based on the expiration month and year.

As another example, a change terminal key algorithm can be provided. In this example, a new key is generated. In this example, the first step is to generate a new random key. This can be done as follows:
 a. Construct Ka, a string of 64 bits consisting of concatenating, from left to right
  i. MSC for the selected BIN
  ii. Last card swipe entropy nuance
  iii. System clock cycle counter
 b. Encrypt Ka with BIN domain key DMK, giving block Kb
 c. Decrypt Kb with BIN terminal key TMK, giving block Kc
 d. Encrypt Kc with OEM key, giving block Kd Next the algorithm can expand 64 bit block Kd into a 20 digit decimal value giving block Ke. The 20th digit (0 or 1) is added to the current MKC *2 and the result placed in the output card data PVV field. The leftmost digit is dropped, giving 19 digit stream cipher encryption block Ki. The old old 64 bit terminal key is expanded into a 20 digit decimal value into giving block Ke. An MSR data stream is constructed to include:
 a. Start sentinel
 b. Input data 6 BIN digits
 c. Leftmost 11 digits from Ke
 d. Input data expiration date
 e. Next 3 digits from Ke
 f. The 5 digit PVV from 6 above.
 g. The remaining digits in Ke
 h. CRC of all preceding digits
 i. End sentinel A one time CTR (counter mode) TDES stream cipher encryption block Ki is generated as follows:
 a. Construct KA, a string of 64 bits consisting of concatenating, from left to right
  i. MSR key counter (MKC)
  ii. Pad the remaining area with the card issuer discretionary data (DD) up to and including the LRC character from the command card data.
  iii. Pad any remaining area with '0', (0x30).
 b. Select the key set from the BIN mask key table**
 c. Encrypt Ka with DMK, giving block Kb
 d. Decrypt Kb with TMK, giving block Kc
 e. Encrypt Kc with DMK, giving block Kd
 f. Expand 64 bit block Kd into a 20 digit decimal value into giving block Ke
 g. Drop the leftmost digit giving 19 digit stream cipher encryption block Ki Kd is saved as the new terminal key (TMK), and the track two data combined with Ki left to right as follows:
 a. Using mod 10 addition, add Ki digits to the PAN excluding the first 6 digits and the mod 10 check digit. Use the Ki digits from leftmost in succession.
 b. Using mod mod 12 addition, add the expiration month with the next Ki digit
 c. Using mod 100 addition add the expiration year with the next Ki digit
 d. Using mod 10 addition, add the next three Ki digits to the three service code digits.

A new mod 10 check character is generated for the modified data, and 5 added to the new check digit (mod 10) and placed into the track two data. The new key is output encrypted with the old key as a card swipe.

An example processor command request algorithm can be performed as now described. Where a card has been determined to be a command card, the algorithm generates a one time CTR (counter mode) TDES stream cipher encryption block Ki as follows:
 a. Construct KA, a string of 64 bits consisting of concatenating, from left to right
  i. PVV from track data divided by 2, The MKC from reader.
  ii. Pad remaining area with '0', (0x30).
 b. Retrieve the domain key (DMK) and the terminal command (TCk) key for the BIN value given.
 c. Compare the new MSC with the last stored value
  i. If new MSC is greater than the old MSC save the new value.
  ii. If new MSC is not greater than the old MSC flag a duplicate transaction error.
 d. Encrypt Ka with UDKA, giving block Kb
 e. Decrypt Kb with TCk, giving block Kc
 f. Encrypt Kc with UDKA, giving block Kd
 g. Expand 64 bit block Kd into a 20 digit decimal value into giving block Ke
 h. Drop the leftmost digit giving 19 digit stream cipher encryption block Ki The track two data is combined with Ki left to right as follows:
 a. Using mod 10 subtraction, add Ki digits to the PAN excluding the first six digits and the mod 10 check digit. Use the Ki digits from leftmost in succession.
 b. Using mod 10 subtraction, subtract the next three Ki digits to the three service code digits.
 c. Using mod 10 subtraction, subtract all remaining Ki digits from the card data input stream.

The CRC is checked for valid command request, and if there is an error, the error is flagged and the routine exits. The expiration date is checked for a command type and the requested command is processed.

As a final example, an exemplary key change command algorithm is now described. Once the validity of the key change command request has been verified, the algorithm concatenates the following 20 digits into string KIN, leftmost right:
- a. The seventh digit through the mod 10 check digit, (8 digits)
- b. The three service code digits
- c. The nine digits following the PVV The algorithm compresses KIN to 8 bytes of binary data in block Kn, saves as the new terminal key TMK, and acknowledged the completed transaction to the terminal.

A few example commands were described above. In one embodiment, the command token is implemented to have a data format similar to non-command tokens. For example, in the bank card environment a command card can be implemented to have a similar data format. In one embodiment in this example, the command card data format is very similar to a standard card with the exception that the expiration date code year is 80. In such an embodiment, the month of the expiration date can be used to indicate the selected command. For example, If the mod 10-5 for the card passes and the command year and month indicate a valid command, the data capture device will execute the requested operation.

A few example command codes are provided below. Commands 01/80-05/80 can be completed with a terminal that is not connected to a network. The MSR status LED can be used to indicate a successful command operation. In one embodiment, command 06/80 can be accomplished online or with a simulator for the new key to be transmitted and saved. Terminal keys can have a key usage counter, for example with a range of 0-49,999. They can be configured such that after the max count is reached the counter rolls over. To protect the terminal key from compromise, the terminal key can be changed periodically. For example, at least once every 50K card swipes for the particular bin range using the key. Other considerations may require more frequent key updates.

01/80 Manufacturer Change/Set OEM Domain Key
The command is encrypted with the manufacturer domain and terminal keys
Both the OEM domain and terminal key is set/updated with the 64 bit key
02/80 OEM Change/Set OEM terminal Key
The command is encrypted with the OEM domain and terminal keys.
The OEM domain key is set/updated
The OEM domain and terminal keys can be set to different customers to have control over selected aspects of the MSR
03/80 OEM Change/Set BIN Range Domain Key
The command is encrypted with the OEM domain and terminal keys.
The selected BIN range domain, terminal, and command are set to the input key.
The OEM will typically use this card to initialize the MSR for a specific customer
04/80 Distribution Change/Set BIN range domain key
The command is encrypted with the selected BIN range command and terminal key.
The secure distribution provider will typically use this card to set a number of terminals to accept the same domain key.
05/80 Distribution Change/Set BIN Range Command Key
The command is encrypted with the selected BIN range domain and terminal key.
The secure distribution provider will typically use this card to set a number of terminals to accept the same command key.
06/80 Change/Set BIN Range Terminal Key
The command is encrypted with the selected BIN range domain and command key.
The secure distribution provider or service technician will typically use this card to create a terminal generated and encrypted terminal key.

Several operational scenarios are now described to further highlight features and advantages of the embodiments described above. The inventions described herein and their multiple embodiments are not limited to applications as discussed in these scenarios. These scenarios are included to provide additional descriptive materials.

In one embodiment of a data capture device, a custom ASIC is provided to perform functions of a head amplifier with integrated precision peak detector, a microcontroller to decode the output and an encryption module. The ASIC can be combined with a conventional processor, such as, for example, the Silicon Labs C8051F330 processor, and mounted on a printed circuit board roughly the size of the back of the magnetic head. An interface cable can be attached to the printed circuit board and the assembly mounted in shell of the magnetic head. The head can then potted with epoxy providing a secure barrier to the environment tampering.

A small amount of reactive material such as potassium can be placed in the module prior to potting so that if the unit is tampered with, the reactive material is exposed and causes a reaction destroying the sensitive circuit components. In addition, a fuse can be placed on the printed circuit board to allow the programming and debug connections to the microcontroller to be broken during final assembly of a product preventing access to the internal operations of the unit.

The microcontroller can be configured to decode the F2F data encoded on the card and to use algorithms to decode the F2F data into any of multiple standard formats including ISO 7811, AAMVA, JIS, CDL, raw data, and other common or custom formats. The converted track data can be then encrypted, for example, using two 64-bit keys which where previously stored in the flash memory of the controller. The data can be compressed and output in one of multiple formats.

The data output format can be selected using the head interface connector option pins of through sending a command through the Rx data pin. The interface formats that can be selected can include, for example, I.sup.2C, SPI, NRZ, USB and TTL clock and data. Additional formats can be supported including one that outputs the encrypted data in same F2F format that is encoded on the card at signal levels compatible with magnetic head output. This embodiment might be used to allow conventional devices to use the secure head module without changing the terminal hardware, software or firmware (other than the head, for example). In addition the secure head module can accept commands via the interface connector Rx data line or through the use of specially formatted cards which are swiped to execute the commands. An additional format can be supported which supports RF communications via various standards such as, for example, Bluetooth. The data can be converted to a suitable format and sent to either a RF transceiver internal to the head module or connected to the head module though an interface connector cable.

These techniques can be implemented allow for command operations in a plurality of applications, including, for example WAP and java or Pocket PC thin client applications. In addition to the described card reader functions, the unit can provide general-purpose digital input/output pins at the interface connector. These pins can be controlled by custom applications such as, for example, those supplied by the OEM integrating the module in their products. These pins along with the ability to add custom application firmware to the head module allow for added functionality that without these options would require an additional processor and circuitry. One such example is in a serial RS232 stand alone magnetic stripe reader. The added interface pins can be used to control a status indicator and to control the RS232 output driver. In addition, custom firmware can be added to output the suppliers banded information and to support custom formats such as those used at conferences to track attendees.

In one embodiment, the gateway receives transaction requests from multiple devices employing encryption modules. In one embodiment in the example of bank card transactions, the transaction data can include the capture device serial number followed by three blocks of encrypted data containing the swiped card's track 2 data along with a time or transaction number stamp. A second optional data block can be included and can contain control information to enhance the server's optional application operations such as card authenticity verification, issuing merchant and command requests such as a change key request. Three optional clear text characters can be used to signal start of serial number, start of optional encrypted data block, and end of transaction blocks. The various clear text characters can also be used to indicate various encryption options such as selection between multiple encryption keys and formats.

In applications where transmission speed is a consideration (for example, in WAP applications), the transaction data format can be adjusted to be a multiple of three characters in length. All transaction data including the serial number, encrypted data blocks, and clear text fields can be sent as binary data. In this way, a forty-digit track two data block can be compressed from 40 to 20 bytes in length. The 8-digit serial number can be compressed to 3 bytes in length. This converted binary data can be converted to a format compatible with efficient keyboard emulation for the selected device. For example, in the case of WAP enabled cell phones with external keyboard support the 3 bytes of binary data can be converted to 4 mostly lower case ASCII characters. Using this technique the transaction data can be sent in 38 characters rather then the 68 characters required if the data was not compressed.

In another embodiment in the example of bank card transactions, the transaction data can include the terminal or data capture device serial number followed by three blocks of 3 DES encrypted data containing the swiped card's track 2 data along with a time or transaction number stamp. A second data block can contain the signature of the swiped card (encrypted or not) along with control information (encrypted or not) to enhance the server's optional application operations such as card authenticity verification, issuing merchant and command requests such as a change key request. Three optional clear text characters can be used to signal start of serial number, start of optional encrypted data block, and end of transaction blocks. The various clear text characters can also indicate various encryption options such as selection between multiple encryption keys and formats.

The gateway can have access to a secure database containing keys for all readers allowed access to the gateway along with information to complete the transaction such as the internet URL or the phone number of the transaction processing server to be used by this reader. In addition, the gateway can have access to a database containing valid secure stripe TM signatures and authentication decryption keys. The reader serial number, which is sent as part of the transaction in clear text in one embodiment, is used to access the key for the readers track signature block along with information to complete the transaction such as the internet URL or the phone number of the transaction processing server to be used by this reader. The selected keys can be used to decode signature data along with a hash code generated by the secure module from the card data account number. The hash value generated from the card data can be used to index the secure stripe database to retrieve the card signature. The database signature is then compared to the decrypted transaction signature and based on the comparison the transaction is sent to the processing bank indicated in the signature database or a message is sent back to the card holder requesting verification of the card's authenticity which may be in the form of a re-swipe of the card or entry of additional information such as billing zip code at which point the transaction is sent to the processing bank using standard formats or declined.

In yet another preferred embodiment in the example of bank card transactions, the transaction data can include the transaction data can include the MSR serial number followed by blocks of encrypted data containing the swiped card's track information along with a time or transaction number stamp and GPS location. A second data block can contain the signature of the swiped card along with control information to enhance the server's optional application operations such as card authenticity verification, issuing merchant and command requests such as a change key request. Three optional clear text characters can be used to signal start of serial number, start of optional encrypted data block, and end of transaction blocks.

The various clear text characters can also indicate various encryption options such as selection between multiple encryption keys and formats. This gateway can have access to two databases one containing the secure data capture device module control block key and a second containing valid signatures (for example, SECURESTRIPE signatures). The reader serial number sent as part of the transaction in clear text in one embodiment can be used to access the key for the reader's track control and signature block. The signature can include of two parts: one is the signature value generated during the card swipe and a second is a hash code of that track two card data also generated during the swipe. The hash value is used to index the secure stripe database to retrieve the card signature. In this way, no card data is available on the secure server. The database signature is then compared to the decrypted transaction signature generating a card reliability index, which is sent to the processing bank as additional information.

The bank also receives the encrypted card data that may include the time of the transaction, the location of the transaction, and the secure module's unique transaction number. With this additional information the bank can made a more accurate ascertainment of the transactions authenticity prior to acceptance or denial of the requested transaction.

Figure 35:
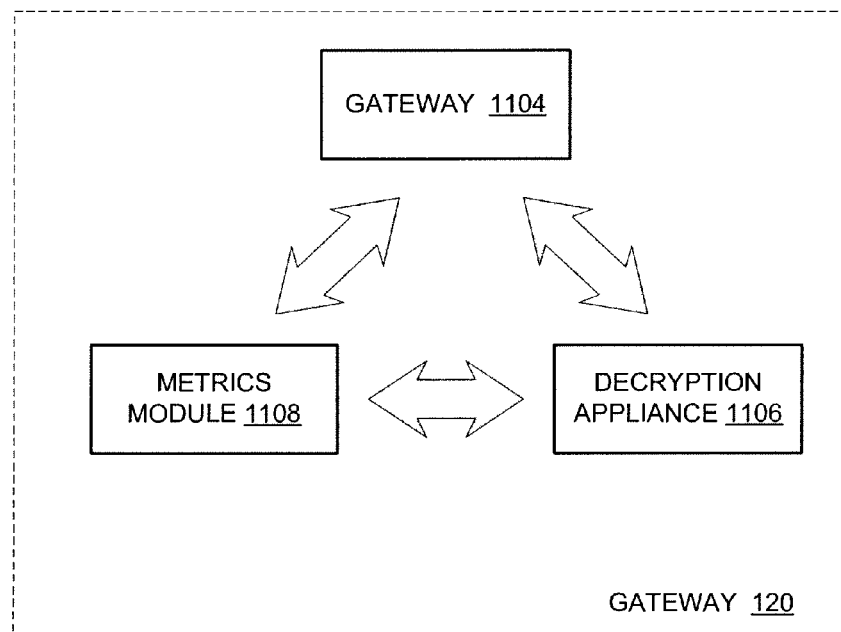
FIG. 35 is a diagram illustrating an example implementation of a metrics module in accordance with one embodiment of the invention.

In accordance with another embodiment of the invention, systems and methods can be provided to accommodate device metrics in the example and other environments and embodiments. FIG. 35 is a diagram illustrating an example implementation of a metrics module in accordance with one embodiment of the invention. Referring now to FIG. 35, in the illustrated example, a metric module 1108 is illustrated as being provided at a gateway 120 to facilitate the metric functionality in accordance with embodiments of the present invention. Although illustrated as part of a gateway 120, one of ordinary skill in the art will understand after reading this description that metric module 1108 or like functionality can be included elsewhere in a transaction-processing environment and can be provided in a distributed or centralized fashion. In the illustrated example, gateway 120 includes gateway 1104, a decryption appliance 1106, and a metric module 1108. Gateway 1104 can be implemented to perform gateway functions including, for example, traditional gateway functions performed by conventional gateways in a transaction-processing environment. In accordance with embodiments described elsewhere in this document, gateway 1104 can route various token transactions to a decryption appliance 1106 to perform decryption of some or all of the token data included with a transaction. For example, this can be accomplished in accordance with the embodiments described elsewhere in this document.

In one embodiment, a metric module 1108 can be provided to include additional functionality for various token transactions in a token transaction network. For example, metric module 1108 can be used to gather data from or pertaining to various transactions routed through gateway 1104, and report information about these transactions to various entities in the transaction-processing environment. As described in further detail below, reporting might be performed on an individual transaction or a group of transactions and might be reported to a single entity or a number of entities. As one example of reporting, dashboards or other graphical user interfaces (GUIs) can be provided to various entities to facilitate a real time or near real time view into token transactions in the environment. Dashboard or GUI information might be updated in real time or in near real time to provide a relatively instantaneous picture as to what is happening in the transaction-processing environment. E-mails, text messages, and other alerts or signals can also be utilized to provide transaction processing information to one or more entities either on an accumulation of events or on individual events. As a further example, metric information can be sent with a transaction by the gateway to the transaction-processing network or a back channel or other alternative channel can be utilized to provide this information to one or more entities in the transaction-processing network. As these examples serve to illustrate, a number of techniques and methodologies can be utilized to provide metric information to one or more entities.

Reported metric information can be used to enable one or more entities to determine information such as, for example, the status of the transaction-processing environment and its various components, the state of security of the transaction-processing network and its components, possible fraudulent activities in the transaction-processing environment, interference with tokens or transaction processing equipment, and other like status or information as may be useful or desirable for one or more entities monitoring a transaction-processing environment. Examples of metric information that can be obtained, stored, collated and reported include a variety of data and information, including transaction information and infrastructure information. Transaction information can include, for example, information about a token transaction such as token information, transaction amount, date and time, and other information about the transaction. Infrastructure information can include information such as, for example, merchant ID, store #, location, terminal ID, encryption status, token authentication status, routing information and the like.

Examples of how such metric information can be used are now described. In one example, encryption status of components or transactions can be monitored and logged. For example, based on received transactions it can be determined whether a particular terminal in the transaction-processing environment is properly encrypting token transactions. For example, consider the embodiment where a serial number or terminal ID or other identifier is appended to the transaction to identify the source of the transaction. This information can be correlated with the encryption status of a received transaction to determine whether an encrypting terminal is actually encrypting the data. This might be used, for example, to verify that transactions are properly encrypted. This might additionally be used to flag whether a terminal has been tampered with, whether encryption has been accidentally or inadvertently disabled, or whether another condition exists that is affecting the encryption at the terminal. As a further example, where a given terminal is designated has being an encrypting terminal, the occurrence of unencrypted transactions from that terminal might flag the occurrence of tampering, operator error or technical difficulties, each of which can be addressed upon notice of the situation.

In response, metrics module 1108 can be utilized to provide the appropriate information or alerts to the appropriate entities in the transaction-processing environment. For example, an alert might be sent to the issuing bank of a credit card token to identify to the issuer that one of its issued cards is being used in a transaction in an unencrypted fashion. As another example, an alert can be generated and sent to the merchant associated with the identified terminal alerting the merchant that its terminal is no longer encrypting. In response, the merchant can check the status of his or her terminal to determine whether it has been tampered with. As a further example, in the event that the merchant inadvertently disabled encryption (for example using command cards or other techniques) the merchant can take corrective action to enable encryption at the affected terminal. As yet another example, an appropriate message or signal can be sent to the network to disable further transactions from the terminal until corrective action is taken. For example, a communications link can be established directly with the terminal to enable the network to disable further transactions from the terminal until it is corrected. In addition, an alert or other message can be sent to the point of sale system at a location where the terminal is installed advising point of sale clerks not to utilize the terminal. As these examples illustrate, a number of techniques can be used to implement corrective action upon the identification of a source of unencrypted transactions.

As another example consider environments where token signatures such as, for example, jitter values, remnant noise, or other signature methodologies are utilized to authenticate a token such as a bank card or credit card used in a financial transaction. In such environments, including in the embodiments described elsewhere in this document, such signatures can be utilized to verify the authenticity of a token either at the terminal or elsewhere in the transaction-processing network. Thus, in one embodiment, metrics module 1108 can be configured to check for proper authentication and report on the same. For example, metrics module 1108 might be configured to look for the presence of a properly authenticated jitter value or other signature and flag any transaction where the signature is not included or the signature does not match the known signature for the presented token. Again, in this example, real time or near real time alerts and dashboard updates can be provided to flag the occurrence and trigger corrective or remedial action. Such alerts might be used, for example, to provide a relatively quick flag that a skimmed or otherwise unauthentic token is attempting to be utilized for a transaction. For example, alerts might be sent to the issuing bank, acquiring bank, or other entities in the transaction-processing network to disapprove the transaction and to enable them to initiate action to track down the potentially fraudulent activity. As further example, an alert can be sent to the true token owner informing him or her that his or her token has been copied or is defective such that the true owner can initiate corrective action such as, for example, with the issuing authority. Because, in some embodiments, information including terminal location, merchant identification, time of attempted transaction, and so on is included with the transaction, this information can be further utilized to track down the occurrence of possible fraudulent activities. This information might be used, for example, to track movement of fraudulent tokens from one location to the next and the timing of such events. Information such as this might be used in conjunction with information from security monitoring (e.g., cameras etc.), personnel and other sources to assist in locating fraudulent users.

Likewise, in addition to checking for possible unauthorized token duplications, a metric module might be implemented to identify replay attacks where multiple duplicate transactions are submitted for processing. For example, in embodiments described above, a counter value can be used in various methodologies to ensure that each transaction from a given token is somehow unique. For example, a terminal might be provided with a counter, the counter incremented with each transaction and the count value included with the transaction data. As another example, the incremented counter value can be utilized in the encryption process such that the encrypted token data is dependent on the correct counter value. Counters in the encryption module 132, data capture device 113, or elsewhere in terminal 114 can be utilized to provide this feature and functionality. As with the signature example described above, alerts and other signaling methodologies can be utilized to inform the appropriate individuals or entities for example in real time or in near real time, to alert them to the possible fraudulent activity or defective equipment.

In a similar fashion, location information and time stamp information can also be utilized and evaluated by metrics module 1108 to determine the possibility of fraudulent activity or faulty equipment in the transaction-processing environment. For example, where location information does not correlate with the source of the transaction, this might be used to identify a problem in the system and reporting by the metrics module 1108 can be used to flag such activity and institute remedial action. Likewise, metrics module 1108 can report time stamp information to flag and identify fraudulent activity or faulty equipment operation. For example, where transaction data for a particular token is occurring with time stamps that do not correlate, possible fraudulent activity might be involved. For example, token data arriving in transactions from Boston and Los Angeles within a short period of time would tend to indicate an error in the system or fraudulent activity. This might indicate, for example, that multiple copies of a token are in existence and in use in the environment. As discussed above with the other examples, alerts, reporting and other signaling techniques can be utilized to flag the activity to various entities or individuals in the transaction-processing environment and to institute remedial action. As a further example, other information can be utilized in a similar fashion to detect faulty equipment or possible fraudulent activity. For example, serial numbers, terminal IDs, locations, time stamp, and other information might be utilized in various combinations to check to ensure that the data correlates appropriately and, if not, to generate the appropriate alerts to facilitate remedial action.

In addition to real time and near real time rapid reporting, metrics information can be accumulated over periods of time and for various merchants, terminals and so on and the accumulated information used for statistical analysis and report generation. The various reports and results of statistical analysis can be provided to various entities in the transaction-processing network and elsewhere in the transaction-processing environment for various purposes. Although not illustrated, one or more data storage devices can be utilized to store events and other data to facilitate data gathering analysis and reporting.

Figure 36:
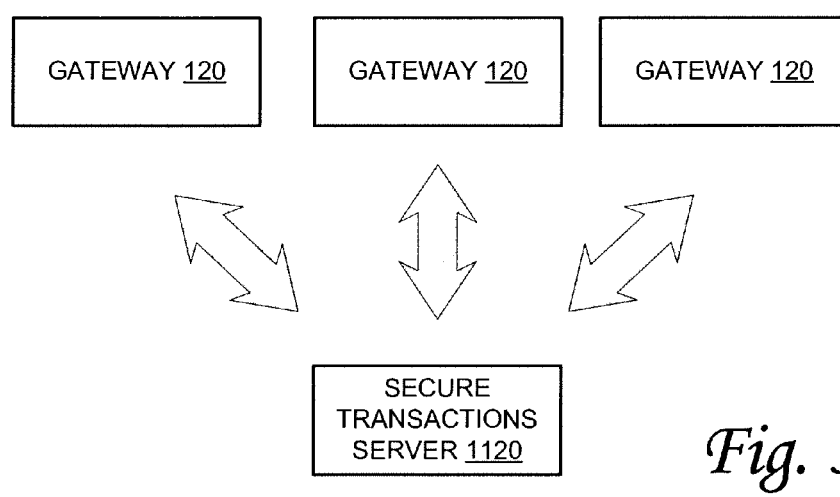
FIG. 36 is a diagram illustrating an example implementation having a secure transaction server configured to receive information from a plurality of network elements for analysis, reporting, and alert functions in accordance with one embodiment of the invention.

In the embodiment illustrated in FIG. 35, metrics module 1108 is provided at one or more gateways 120 to accomplish various features and functionality associated therewith. In other embodiments, rather than a distributive approach, a centralized metrics module might be provided to provide the metrics features and functionality on a more centralized basis, for example, for a plurality of gateways 120. Additionally, metrics module 1108 might be located elsewhere in the transaction-processing environment, including within the transaction-processing network 123. Thus one or more metrics modules 1108 can be provided throughout one or more locations in the environment to facilitate metrics processing, analysis, reporting, and alerting. FIG. 36 is a diagram illustrating an example implementation where secure transaction server 1120 is provided to receive information from a plurality of gateways 120 (or other elements in the transaction-processing environment) for analysis, reporting, and alert functions. Accordingly, these features and functionality can be allocated amongst the various gateways or other entities in the environment and the secure transactions server 1120 to perform the metrics function described herein.

Figure 37:
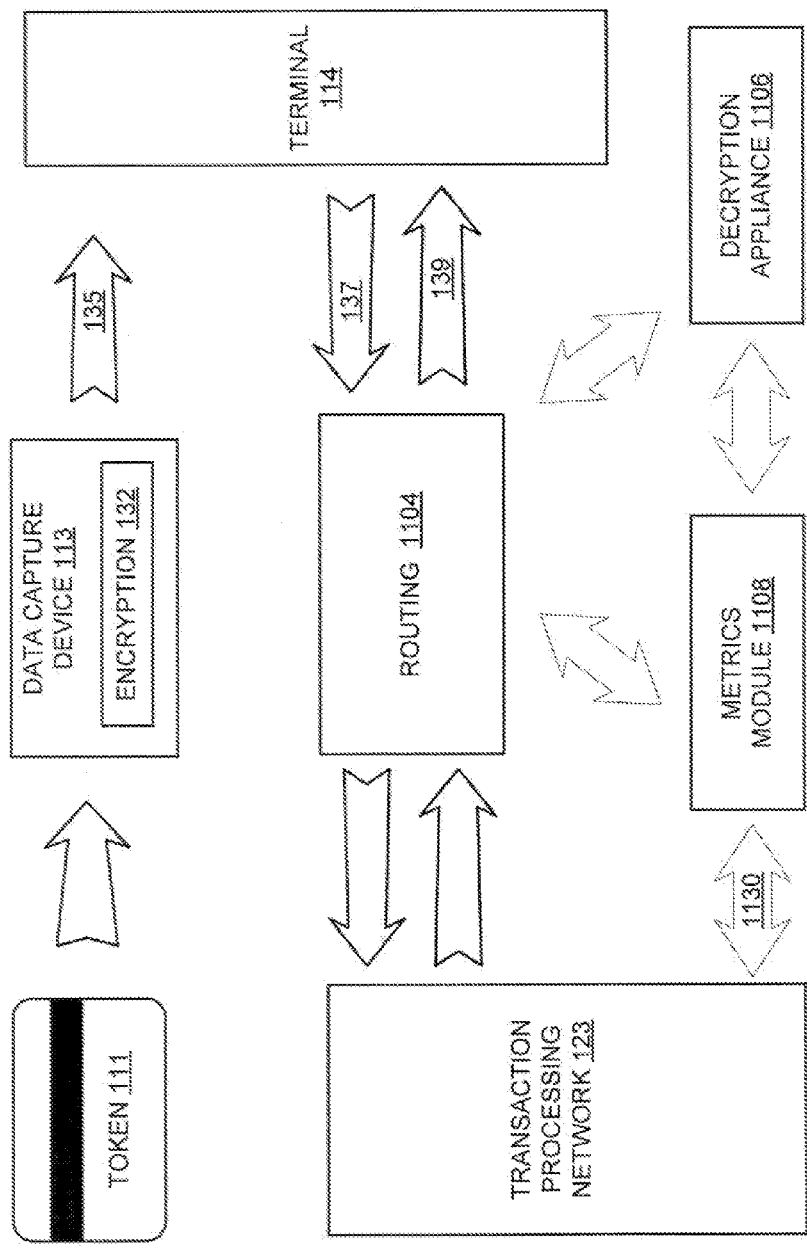
FIG. 37 is a diagram illustrating an example of a gateway including a metrics module within an example transaction-processing environment in accordance with one embodiment of the invention.

FIG. 37 is a diagram illustrating an example of a gateway 120 including a metrics module 1108 within an example transaction-processing environment. In this embodiment, gateway 120 is illustrated as receiving transactions from one or more terminals 114 and appropriately routing the transactions to a transaction-processing network 123. In the illustrated example of FIG. 37, gateway 120 includes the modules illustrated in FIG. 35, including a gateway module 1104, a metrics module 1108, and a decryption appliance 1106. As described above, FIG. 37 illustrates that gateway 1104 can be implemented to provide data from metrics module 1108 to the transaction-processing network along with transactions being routed. Also illustrated in FIG. 37, is a signal path 1130 between metrics module 1108 and transaction-processing network 123 to illustrate that metrics module 1108 can communicate directly with one or more entities in transaction-processing network 123. As such, metric information can be provided independent of transaction with which it might be associated. Although not illustrated, a signal path can be included to allow metrics module 1108 to communicate with merchants, terminals, token holders, and other entities. Such communication paths between various entities in the transaction-processing environment can be implemented to facilitate reporting and alerts as described herein.

In the various embodiments described above, signaling, messaging, or other alerts can be utilized to inform one or more entities in the transaction-processing environment of anomalies, possible fraudulent activity, equipment failures, and other like concerns. As noted, such information might be utilized to allow these one or more entities to take corrective action to remedy the situation such as, for example, replacing defective equipment, re-enabling encryption at a terminal, disallowing fraudulent transactions, identifying and replacing defective tokens and so on. In one embodiment, a user interface can be provided to facilitate such remedial action.

For example, consider a scenario where a cardholder is informed that her credit card was used in a transaction or series of transactions that appear to be fraudulent. Further consider an example where the alert to the card holder included the date and time of the transaction, the merchant, the location of the terminals used within the merchant, and details regarding the purchase. Further consider a scenario in this example where the actual authorized card holder was the one who initiated the transaction but her card was defective causing the token authentication failure. The user receiving the notification of the one or more transactions can verify that the transactions were authentic and authorized and if so, log into the system (for example using a login ID and authorized password) to authenticate the transactions and request a new token. Consider however an alternative scenario where her card was copied by a perpetrator or fraud, and used in an unauthorized fashion for one or more fraudulent transactions. In this example, after receiving the alert, the card holder can log in to the system identify the transaction as fraudulent and the transaction-processing network can then take immediate steps to remedy the situation. For example, all future unauthorized card uses can be blocked or disapproved, and a new card issued to the actual cardholder to replace the compromised card.

As another example of a user interface to facilitate remedial action, consider a scenario where a merchant's terminal is sending transaction data in an unencrypted fashion, when the terminal is identified as an encrypting terminal. In this example, upon receiving the alert, the merchant can take action such as, for example, checking the status of his or her identified terminal. If the merchant inadvertently turned off encryption, the merchant can reinitialize the encryption thus bringing the terminal back into compliance. Alternatively, where a terminal was tampered with or otherwise compromised, the merchant can pull the terminal off line and replace it with a properly functioning terminal.

As described above, the captured data can be analyzed by a metrics module 1108 and the gathered data can be reported in real time or for historic purposes. Thus, graphical or textural displays can be provided to merchants, transaction processing entities, or other entities in the environment to allow them to monitor the status of the environment, preferably as it pertains to them. Thus, alphanumeric characters, charts, graphs and other graphical techniques, color coding and other techniques can be used to facilitate dashboard displays and other reports. Various exemplary reports and displays are now described to facilitate a further understanding of this aspect of the invention. After reading this description, one of ordinary skill in the art how the other data described herein and other metric information in general can be incorporated in various reports and how other reporting formats and displays can be provided.

Figure 38:
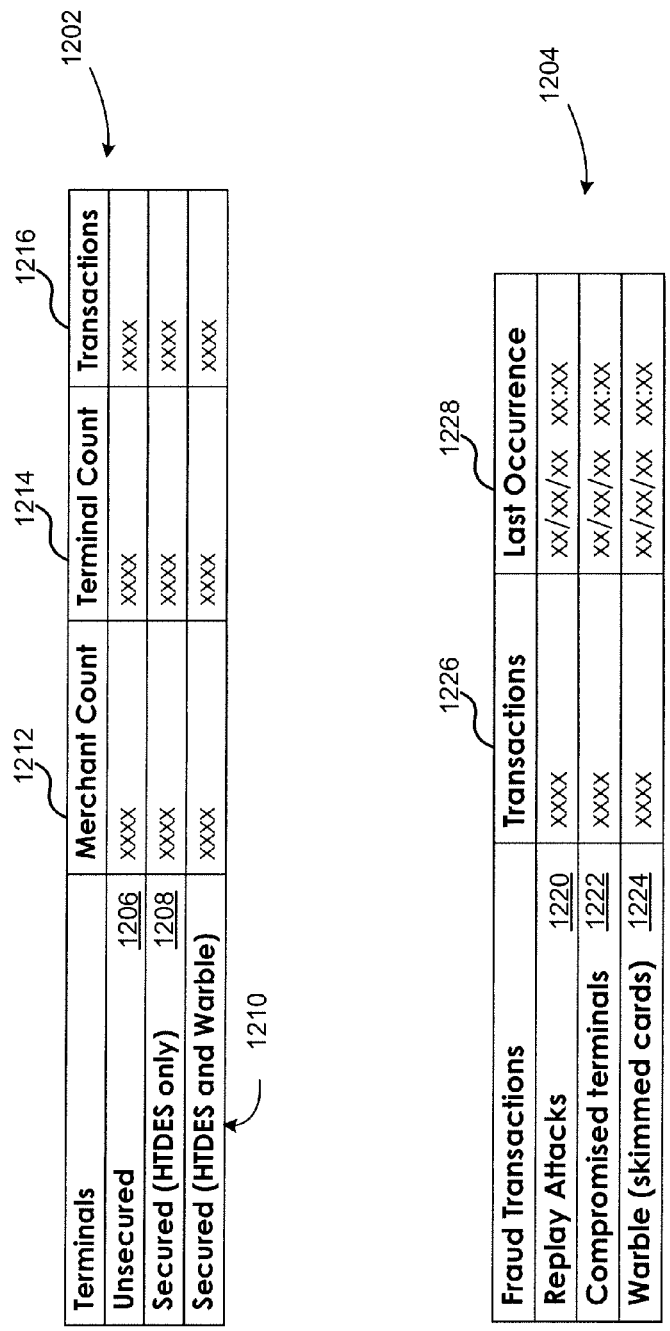
FIG. 38 is a diagram illustrating example device metrics summary reports in accordance with one embodiment of the invention.

FIG. 38 is a diagram illustrating example device metrics summary reports in accordance with one embodiment of the invention. Referring now to FIG. 38, the example reports illustrated are a terminal summary report 1202 and a fraudulent transactions report 1204. Referring first to terminal summary report 1202, this report is illustrated as including information indicating whether a terminal or terminals are unsecured 1206, secured with encryption 1208, or secured by encryption and authentication 1210. In the example illustrated, the encryption technique is HTDES or hidden triple DES encryption that used triple DES encryption in a transparent or hidden format to facilitate encryption with legacy equipment. Field 1210 in the illustrated example utilizes hidden triple DES encryption and warble or jitter as the authentication mechanism. In the illustrated example, for each of the terminal operating modes, unsecured at 1206 secured encrypting 1208, secured encrypting and authenticating 1210, three data fields are provided. These fields in the illustrated example are a merchant count 1212, a terminal count 1214, and a transaction account 1216. Thus, this example report in the illustrated format can be utilized to show quantities of merchants, terminals and transactions operating in the three illustrated modes.

Fraudulent transactions summary report 1204 can be used to report information such as, for example, replay attacks 1220, compromised terminals 1222, and skimmed or unauthenticated cards 1224. In the example illustrated in FIG. 38, these various incidents are reported by showing the number of transactions in each category 1226, and the date and time of the last occurrence 1228. Replay attacks 1220 might be used in one embodiment to highlight a situation where previously used token data (for example, credit-card track data) is copied and reused in a subsequent transaction. For example, if a counter value is expected to be incremented and it is not incremented, or if a time stamp is the same as the time stamp in a previous transaction. Compromised terminal fields 1222 can be used to show, for example, if an unencrypted transaction is received from a terminal that is designated as encrypting or was previously encrypting transactions. Unauthenticated token field 1224 can be used, for example, to show where a transaction is received for a token that failed the authentication process.

FIG. 39 is a diagram illustrating an example of a processor or gateway summary report 1232 in accordance with one embodiment of the invention. Referring now to FIG. 39, this report provides information such as the number of merchants 1212, terminal counts 1214, credit transaction counts 1216A, debit transaction counts 1216B, and totals 1218. In the illustrated example, this information is provided for processors for gateways in the transaction-processing environment. In the example illustrated in FIG. 39, these processors for gateways include Fifth Third 1242, First Data 1244, Kincaid Technologies 1246, Trust Commerce 1248 and MerchantLink 1250. Accordingly, for example, this report can be utilized to provide transaction-processing entities with a view into the various transactions handled by particular processors or gateways.

FIG. 40 is a diagram illustrating an example of a time alert and audit log in accordance with one embodiment of the invention. Such a report might be used, for example, to give an issuing bank a view into transactions all the way down to the terminal level. The illustrated example presents a transaction-by-transaction log of transactions occurring in real time or near real time. For example, a report such as this can be provided to an issuing bank for each transaction involving an issuing bank's tokens. As another example, such a report can be provided to a merchant showing the merchant a log of transactions for that merchant's terminals. As a further example, a similar report can be provided to a cardholder illustrating a transaction log for that cardholder's bank card. Depending on the token network and recipient of the report, the various elements illustrated in the report may or may not be provided to each of these entities. For example, it might not be appropriate depending on the transaction process and environment to provide the merchant with the processor identification, a gateway identification or a cipher serial, however such data items might be entirely appropriate for inclusion in a report to an issuer.

The example illustrated in FIG. 40 provides a variety of fields including a date-time field 1262, a processor field 1264, a gateway field 1266, a merchant ID field 1268, a terminal ID field 1270, a cipher serial field 1272, an encryption field 1274, and authentication field 1276, an authorization field 1278, and a result field 1280. In the example illustrated in FIG. 40 data for some or all of these fields is provided for a plurality of transactions, each transaction being illustrated in a different row of the table. Thus, for a given transaction, the reviewer of the report can determine for that transaction which entity was the transaction processor 1264, the gateway through which the transaction was routed, the merchant ID and terminal ID for that transaction, the cipher serial used, whether the transaction was encrypted, the authentication status of the token used in the transaction, and the authorization code. In one embodiment, the authentication of the token can be provided on a yes/no basis. In other words, the data might simply indicate whether or not a token is authentic or authenticated. In another embodiment, as illustrated in the example of FIG. 40, a relative score can be provided to show a level of certainty with which a token was authenticated. Thus, for example, in FIG. 40, the transaction occurring on May 1 at 10 o'clock was authenticated with a 95% certainty, while the transaction occurring on the same day at 9:59 was authenticated with only a 3% certainty. Because the transaction occurring at 9:59 yielded only a 3% certainty, an alert is generated in result field 1280 indicating that it is a skimmed or copied card. Other example alerts are illustrated in FIG. 40, including an alert for a replay attack and an alert that a given terminal (the terminal used in the transaction occurring at 9:58:31 is not encrypting and there is a potential PCI compliance issue).

FIG. 41 is a diagram illustrating an example installation status report in accordance with one embodiment of the invention. Referring now to FIG. 41, an installation status report 1302 can be used, for example, to facilitate monitoring of encrypting heads as they are installed and activated in the environment. In one embodiment, this report can be run to enable verification that one or more terminals in the environment are operating with encryption. This report as illustrated in FIG. 41 includes a merchant ID field 1304 and thus illustrates the data on a merchant ID basis. For each merchant ID, the report can include information such as store names 1306, store numbers 1308, merchant address 1312, contact information 1314, a terminal ID 1316, encryption status 1318, and the date and time encryption was activated 1320. Thus, this report can illustrate the encryption status of each terminal for a plurality of merchants. This report can be run during installation and trials to ensure that terminals that were to be retrofitted and activated on a given date are, in fact, active. To further facilitate this, another field can be added to provide the scheduled date and time on which activation is or was to have occurred.

Figure 42:
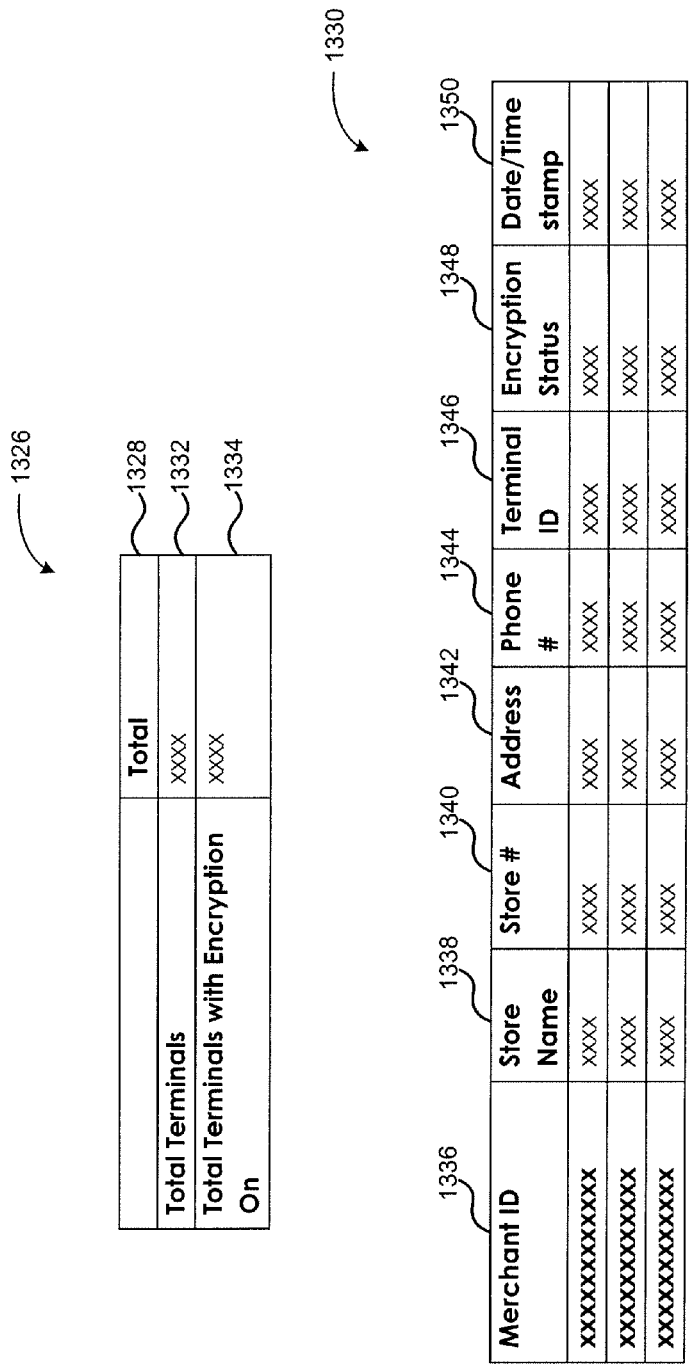
FIG. 42 is a diagram illustrating an example of the encryption status report in accordance with one embodiment of the invention.

FIG. 42 is a diagram illustrating an example of the encryption status report in accordance with one embodiment of the invention. Referring now to FIG. 42, in one embodiment, a report such as this can be created as an aggregate report monitoring encrypting heads in the field, and to further report on whether or not they are using appropriate encryption. In one embodiment, this report is accessible or provided to entities in the transaction-processing network. In the illustrated example embodiment, encrypting status report 1326 includes summary report fields 1328 and detailed report fields 1330. As illustrated, summary report fields 1328 include an indication of the total number of terminals accounted for in the report 1332 and an indication of the total number of those terminals that have encrypting enabled 1334. Detailed report 1330 can be provided to break the information out into additional detail. In the example illustrated in FIG. 42, this report is broken down based on merchant ID. Similar to the example illustrated in FIG. 41, this example includes fields in addition to merchant ID 1336 such as, store name 1338, store number 1340, address 1342, phone number 1344, terminal ID 1346, and encryption status 1348. The example in FIG. 42 also includes a date time stamp 1350, such that encryption status of a particular terminal can be tracked in accordance with date and time parameters.

FIG. 43 is a diagram illustrating an example of an exception report in accordance with one embodiment of the invention. An exception report such as exception report 1355 illustrated in FIG. 6 can be used to highlight or identify occurrences of an authentication failure. In the illustrated example, the exception report 1355 includes the merchant and terminal information as illustrated in examples of FIGS. 41 and 42, but further includes an authentication failure field 1357 and a reason or description failure 1358. Thus, this report can be used to show authentication failures and a reason for such failures. As illustrated, this can be done on a terminal-by-terminal basis for the various merchants in the system and their stores and terminals.

Figure 44:
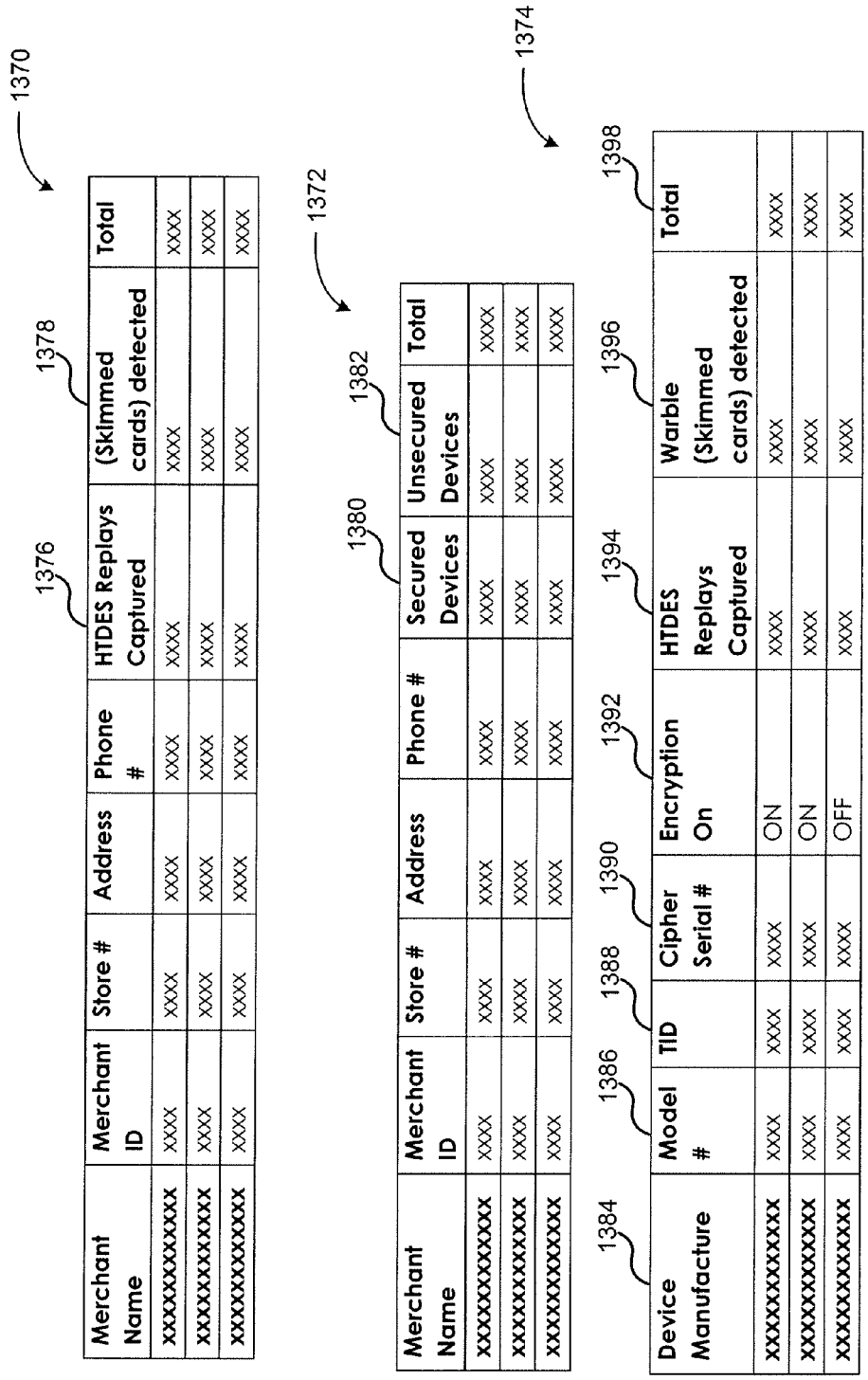
FIG. 44 is a diagram illustrating further examples of summary and detailed reports that can be included in accordance with another embodiment of the invention.

FIG. 44 is a diagram illustrating further examples of summary and detailed reports that can be included in accordance with another embodiment of the invention. These examples further illustrate the manner in which various metric data collected at metric module 1108 (whether distributed or centralized) can be utilized to provide additional reporting to various members of the transaction-processing environment. Referring now to FIG. 44, this example illustrates a merchant summary fraud report 1370, a merchant summary PCI compliance report 1372, and a merchant detailed fraud report 1374. Like the previous examples, merchant summary fraud report 1370 and merchant summary PCI compliance report 1372 include details about transactions occurring for various merchants. Thus, merchant identification store numbers, addresses, and phone numbers can be included in this report. Although not illustrated, a terminal ID can also be included. Additionally, merchant summary fraud report 1370 can be used to show the number of fraudulent transactions for a given merchant. In one embodiment, the report can be sorted to rank the merchants based on the number of fraudulent or otherwise questionable transactions. Thus, for each merchant the report can illustrate the number of replays captured 1376 and the number of skimmed cards detected 1378. As noted, this can be done on a per merchant basis or even a terminal-by-terminal basis. Likewise, as discussed above, these items can be drilled down into to find additional information. Thus, where a high number of possible fraudulent activities are encountered for a particular merchant or store number, that information can be drilled into to identify further information such as, for example, terminal IDs, dates and times of occurrence and so forth.

Merchant Summary PCI Compliance Report 1372 identifies merchants that are not fully PCI compliant. This may be of interest, for example, where merchants are identified as using encrypting technology but for some reason are not PCI compliant. Thus, for example, this report can be used to list the merchants that have unsecured equipment. As such, the example illustrated in FIG. 44 includes a quantity of secured devices 1380 and unsecured devices 1382 for each line item. Thus, the report assists in identifying merchants that are not properly utilizing secured equipment.

The merchant detail fraud report 1374 in one embodiment can be provided to list some or all of the terminals for a selected merchant and can be implemented so as to list fraudulent transactions for each device for a selected merchant. Thus, in the example illustrated in FIG. 44, thus, as the example illustrates, for each merchant information on the various devices can be provided including, for example, an identification of the manufacturer of the device 1384, a device model 1388, a terminal or device ID 1388, a cipher serial number 1390, an indication as to whether encryption is enabled or disabled 1392, the number of unauthorized replays captured 1394, the number of unauthenticated transactions detected 1396, and totals of potential fraudulent activity 1398. Accordingly, this example illustrates the manner in which a report might be provided to illustrate a synopsis of PCI compliance and potential fraudulent activity on a device-by-device basis for a given merchant.

FIG. 45 is a diagram illustrating a summary point of sale report in accordance with one embodiment of the invention. This report might be used, for example, to show a list the different point of sale devices on a merchant-by-merchant basis. Referring now to FIG. 45, the example report includes fields to indicate an identification of the device manufacturer 1404, the model number 1406 of the device in question, the number of clear text transactions provided by the device in various transactions 1408, the number of encrypted transactions 1410, the number of authenticated transactions 1412, and totals 1414. Accordingly, a report such as this can be utilized to provide a summary of all point of sale devices using encrypting heads or other encrypting technology, thereby providing a snapshot of their performance.

FIG. 46 is a diagram illustrating a detailed merchant point of sale report and a detailed merchant PCI compliance report in accordance with one embodiment of the invention. Referring now to FIG. 46, an example merchant point of sale report 1420 can be provided to list individual point of sale devices for a selected merchant and provide a view to their encryption and authentication status. The example merchant point of sale report 1420 illustrated in FIG. 46 includes fields to indicate for a merchant the manufacturer of the terminal devices 1426, their respective model number 1428, a terminal ID 1430 associated with the devices, a cipher serial number 1432, and a status of the encryption—whether it is enabled or disabled—1434. The illustrated example further includes information as to the clear text transactions 1436, encrypted transactions 1438, and authenticated transactions 1440, as well as totals 1442. Additionally, as this example report is intended to list the devices in use for a particular merchant, a report heading 1444 can also be provided to display the merchant name, address and contact information. Where the report is intended to illustrate devices for a particular store number or location, that information can be provided as well.

The detailed merchant PCI compliance report 1422 can be provided to identify merchants and their PCI compliance status. In one application, this report can be used to list or identify merchants that are operating with unsecured devices. As the illustrated example depicts, this particular report can include an identification of the merchant under merchant name 1446. A merchant ID 1448 can also be provided as well as a store number 1450, address 1452 and phone number 1454. For each merchant store listed, the number of secured devices 1456, unsecured devices 1458, and totals 1460 can be displayed. Accordingly, this report can be used to provide a summary of PCI compliance for various merchants and their devices.

A final example of reports that can be included is illustrated in FIG. 47. FIG. 47 is a diagram illustrating an example an example audit-log detail report in accordance with one embodiment of the invention. Referring now to FIG. 47, the audit-log detail report can be utilized to display audit log transactions. This report is similar to the example audit-log report illustrated in FIG. 40 and can be utilized to list all transactions for a selected date range, processor, gateway, or specific result type (for example, list all transactions with replay attacks for a selected date range). In the example illustrated in FIG. 47 includes fields to provide information for particular transactions including a date and time field 1468, a processor identification 1470, a gateway identification 1472, a merchant identification 1474, a terminal identification 1476, a cipher serial number 1478. In addition, the security status of each transaction can be provided as illustrated by the fields for encryption 1480, authentication 1482, authorization 1484, and a summary result 1486.

As these examples illustrate, these and other metrics reports can be used to provide a variety of information to one or more entities in the transaction-processing environment. These and other reports can be utilized to allow an entity to determine whether a merchant, terminals, or transactions are PCI compliant or are otherwise operating in accordance with predetermined standards or preferences. These and other reports can be used to show an instantaneous snapshot of the network elements in real time or near real time as data is received and updated. They can also be configured to show data for given periods of time (for example, over a time or date range) as well as to provide information on a per-merchant, per-terminal or per-token basis, or other data subset based on a desired logical element.

With this and other reports, displays or dashboards provided in accordance with the present invention, the various elements could be drilled into to obtain additional information about such elements. With respect to FIG. 39, hyperlinking or other technology can be utilized to allow a viewer to drill down into merchant data 1212, terminal data 1214, transaction data 1216 and so on. As a further example, drilling into merchant data 1212 for first data 1244 might be implemented to allow the viewer to determine for that merchant (change that to terminal 1214) the number of terminals in that count that are secured, secured and authenticating, or unsecured. As a further example, a user can be provided with the ability to drill down into credit transaction data 1216A for a particular processor to determine for those transactions the number of replay attacks, compromised terminals, skimmed cards, and other data.

Figure 48:
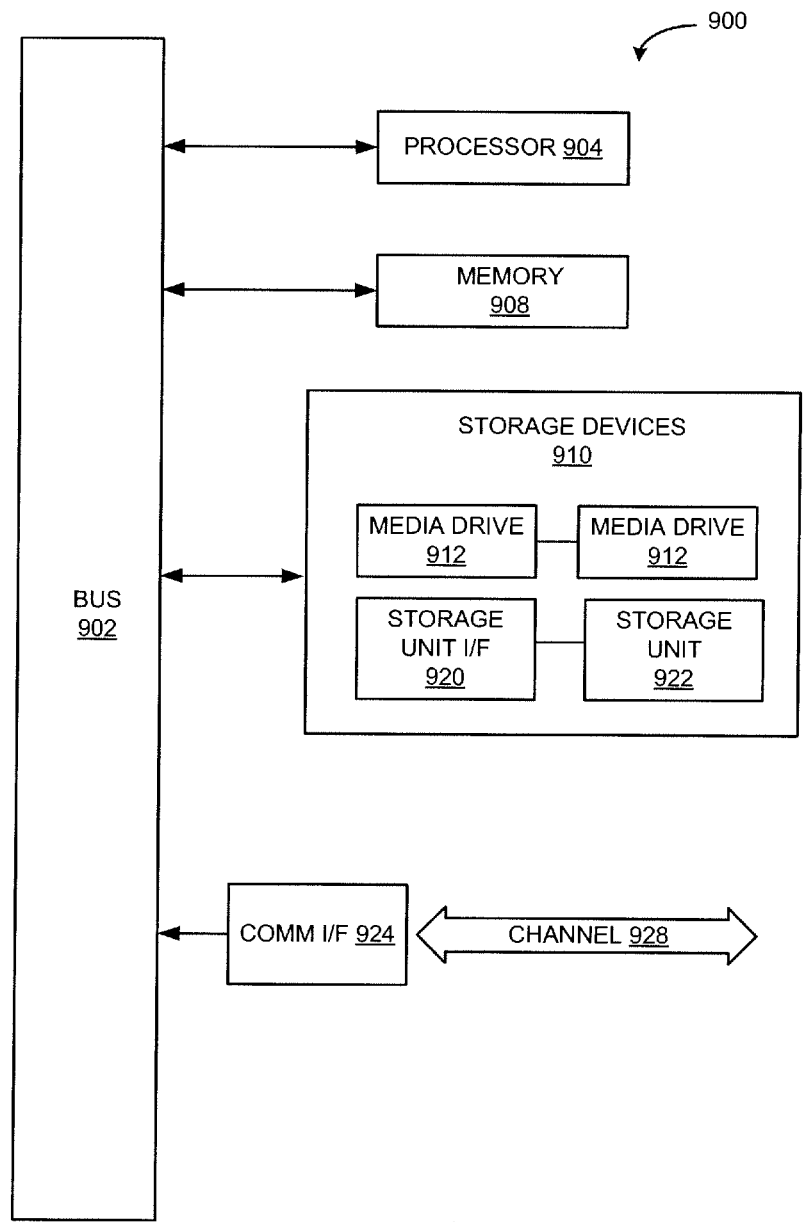
FIG. 48 is a diagram illustrating an example computing system with which software components can be executed.

As used herein, the articles "a" or "an" when referring to an item are not limited to requiring one and only one of the referenced item, and the various embodiments can include additional of the referenced items (or an alternative item) unless the context clearly dictates otherwise. As used herein, the terms "module" and "control logic" are used to describe a given unit of functionality that can be performed in accordance with one or more embodiments of the present invention. As used herein, a module or control logic can be implemented utilizing any form of hardware, circuitry, processing systems, software (including firmware), or a combination thereof. In implementation, the various control logic blocks or modules described herein can be implemented as discrete components or the functions and features described can be shared in part or in total among one or more modules and control logic items. Likewise, although a given item may be described as a module, that item may itself contain various modules to perform desired functionality. As would be apparent to one of ordinary skill in the art after reading this description, the various features and functionality described herein may be implemented in any given application can be implemented in one or more separate or shared modules or logic in various combinations and permutations.

Where features of the invention are implemented in whole or in part using software, in one embodiment, these elements can be implemented using a computing system capable of carrying out the functionality described with respect thereto. One such example computing system is shown in FIG. 48. Various embodiments are described in terms of this example computing system 900. After reading this description, it will become apparent to a person skilled in the relevant art how to implement the invention using other computing systems or architectures.

Referring now to FIG. 48, computing system 900 may represent, for example, desktop, laptop and notebook computers; hand-held computing devices (PDA's, cell phones, palmtops, etc.); mainframes, supercomputers, or servers; or any other type of special or general purpose computing devices as may be desirable or appropriate for a given application or environment. Computing system 900 can include one or more processors, such as a processor 904. Processor 904 can be implemented using a general- or special-purpose processing engine such as, for example, a microprocessor, controller or other control logic. In the example illustrated in FIG. 48, processor 904 is connected to a bus 902 or other communication medium.

Computing system 900 can also include a main memory 908, preferably random access memory (RAM) or other dynamic memory, for storing information and instructions to be executed by processor 904. Main memory 908 also may be used for storing temporary variables or other intermediate information during execution of instructions to be executed by processor 904. Computing system 900 can likewise includes a read only memory ("ROM") or other static storage device coupled to bus 902 for storing static information and instructions for processor 904.

The computing system 900 can also include information storage mechanism 910, which can include, for example, a media drive 912 and a removable storage interface 920. The media drive 912 can include a drive or other mechanism to support fixed or removable storage media. For example, a hard disk drive a floppy disk drive, a magnetic tape drive, an optical disk drive, a CD or DVD drive (R or RW), or other removable or fixed media drive. Storage media 918, can include, for example, a hard disk, a floppy disk, magnetic tape, optical disk, a CD or DVD, or other fixed or removable medium that is read by and written to by media drive 914. As these examples illustrate, the storage media 918 can include a computer usable storage medium having particular computer software or data stored therein.

In alternative embodiments, information storage mechanism 910 may include other similar instrumentalities for allowing computer programs or other instructions or data to be loaded into computing system 900. Such instrumentalities can include, for example, a removable storage unit 922 and an interface 920. Examples of such can include a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a USB port), a PCMCIA slot and card, etc. Software and data transferred via communications interface 924 are in the form of signals which can be electronic, electromagnetic, optical or other signals capable of being received by communications interface 924. These signals are provided to communications interface 924 via a channel 928. This channel 928 can carry signals and can be implemented using a wireless medium, wire or cable, fiber optics, or other communications medium. Some examples of a channel can include a phone line, a cellular phone link, an RF link, a network interface, a local or wide area network, and other communications channels.

In this document, the terms "computer program medium" and "computer usable medium" are used to generally refer to media such as, for example, memory 908, storage device 918, a hard disk installed in hard disk drive 912, and signals on channel 928. These and other various forms of computer usable media may be involved in carrying one or more sequences of one or more instructions to processor 904 for execution. Such instructions, generally referred to as "computer program code" (which may be grouped in the form of computer programs or other groupings), when executed, enable the computing system 900 to perform features or functions of the present invention as discussed herein.

In an embodiment where the elements are implemented using software, the software may be stored in a computer program medium and loaded into computing system 900 using removable storage drive 914, hard drive 912 or communications interface 924. The computer program logic (in this example, software instructions or computer program code), when executed by the processor 904, causes the processor 904 to perform the functions of the invention as described herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal,"

"standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the terms "module" and "appliance" or the depiction of a box in a diagram does not imply that the components or functionality described or claimed as part of that item are all configured in a common package. Indeed, any or all of the various components of an item, whether control logic or other components, can be combined in a single package or separately maintained and can further be distributed across multiple locations. Likewise, multiple items can be combined into single packages or locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method of evaluating bank card transactions, comprising:
    receiving transaction records for a plurality of bank card transactions conducted at point of sale terminals, wherein the transaction records include transaction information and physical infrastructure information, the transaction information comprising at least one of bank card information, transaction amount, and transaction date for the transactions, and the physical infrastructure information comprising information regarding an operating condition of a given point of sale terminal used in a transaction;
    a computing system evaluating the transaction information and physical infrastructure information received with the transaction records and determining whether a reportable event has occurred based on the operating condition of the given point of sale terminal; and
    providing an alert representing the reportable event if the computing system determines a reportable event has occurred based on the operating condition of the given point of sale terminal;
    wherein the operating condition of the given point of sale terminal comprises an encrypting status of the given point of sale terminal, an encrypting status of a component at the given point of sale terminal, a count of bank card swipes at the given point of sale terminal, or a count of bank cards rejected at the given point of sale terminal.

2. The method of claim 1, wherein for a given point of sale terminal used in a transaction, the physical infrastructure information comprises an identification of the given point of sale terminal.

3. The method of claim 2, wherein the identification of the point of sale terminal comprises a terminal ID.

4. The method of claim 2, wherein the identification of the point of sale terminal comprises a serial number of the terminal.

5. The method of claim 1, wherein for a given point of sale terminal used in a transaction, the information regarding the operating condition of the given point of sale terminal comprises information indicating whether the given point of sale terminal has encrypted some or all of the transaction information in a given transaction.

6. The method of claim 1, wherein for a given point of sale terminal used in a transaction, the information regarding the operating condition of the given point of sale terminal comprises information indicating whether the given point of sale terminal has encrypted some or all of the transaction information in a group of transactions.

7. The method of claim 1, wherein the transaction records include authentication information identifying authenticity of the bank card used in a bank card transaction.

8. The method of claim 5, wherein the alert is sent to a merchant identified with the given point of sale terminal used in the given transaction or to the issuing bank of the bank card used in the given transaction, the alert indicating whether the terminal has encrypted some or all of the transaction information in the given transaction.

9. The method of claim 6, wherein the alert is sent to a merchant identified with the given point of sale terminal or to an issuing bank of a bank card used in one or more transactions in the group of transactions, the alert indicating whether the terminal has encrypted some or all of the transaction information in the given transaction.

10. The method of claim 1, wherein the alert comprises an email message generated and sent to a designated holder of a bank card used in a bank card transaction upon occurrence of the bank card transaction.

11. The method of claim 1, wherein the transaction information comprises information used to determine whether a bank card is being used in multiple duplicate bank card transactions.

12. The method of claim 11, wherein the transaction information includes a counter value.

13. The method of claim 12, wherein the counter value is a value of a counter at a point of sale terminal at which the bank card is presented for the transaction, and wherein the counter is incremented upon execution of a predetermined quantity of transactions.

14. The method of claim 12, wherein the counter value is used to encrypt at least a portion of the transaction data.

15. The method of claim 11, wherein the alert is sent to an issuing bank of the bank card used in the multiple duplicate transactions.

16. The method of claim 11, wherein the alert is sent to an authorized holder of the bank card used in the multiple duplicate transactions.

17. The method of claim 1, wherein the transaction information comprises location information used to determine a location of a point of sale terminal used in the transaction.

18. The method of claim 17, further comprising the step of comparing the location information with a predetermined location of the point of sale terminal to determine the validity of the transaction.

19. The method of claim 17, further comprising the step of comparing the location information for a presented bank card with other transactions for the same bank card to identify possible fraudulent activity.

20. The method of claim 17, further comprising the step of comparing the location information for a presented bank card with location and time-stamp information for other transactions for the same bank card to identify possible fraudulent activity.

21. The method of claim 1, wherein the transaction information comprises time-stamp information.

22. The method of claim 1, wherein the alert comprises data indicating whether a given point of sale terminal is operating in an encrypting mode.

23. The method of claim 1, wherein the alert comprises data indicating whether a given point of sale terminal is operating in an authenticating mode.

24. The method of claim 1, wherein the alert comprises a report indicating a quantity of replay attacks.

25. The method of claim 1, wherein the alert comprises a report indicating a quantity of transactions on a compromised point of sale terminal.

26. The method of claim 1, wherein the bank card comprises a magnetic stripe card, a smart card or other token.

27. A server system for evaluating bank card transactions, comprising:
   a processor configured to execute a plurality of instructions;
   a data storage device coupled to the processor and configured to store the plurality of instructions;
   a first module configured to receive transaction records for a plurality of bank card transactions conducted at point of sale terminals, wherein the transaction records include transaction information and physical infrastructure information, the transaction information comprising at least one of token information, transaction amount, and transaction date for the transactions, and the physical infrastructure information comprising information regarding an operating condition of a given point of sale terminal used in a transaction;
   a second module configured to evaluate the transaction information and physical infrastructure information received with the transaction records and to determine whether a reportable event has occurred based on the operating condition of the given point of sale terminal; and
   a third module configured to provide an alert representing the reportable event if the computing system determines a reportable event has occurred based on the operating condition of the given point of sale terminal;
   wherein the modules comprise hardware coupled to the processor or computer usable storage medium having computer program code stored thereon and configured to cause the processor to perform the recited function, or a combination thereof; and
   wherein the operating condition of the given point of sale terminal comprises an encrypting status of the given point of sale terminal, an encrypting status of a component at the given point of sale terminal, a count of bank card swipes at the given point of sale terminal, or a count of bank cards rejected at the given point of sale terminal.

28. The system of claim 27, wherein for a given point of sale terminal, the physical information comprises an identification of the given point of sale terminal for a transaction.

29. The system of claim 28, wherein the identification of the point of sale terminal comprises a terminal ID.

30. The system of claim 28, wherein the identification of the point of sale terminal comprises a serial number of the terminal.

31. The system of claim 27, wherein for a given point of sale terminal used in a transaction, the information regarding the operating condition of the given point of sale terminal comprises information indicating whether the given point of sale terminal has encrypted some or all of the transaction information in a given transaction.

32. The system of claim 31, wherein for a given point of sale terminal used in a transaction, the information regarding the operating condition of the given point of sale terminal comprises information indicating whether the given point of sale terminal has encrypted some or all of the transaction information in a group of transactions.

33. The system of claim 27, wherein the transaction records include authentication information identifying authenticity of the bank card used in a bank card transaction.

34. The system of claim 31, wherein the alert is sent to a merchant identified with the given point of sale terminal used in the given transaction or to the issuing bank of the bank card used in the given transaction, the alert indicating whether the terminal has encrypted some or all of the transaction information in the given transaction.

35. The system of claim 32, wherein the alert is sent to a merchant identified with the given point of sale terminal used in the group of transactions or to the an issuing bank of a bank card used in one or more transactions in the group of transactions, the alert indicating whether the terminal has encrypted some or all of the transaction information in the given transaction.

36. The system of claim 27, wherein the alert comprises an email message generated and sent to a designated holder of a bank card used in a bank card transaction upon occurrence of the bank card transaction.

37. The system of claim 27, wherein the transaction information comprises information used to determine whether a bank card is being used in multiple duplicate bank card transactions.

38. The system of claim 37, wherein the transaction information includes a counter value.

39. The system of claim 38, wherein the counter value is a value of a counter at a point of sale terminal at which the bank card is presented for the transaction, and wherein the counter is incremented upon execution of a predetermined quantity of transactions.

40. The system of claim 39, wherein the counter value is used to encrypt at least a portion of the transaction data.

41. The system of claim 37, wherein the alert is sent to an issuing bank of the bank card used in the multiple duplicate transactions.

42. The system of claim 37, wherein the alert is sent to an authorized holder of the bank card used in the multiple duplicate transactions.

43. The system of claim 27, wherein the transaction information comprises location information used to determine a location of a terminal used in the transaction.

44. The system of claim 43, wherein the location information is compared with a predetermined location of the terminal to determine the validity of the transaction.

45. The system of claim 43, wherein the location information for a presented bank card is compared with other transactions for the same bank card to identify possible fraudulent activity.

46. The system of claim 43, wherein the location information for a presented bank card is compared with location and time-stamp information for other transactions for the same bank card to identify possible fraudulent activity.

47. The system of claim 27, wherein the transaction information comprises time-stamp information.

48. The system of claim 27, wherein the alert comprises data indicating whether a given terminal is operating in an encrypting mode.

49. The system of claim 27, wherein the alert comprises data indicating whether a given terminal is operating in an authenticating mode.

50. The system of claim 27, wherein the alert comprises a report indicating a quantity of replay attacks.

51. The system of claim 27, wherein the alert comprises a report indicating a quantity of transactions on a compromised terminal.

52. The method of claim 5, wherein the alert is sent to an acquiring bank of the merchant used in the given transaction, the alert indicating whether the terminal has encrypted some or all of the transaction information in the given transaction.

53. The method of claim 7, wherein the alert is sent to an acquiring bank of the merchant used in the transaction, informing the acquiring bank that a skimmed or otherwise unauthenticated token was presented for a transaction.

54. The method of claim 27, wherein for a given point of sale terminal used in a transaction, the information regarding the operating condition of the given point of sale terminal comprises an encrypting status of the given point of sale terminal, and the alert is sent to an acquiring bank of the merchant used in the transaction, informing the acquiring bank of the encrypting status of the merchant's point of sale terminal.

55. The method of claim 33, wherein the alert is sent to an acquiring bank of the merchant used in the transaction, informing the acquiring bank that a skimmed or otherwise unauthenticated token was presented for a transaction.

56. A method of evaluating bank card transactions, comprising:
   receiving transaction records for a plurality of bank card transactions conducted at point of sale terminals, wherein the transaction records include transaction information and physical infrastructure information, the transaction information comprising at least one of bank card information, transaction amount, and transaction date for the transactions, and the physical infrastructure information comprising information regarding an operating condition of a given point of sale terminal used in a transaction;
   a computing system evaluating the transaction information and physical infrastructure information received with the transaction records and determining whether a reportable event has occurred based on the operating condition of the given point of sale terminal; and
   providing an alert representing the reportable event if the computing system determines a reportable event has occurred based on the operating condition of the given point of sale terminal;
   wherein the transaction information comprises information used to determine whether a bank card is being used in multiple duplicate bank card transactions.

57. The method of claim 56, wherein the operating condition of the given point of sale terminal comprises an encrypting status of the given point of sale terminal, an encrypting status of a component at the given point of sale terminal, a count of bank card swipes at the given point of sale terminal, or a count of bank cards rejected at the given point of sale terminal.

58. The method of claim 56, wherein for a given point of sale terminal used in a transaction, the physical infrastructure information comprises an identification of the given point of sale terminal.

59. The method of claim 58, wherein the identification of the point of sale terminal comprises a terminal ID.

60. The method of claim 58, wherein the identification of the point of sale terminal comprises a serial number of the terminal.

61. The method of claim 56, wherein for a given point of sale terminal used in a transaction, the information regarding the operating condition of the given point of sale terminal comprises information indicating whether the given point of sale terminal has encrypted some or all of the transaction information in a given transaction.

62. The method of claim 56, wherein for a given point of sale terminal used in a transaction, the information regarding the operating condition of the given point of sale terminal comprises information indicating whether the given point of sale terminal has encrypted some or all of the transaction information in a group of transactions.

63. The method of claim 56, wherein the transaction records include authentication information identifying authenticity of the bank card used in a bank card transaction.

64. The method of claim 61, wherein the alert is sent to a merchant identified with the given point of sale terminal used in the given transaction or to the issuing bank of the bank card used in the given transaction, the alert indicating whether the terminal has encrypted some or all of the transaction information in the given transaction.

65. The method of claim 62, wherein the alert is sent to a merchant identified with the given point of sale terminal or to an issuing bank of a bank card used in one or more transactions in the group of transactions, the alert indicating whether the terminal has encrypted some or all of the transaction information in the given transaction.

66. The method of claim 56, wherein the alert comprises an email message generated and sent to a designated holder of a bank card used in a bank card transaction upon occurrence of the bank card transaction.

67. The method of claim 56, wherein the transaction information further comprises a counter value.

68. The method of claim 67, wherein the counter value is a value of a counter at a point of sale terminal at which the bank card is presented for the transaction, and wherein the counter is incremented upon execution of a predetermined quantity of transactions.

69. The method of claim 67, wherein the counter value is used to encrypt at least a portion of the transaction data.

70. The method of claim 56, wherein the alert is sent to an issuing bank of the bank card used in the multiple duplicate transactions.

71. The method of claim 56, wherein the alert is sent to an authorized holder of the bank card used in the multiple duplicate transactions.

72. The method of claim 56, wherein the transaction information further comprises location information used to determine a location of a point of sale terminal used in the transaction.

73. The method of claim 72, further comprising the step of comparing the location information with a predetermined location of the point of sale terminal to determine the validity of the transaction.

74. The method of claim 72, further comprising the step of comparing the location information for a presented bank card with other transactions for the same bank card to identify possible fraudulent activity.

75. The method of claim 72, further comprising the step of comparing the location information for a presented bank card with location and time-stamp information for other transactions for the same bank card to identify possible fraudulent activity.

76. The method of claim 56, wherein the transaction information further comprises time-stamp information.

77. The method of claim 56, wherein the alert comprises data indicating whether a given point of sale terminal is operating in an encrypting mode.

78. The method of claim 56, wherein the alert comprises data indicating whether a given point of sale terminal is operating in an authenticating mode.

79. The method of claim 56, wherein the alert comprises a report indicating a quantity of replay attacks.

80. The method of claim 56, wherein the alert comprises a report indicating a quantity of transactions on a compromised point of sale terminal.

81. The method of claim 56, wherein the bank card comprises a magnetic stripe card, a smart card or other token.

82. A server system for evaluating bank card transactions, comprising:
    a processor configured to execute a plurality of instructions;
    a data storage device coupled to the processor and configured to store the plurality of instructions;
    a first module configured to receive transaction records for a plurality of bank card transactions conducted at point of sale terminals, wherein the transaction records include transaction information and physical infrastructure information, the transaction information comprising at least one of token information, transaction amount, and transaction date for the transactions, and the physical infrastructure information comprising information regarding an operating condition of a given point of sale terminal used in a transaction;
    a second module configured to evaluate the transaction information and physical infrastructure information received with the transaction records and to determine whether a reportable event has occurred based on the operating condition of the given point of sale terminal; and
    a third module configured to provide an alert representing the reportable event if the computing system determines a reportable event has occurred based on the operating condition of the given point of sale terminal;
    wherein the modules comprise hardware coupled to the processor or computer usable storage medium having computer program code stored thereon and configured to cause the processor to perform the recited function, or a combination thereof; and wherein the transaction information comprises information used to determine whether a bank card is being used in multiple duplicate bank card transactions.

83. The system of claim 82, wherein the operating condition of the given point of sale terminal comprises an encrypting status of the given point of sale terminal, an encrypting status of a component at the given point of sale terminal, a count of bank card swipes at the given point of sale terminal, or a count of bank cards rejected at the given point of sale terminal.

84. The system of claim 82, wherein for a given point of sale terminal, the physical information comprises an identification of the given point of sale terminal for a transaction.

85. The system of claim 83, wherein the identification of the point of sale terminal comprises a terminal ID.

86. The system of claim 83, wherein the identification of the point of sale terminal comprises a serial number of the terminal.

87. The system of claim 82, wherein for a given point of sale terminal used in a transaction, the information regarding the operating condition of the given point of sale terminal comprises information indicating whether the given point of sale terminal has encrypted some or all of the transaction information in a given transaction.

88. The system of claim 87, wherein for a given point of sale terminal used in a transaction, the information regarding the operating condition of the given point of sale terminal comprises information indicating whether the given point of sale terminal has encrypted some or all of the transaction information in a group of transactions.

89. The system of claim 82, wherein the transaction records include authentication information identifying authenticity of the bank card used in a bank card transaction.

90. The system of claim 87, wherein the alert is sent to a merchant identified with the given point of sale terminal used in the given transaction or to the issuing bank of the bank card used in the given transaction, the alert indicating whether the terminal has encrypted some or all of the transaction information in the given transaction.

91. The system of claim 88, wherein the alert is sent to a merchant identified with the given point of sale terminal used in the group of transactions or to the an issuing bank of a bank card used in one or more transactions in the group of transactions, the alert indicating whether the terminal has encrypted some or all of the transaction information in the given transaction.

92. The system of claim 82, wherein the alert comprises an email message generated and sent to a designated holder of a bank card used in a bank card transaction upon occurrence of the bank card transaction.

93. The system of claim 82, wherein the transaction information includes a counter value.

94. The system of claim 83, wherein the counter value is a value of a counter at a point of sale terminal at which the bank card is presented for the transaction, and wherein the counter is incremented upon execution of a predetermined quantity of transactions.

95. The system of claim 94, wherein the counter value is used to encrypt at least a portion of the transaction data.

96. The system of claim 82, wherein the alert is sent to an issuing bank of the bank card used in the multiple duplicate transactions.

97. The system of claim 82, wherein the alert is sent to an authorized holder of the bank card used in the multiple duplicate transactions.

98. The system of claim 82, wherein the transaction information comprises location information used to determine a location of a terminal used in the transaction.

99. The system of claim 98, wherein the location information is compared with a predetermined location of the terminal to determine the validity of the transaction.

100. The system of claim 98, wherein the location information for a presented bank card is compared with other transactions for the same bank card to identify possible fraudulent activity.

101. The system of claim 98, wherein the location information for a presented bank card is compared with location and time-stamp information for other transactions for the same bank card to identify possible fraudulent activity.

102. The system of claim 82, wherein the transaction information comprises time-stamp information.

103. The system of claim 82, wherein the alert comprises data indicating whether a given terminal is operating in an encrypting mode.

104. The system of claim 82, wherein the alert comprises data indicating whether a given terminal is operating in an authenticating mode.

105. The system of claim 82, wherein the alert comprises a report indicating a quantity of replay attacks.

106. The system of claim 82, wherein the alert comprises a report indicating a quantity of transactions on a compromised terminal.

107. The method of claim 61, wherein the alert is sent to an acquiring bank of the merchant used in the given transaction, the alert indicating whether the terminal has encrypted some or all of the transaction information in the given transaction.

108. The method of claim 63, wherein the alert is sent to an acquiring bank of the merchant used in the transaction, informing the acquiring bank that a skimmed or otherwise unauthenticated token was presented for a transaction.

109. The method of claim 82, wherein for a given point of sale terminal used in a transaction, the information regarding the operating condition of the given point of sale terminal comprises an encrypting status of the given point of sale terminal, and the alert is sent to an acquiring bank of the merchant used in the transaction, informing the acquiring bank of the encrypting status of the merchant's point of sale terminal.

110. The method of claim 98, wherein the alert is sent to an acquiring bank of the merchant used in the transaction, informing the acquiring bank that a skimmed or otherwise unauthenticated token was presented for a transaction.

111. A method of evaluating bank card transactions, comprising:
receiving transaction records for a plurality of bank card transactions conducted at point of sale terminals, wherein the transaction records include transaction information and physical infrastructure information, the transaction information comprising at least one of bank card information, transaction amount, and transaction date for the transactions, and the physical infrastructure information comprising information regarding an operating condition of a given point of sale terminal used in a transaction;
a computing system evaluating the transaction information and physical infrastructure information received with the transaction records and determining whether a reportable event has occurred based on the operating condition of the given point of sale terminal; and
providing an alert representing the reportable event if the computing system determines a reportable event has occurred based on the operating condition of the given point of sale terminal;
wherein the transaction information comprises location information used to determine a location of a point of sale terminal used in the transaction.

112. The method of claim 111, wherein the operating condition of the given point of sale terminal comprises an encrypting status of the given point of sale terminal, an encrypting status of a component at the given point of sale terminal, a count of bank card swipes at the given point of sale terminal, or a count of bank cards rejected at the given point of sale terminal.

113. The method of claim 111, wherein for a given point of sale terminal used in a transaction, the physical infrastructure information comprises an identification of the given point of sale terminal.

114. The method of claim 113, wherein the identification of the point of sale terminal comprises a terminal ID.

115. The method of claim 113, wherein the identification of the point of sale terminal comprises a serial number of the terminal.

116. The method of claim 111, wherein for a given point of sale terminal used in a transaction, the information regarding the operating condition of the given point of sale terminal comprises information indicating whether the given point of sale terminal has encrypted some or all of the transaction information in a given transaction.

117. The method of claim 111, wherein for a given point of sale terminal used in a transaction, the information regarding the operating condition of the given point of sale terminal comprises information indicating whether the given point of sale terminal has encrypted some or all of the transaction information in a group of transactions.

118. The method of claim 111, wherein the transaction records include authentication information identifying authenticity of the bank card used in a bank card transaction.

119. The method of claim 116, wherein the alert is sent to a merchant identified with the given point of sale terminal used in the given transaction or to the issuing bank of the bank card used in the given transaction, the alert indicating whether the terminal has encrypted some or all of the transaction information in the given transaction.

120. The method of claim 117, wherein the alert is sent to a merchant identified with the given point of sale terminal or to an issuing bank of a bank card used in one or more transactions in the group of transactions, the alert indicating whether the terminal has encrypted some or all of the transaction information in the given transaction.

121. The method of claim 111, wherein the alert comprises an email message generated and sent to a designated holder of a bank card used in a bank card transaction upon occurrence of the bank card transaction.

122. The method of claim 111, wherein the transaction information comprises information used to determine whether a bank card is being used in multiple duplicate bank card transactions.

123. The method of claim 122, wherein the transaction information includes a counter value.

124. The method of claim 123, wherein the counter value is a value of a counter at a point of sale terminal at which the bank card is presented for the transaction, and wherein the counter is incremented upon execution of a predetermined quantity of transactions.

125. The method of claim 123, wherein the counter value is used to encrypt at least a portion of the transaction data.

126. The method of claim 122, wherein the alert is sent to an issuing bank of the bank card used in the multiple duplicate transactions.

127. The method of claim 122, wherein the alert is sent to an authorized holder of the bank card used in the multiple duplicate transactions.

128. The method of claim 111, further comprising the step of comparing the location information with a predetermined location of the point of sale terminal to determine the validity of the transaction.

129. The method of claim 111, further comprising the step of comparing the location information for a presented bank card with other transactions for the same bank card to identify possible fraudulent activity.

130. The method of claim 111, further comprising the step of comparing the location information for a presented bank card with location and time-stamp information for other transactions for the same bank card to identify possible fraudulent activity.

131. The method of claim 111, wherein the transaction information comprises time-stamp information.

132. The method of claim 111, wherein the alert comprises data indicating whether a given point of sale terminal is operating in an encrypting mode.

133. The method of claim 111, wherein the alert comprises data indicating whether a given point of sale terminal is operating in an authenticating mode.

134. The method of claim 111, wherein the alert comprises a report indicating a quantity of replay attacks.

135. The method of claim 111, wherein the alert comprises a report indicating a quantity of transactions on a compromised point of sale terminal.

136. The method of claim 111, wherein the bank card comprises a magnetic stripe card, a smart card or other token.

137. A server system for evaluating bank card transactions, comprising:
  a processor configured to execute a plurality of instructions;
  a data storage device coupled to the processor and configured to store the plurality of instructions;
  a first module configured to receive transaction records for a plurality of bank card transactions conducted at point of sale terminals, wherein the transaction records include transaction information and physical infrastructure information, the transaction information comprising at least one of token information, transaction amount, and transaction date for the transactions, and the physical infrastructure information comprising information regarding an operating condition of a given point of sale terminal used in a transaction;
  a second module configured to evaluate the transaction information and physical infrastructure information received with the transaction records and to determine whether a reportable event has occurred based on the operating condition of the given point of sale terminal; and
  a third module configured to provide an alert representing the reportable event if the computing system determines a reportable event has occurred based on the operating condition of the given point of sale terminal;
  wherein the modules comprise hardware coupled to the processor or computer usable storage medium having computer program code stored thereon and configured to cause the processor to perform the recited function, or a combination thereof; and wherein the transaction information comprises location information used to determine a location of a terminal used in the transaction.

138. The system of claim 137, wherein the operating condition of the given point of sale terminal comprises an encrypting status of the given point of sale terminal, an encrypting status of a component at the given point of sale terminal, a count of bank card swipes at the given point of sale terminal, or a count of bank cards rejected at the given point of sale terminal.

139. The system of claim 137, wherein for a given point of sale terminal, the physical information comprises an identification of the given point of sale terminal for a transaction.

140. The system of claim 139, wherein the identification of the point of sale terminal comprises a terminal ID.

141. The system of claim 139, wherein the identification of the point of sale terminal comprises a serial number of the terminal.

142. The system of claim 137, wherein for a given point of sale terminal used in a transaction, the information regarding the operating condition of the given point of sale terminal comprises information indicating whether the given point of sale terminal has encrypted some or all of the transaction information in a given transaction.

143. The system of claim 142, wherein for a given point of sale terminal used in a transaction, the information regarding the operating condition of the given point of sale terminal comprises information indicating whether the given point of sale terminal has encrypted some or all of the transaction information in a group of transactions.

144. The system of claim 137, wherein the transaction records include authentication information identifying authenticity of the bank card used in a bank card transaction.

145. The system of claim 142, wherein the alert is sent to a merchant identified with the given point of sale terminal used in the given transaction or to the issuing bank of the bank card used in the given transaction, the alert indicating whether the terminal has encrypted some or all of the transaction information in the given transaction.

146. The system of claim 143, wherein the alert is sent to a merchant identified with the given point of sale terminal used in the group of transactions or to the an issuing bank of a bank card used in one or more transactions in the group of transactions, the alert indicating whether the terminal has encrypted some or all of the transaction information in the given transaction.

147. The system of claim 137, wherein the alert comprises an email message generated and sent to a designated holder of a bank card used in a bank card transaction upon occurrence of the bank card transaction.

148. The system of claim 137, wherein the transaction information comprises information used to determine whether a bank card is being used in multiple duplicate bank card transactions.

149. The system of claim 148, wherein the transaction information includes a counter value.

150. The system of claim 149, wherein the counter value is a value of a counter at a point of sale terminal at which the bank card is presented for the transaction, and wherein the counter is incremented upon execution of a predetermined quantity of transactions.

151. The system of claim 150, wherein the counter value is used to encrypt at least a portion of the transaction data.

152. The system of claim 148, wherein the alert is sent to an issuing bank of the bank card used in the multiple duplicate transactions.

153. The system of claim 148, wherein the alert is sent to an authorized holder of the bank card used in the multiple duplicate transactions.

154. The system of claim 137, wherein the location information is compared with a predetermined location of the terminal to determine the validity of the transaction.

155. The system of claim 137, wherein the location information for a presented bank card is compared with other transactions for the same bank card to identify possible fraudulent activity.

156. The system of claim 137, wherein the location information for a presented bank card is compared with location and time-stamp information for other transactions for the same bank card to identify possible fraudulent activity.

157. The system of claim 137, wherein the transaction information comprises time-stamp information.

158. The system of claim 137, wherein the alert comprises data indicating whether a given terminal is operating in an encrypting mode.

159. The system of claim 137, wherein the alert comprises data indicating whether a given terminal is operating in an authenticating mode.

160. The system of claim 137, wherein the alert comprises a report indicating a quantity of replay attacks.

161. The system of claim 137, wherein the alert comprises a report indicating a quantity of transactions on a compromised terminal.

162. The method of claim 116, wherein the alert is sent to an acquiring bank of the merchant used in the given transaction, the alert indicating whether the terminal has encrypted some or all of the transaction information in the given transaction.

163. The method of claim 118, wherein the alert is sent to an acquiring bank of the merchant used in the transaction, informing the acquiring bank that a skimmed or otherwise unauthenticated token was presented for a transaction.

164. The method of claim 137, wherein for a given point of sale terminal used in a transaction, the information regarding the operating condition of the given point of sale terminal comprises an encrypting status of the given point of sale terminal, and the alert is sent to an acquiring bank of the merchant used in the transaction, informing the acquiring bank of the encrypting status of the merchant's point of sale terminal.

165. The method of claim 144, wherein the alert is sent to an acquiring bank of the merchant used in the transaction, informing the acquiring bank that a skimmed or otherwise unauthenticated token was presented for a transaction.

166. A method of evaluating bank card transactions, comprising:
  receiving transaction records for a plurality of bank card transactions conducted at point of sale terminals, wherein the transaction records include transaction information and physical infrastructure information, the transaction information comprising at least one of bank card information, transaction amount, and transaction date for the transactions, and the physical infrastructure information comprising information regarding an operating condition of a given point of sale terminal used in a transaction;
  a computing system evaluating the transaction information and physical infrastructure information received with the transaction records and determining whether a reportable event has occurred based on the operating condition of the given point of sale terminal; and
  providing an alert representing the reportable event if the computing system determines a reportable event has occurred based on the operating condition of the given point of sale terminal;
  wherein for a given point of sale terminal used in a transaction, the physical infrastructure information comprises an identification of the given point of sale terminal.

167. The method of claim 166, wherein the operating condition of the given point of sale terminal comprises an encrypting status of the given point of sale terminal, an encrypting status of a component at the given point of sale terminal, a count of bank card swipes at the given point of sale terminal, or a count of bank cards rejected at the given point of sale terminal.

168. The method of claim 166, wherein the identification of the point of sale terminal comprises a terminal ID.

169. The method of claim 166, wherein the identification of the point of sale terminal comprises a serial number of the terminal.

170. The method of claim 166, wherein for a given point of sale terminal used in a transaction, the information regarding the operating condition of the given point of sale terminal comprises information indicating whether the given point of sale terminal has encrypted some or all of the transaction information in a given transaction.

171. The method of claim 166, wherein for a given point of sale terminal used in a transaction, the information regarding the operating condition of the given point of sale terminal comprises information indicating whether the given point of sale terminal has encrypted some or all of the transaction information in a group of transactions.

172. The method of claim 166, wherein the transaction records include authentication information identifying authenticity of the bank card used in a bank card transaction.

173. The method of claim 170, wherein the alert is sent to a merchant identified with the given point of sale terminal used in the given transaction or to the issuing bank of the bank card used in the given transaction, the alert indicating whether the terminal has encrypted some or all of the transaction information in the given transaction.

174. The method of claim 171, wherein the alert is sent to a merchant identified with the given point of sale terminal or to an issuing bank of a bank card used in one or more transactions in the group of transactions, the alert indicating whether the terminal has encrypted some or all of the transaction information in the given transaction.

175. The method of claim 166, wherein the alert comprises an email message generated and sent to a designated holder of a bank card used in a bank card transaction upon occurrence of the bank card transaction.

176. The method of claim 166, wherein the transaction information comprises information used to determine whether a bank card is being used in multiple duplicate bank card transactions.

177. The method of claim 176, wherein the transaction information includes a counter value.

178. The method of claim 177, wherein the counter value is a value of a counter at a point of sale terminal at which the bank card is presented for the transaction, and wherein the counter is incremented upon execution of a predetermined quantity of transactions.

179. The method of claim 177, wherein the counter value is used to encrypt at least a portion of the transaction data.

180. The method of claim 176, wherein the alert is sent to an issuing bank of the bank card used in the multiple duplicate transactions.

181. The method of claim 176, wherein the alert is sent to an authorized holder of the bank card used in the multiple duplicate transactions.

182. The method of claim 166, wherein the transaction information comprises location information used to determine a location of a point of sale terminal used in the transaction.

183. The method of claim 182, further comprising the step of comparing the location information with a predetermined location of the point of sale terminal to determine the validity of the transaction.

184. The method of claim 182, further comprising the step of comparing the location information for a presented bank card with other transactions for the same bank card to identify possible fraudulent activity.

185. The method of claim 182, further comprising the step of comparing the location information for a presented bank card with location and time-stamp information for other transactions for the same bank card to identify possible fraudulent activity.

186. The method of claim 166, wherein the transaction information comprises time-stamp information.

187. The method of claim 166, wherein the alert comprises data indicating whether a given point of sale terminal is operating in an encrypting mode.

188. The method of claim 166, wherein the alert comprises data indicating whether a given point of sale terminal is operating in an authenticating mode.

189. The method of claim 166, wherein the alert comprises a report indicating a quantity of replay attacks.

190. The method of claim 166, wherein the alert comprises a report indicating a quantity of transactions on a compromised point of sale terminal.

191. The method of claim 166, wherein the bank card comprises a magnetic stripe card, a smart card or other token.

192. A server system for evaluating bank card transactions, comprising:

a processor configured to execute a plurality of instructions;

a data storage device coupled to the processor and configured to store the plurality of instructions;

a first module configured to receive transaction records for a plurality of bank card transactions conducted at point of sale terminals, wherein the transaction records include transaction information and physical infrastructure information, the transaction information comprising at least one of token information, transaction amount, and transaction date for the transactions, and the physical infrastructure information comprising information regarding an operating condition of a given point of sale terminal used in a transaction;

a second module configured to evaluate the transaction information and physical infrastructure information received with the transaction records and to determine whether a reportable event has occurred based on the operating condition of the given point of sale terminal; and a third module configured to provide an alert representing the reportable event if the computing system determines a reportable event has occurred based on the operating condition of the given point of sale terminal;

wherein the modules comprise hardware coupled to the processor or computer usable storage medium having computer program code stored thereon and configured to cause the processor to perform the recited function, or a combination thereof; and wherein for a given point of sale terminal, the physical information comprises an identification of the given point of sale terminal for a transaction.

193. The system of claim 192, wherein the operating condition of the given point of sale terminal comprises an encrypting status of the given point of sale terminal, an encrypting status of a component at the given point of sale terminal, a count of bank card swipes at the given point of sale terminal, or a count of bank cards rejected at the given point of sale terminal.

194. The system of claim 192, wherein the identification of the point of sale terminal comprises a terminal ID.

195. The system of claim 192, wherein the identification of the point of sale terminal comprises a serial number of the terminal.

196. The system of claim 192, wherein for a given point of sale terminal used in a transaction, the information regarding the operating condition of the given point of sale terminal comprises information indicating whether the given point of sale terminal has encrypted some or all of the transaction information in a given transaction.

197. The system of claim 196, wherein for a given point of sale terminal used in a transaction, the information regarding the operating condition of the given point of sale terminal comprises information indicating whether the given point of sale terminal has encrypted some or all of the transaction information in a group of transactions.

198. The system of claim 192, wherein the transaction records include authentication information identifying authenticity of the bank card used in a bank card transaction.

199. The system of claim 196, wherein the alert is sent to a merchant identified with the given point of sale terminal used in the given transaction or to the issuing bank of the bank card used in the given transaction, the alert indicating whether the terminal has encrypted some or all of the transaction information in the given transaction.

200. The system of claim 197, wherein the alert is sent to a merchant identified with the given point of sale terminal used in the group of transactions or to the an issuing bank of a bank card used in one or more transactions in the group of transactions, the alert indicating whether the terminal has encrypted some or all of the transaction information in the given transaction.

201. The system of claim 192, wherein the alert comprises an email message generated and sent to a designated holder of a bank card used in a bank card transaction upon occurrence of the bank card transaction.

202. The system of claim 192, wherein the transaction information comprises information used to determine whether a bank card is being used in multiple duplicate bank card transactions.

203. The system of claim 202, wherein the transaction information includes a counter value.

204. The system of claim 203, wherein the counter value is a value of a counter at a point of sale terminal at which the bank card is presented for the transaction, and wherein the counter is incremented upon execution of a predetermined quantity of transactions.

205. The system of claim 204, wherein the counter value is used to encrypt at least a portion of the transaction data.

206. The system of claim 202, wherein the alert is sent to an issuing bank of the bank card used in the multiple duplicate transactions.

207. The system of claim 202, wherein the alert is sent to an authorized holder of the bank card used in the multiple duplicate transactions.

208. The system of claim 192, wherein the transaction information comprises location information used to determine a location of a terminal used in the transaction.

209. The system of claim 208, wherein the location information is compared with a predetermined location of the terminal to determine the validity of the transaction.

210. The system of claim 208, wherein the location information for a presented bank card is compared with other transactions for the same bank card to identify possible fraudulent activity.

211. The system of claim 208, wherein the location information for a presented bank card is compared with location and time-stamp information for other transactions for the same bank card to identify possible fraudulent activity.

212. The system of claim 192, wherein the transaction information comprises time-stamp information.

213. The system of claim 192, wherein the alert comprises data indicating whether a given terminal is operating in an encrypting mode.

214. The system of claim 192, wherein the alert comprises data indicating whether a given terminal is operating in an authenticating mode.

215. The system of claim 192, wherein the alert comprises a report indicating a quantity of replay attacks.

216. The system of claim 192, wherein the alert comprises a report indicating a quantity of transactions on a compromised terminal.

217. The method of claim 170, wherein the alert is sent to an acquiring bank of the merchant used in the given transaction, the alert indicating whether the terminal has encrypted some or all of the transaction information in the given transaction.

218. The method of claim 172, wherein the alert is sent to an acquiring bank of the merchant used in the transaction, informing the acquiring bank that a skimmed or otherwise unauthenticated token was presented for a transaction.

219. The method of claim 192, wherein for a given point of sale terminal used in a transaction, the information regarding the operating condition of the given point of sale terminal comprises an encrypting status of the given point of sale terminal, and the alert is sent to an acquiring bank of the merchant used in the transaction, informing the acquiring bank of the encrypting status of the merchant's point of sale terminal.

220. The method of claim 198, wherein the alert is sent to an acquiring bank of the merchant used in the transaction, informing the acquiring bank that a skimmed or otherwise unauthenticated token was presented for a transaction.

* * * * *